United States Patent
Niedert

(10) Patent No.: US 12,545,319 B1
(45) Date of Patent: *Feb. 10, 2026

(54) NON-ARTICULATING COMMERCIAL VEHICLE

(71) Applicant: AUTONOMOUS HEAVY TRUCK SOLUTIONS LLC, Wheaton, IL (US)

(72) Inventor: Gerald Thomas Niedert, Wheaton, IL (US)

(73) Assignee: Autonomous Heavy Truck Solutions LLC, Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/022,776

(22) Filed: Jan. 15, 2025

Related U.S. Application Data

(63) Continuation-in-part of application No. 18/928,802, filed on Oct. 28, 2024, which is a continuation-in-part of application No. 18/895,244, filed on Sep. 24, 2024.

(51) Int. Cl.
| | | |
|---|---|---|
| *B62D 7/14* | (2006.01) | |
| *B60K 17/356* | (2006.01) | |
| *B60T 8/17* | (2006.01) | |
| *B62D 59/04* | (2006.01) | |

(52) U.S. Cl.
CPC ............ *B62D 7/144* (2013.01); *B60K 17/356* (2013.01); *B60T 8/1708* (2013.01); *B62D 59/04* (2013.01)

(58) Field of Classification Search
CPC ...... B62D 9/002; B62D 7/144; B62D 35/005; B62D 33/00; B62D 60/00; B60W 60/001
See application file for complete search history.

(56) References Cited

U.S. PATENT DOCUMENTS

| | | | |
|---|---|---|---|
| 2,110,213 | A | 3/1938 | Fort |
| 5,390,945 | A * | 2/1995 | Orr ...................... B60G 17/005 280/98 |
| 7,338,335 | B1 | 3/2008 | Messano |
| 11,440,456 | B1 | 9/2022 | Willison et al. |
| 12,077,235 | B2 * | 9/2024 | Niedert .................. B62D 7/144 |
| 2007/0089916 | A1 | 4/2007 | Lundstrom |
| 2009/0243237 | A1 | 10/2009 | Sasaki |
| 2010/0101876 | A1 | 4/2010 | Misencik |
| 2011/0198145 | A1 | 8/2011 | Bullis |
| 2017/0166212 | A1 | 6/2017 | Flaum et al. |
| 2018/0056769 | A1 | 3/2018 | Kerspe et al. |
| 2021/0046978 | A1 | 2/2021 | Forostovsky et al. |
| 2021/0138853 | A1 | 5/2021 | Wuerthele et al. |
| 2024/0308583 | A1 | 9/2024 | Niedert |

* cited by examiner

*Primary Examiner* — Faye M Fleming
(74) *Attorney, Agent, or Firm* — Michael P. Mazza, LLC; Michael P. Mazza

(57) ABSTRACT

A commercial vehicle having various GVWR configurations with a vehicle body with two or more axles, and a cab that does not pivot relative to the vehicle body, and a battery-electric-powered or hydrogen-electric-powered propulsion system. The vehicle has a center of gravity that is substantially lower, and a track width which is substantially narrower, than an articulating tractor-trailer combination with a trailer size comparable to the vehicle body of the present invention, providing substantially increased stability, and with all axles preferably being steerable E-axles, substantially improving the turning and trailing of the vehicle. Additional attributes are improved safety, increased payload weight and cubic capacity, higher productivity and lower maintenance costs. Many other advantages flow from this vehicle design.

16 Claims, 18 Drawing Sheets

$R_{ar}$ - MINIMUM TURNING RADIUS
$\Theta_1$ - FRONT AVERAGE TURNING ANGLE
$\Theta_2$ - REAR AVERAGE TURNING ANGLE
R - VEHICLE'S TURNING RADIUS
L - VEHICLE'S WHEELBASE
$B_L$ - VEHICLE'S CROSSBASE

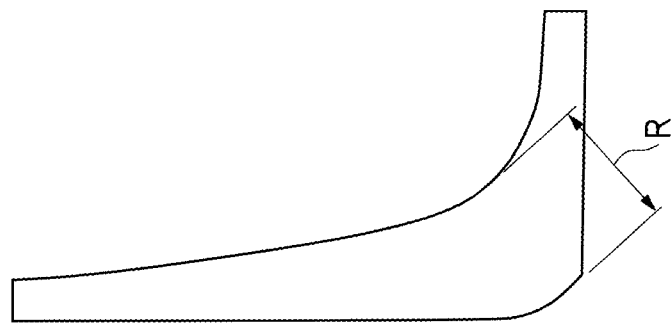
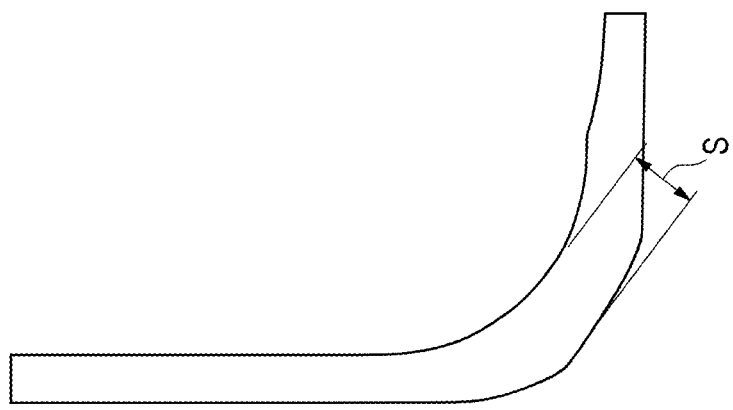
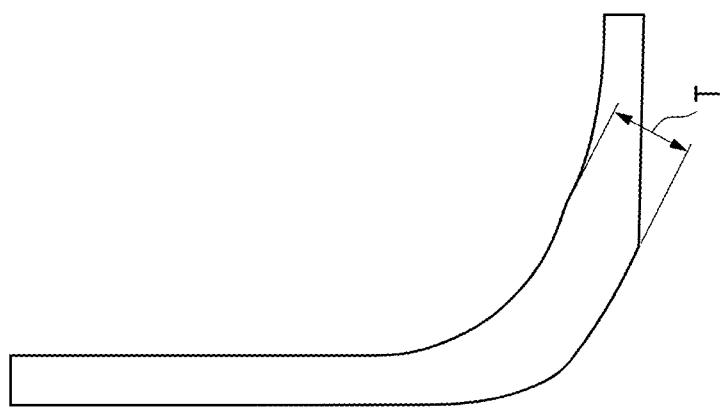

NON-ARTICULATING COMMERCIAL VEHICLE

BACKGROUND OF THE INVENTION

The present invention generally relates to integrated, non-articulating, electric-powered commercial vehicles which are an alternative to specific 3-axle non-articulating commercial straight trucks, and 3-axle, 4-axle and 5-axle articulating trailer-tractor combination commercial vehicles, and provide specific advantages when used in private fleets, specialized transportation operations and common carrier transportation operations where increased cubic capacity is essential.

The exemplary non-articulating vehicle designs of the present invention have specific characteristics that demonstrate significant advantages when comparing such vehicles to articulating trailer-tractor combination commercial vehicles and to specific 3 axle straight trucks in common use today. Such advantages include: increased cubic capacity; more efficient axle loading; greater operational stability; increased operating range (relative to battery electric tractors and trucks); safer tracking and better maneuverability (e.g., the FMCSA reports that thirty-two present (32%) percent of truck accidents are caused by trucks travelling over the center line or off the road, per Top 4 Causes of Tractor Trailer Accidents-Commonwealth Law Group (hurtinva.com); more effective aerodynamic design; reduced rolling resistance; better braking balance leading to shorter stopping distances; lower maintenance costs; and less expensive manufacturing costs, as articulating designs require building two vehicles as compared to a single vehicle with this non-articulating design. Advantages of the non-articulating commercial vehicle of the present invention, as compared to commercial vehicles in common use today, include a longer body length, more efficient axle loading, increased cargo weight capacity and a lighter vehicle (i.e., consisting of a single integrated unit rather than a separate cab and body).

The dominant/conventional commercial highway trailer length for tractor-trailer combination vehicles is fifty-three (53) feet. Providing a commercial vehicle design with a vehicle body that exceeds this length can, in many circumstances, prove highly profitable for truck operators and/or the companies they service. However, a design increasing trailer length is difficult to achieve for existing tractor-trailer designs, given the disadvantages of tractor-trailer combinations listed above, and discussed further below.

While different commercial vehicle designs have attempted to address some of these issues, they have generally done so in the context of vehicles with "articulating" vehicle bodies (i.e., vehicle bodies which pivot relative to the tractor/cab). In other words, commercial vehicle designers have generally not addressed these problems using an integrated, non-articulating vehicle designs. In addition to the fact that such designs would "break the mold" from traditional vehicle designs, there is another reason for not pursuing integrated, non-articulated vehicle designs within the United States: such designs for such integrated and non-articulating vehicles may not be currently legal in the United States, given current federal bridge and length laws. However, once a designer evaluates solutions based on integrated, non-articulated vehicle design, the design perspective and design functionality radically change.

The inventor has spent 45 years in the commercial highway transportation business, owning and operating four motor carriers and one full-service commercial truck leasing company, with a total fleet size among all 5 businesses of 2,700 tractors, 400 straight trucks and between 4,000 and 4,500 semi-trailers.

Heavy truck classifications are usually made with Class 6, 7 and 8 truck size designations; however, the present invention will be better understood using exemplary disclosures of heavy truck design configurations in three (3) axle, four (4) axle and five (5) axle sizes. All configurations of the present invention are of the same non-articulating design, with the only differences being in vehicle body length, height, number of axles and whether the propulsion system is hydrogen-electric or battery-electric, as one propulsion system may be better suited to operational applications than the other.

These configurations of the present invention are not intended to replace heavy duty commercial vehicles in use today, but rather are designed to offer an alternative to a significant percentage of the types of commercial vehicles used in local and regional transportation, private fleet operations, specialized transportation operations and specific types of common (for-hire) carrier operations, as they provide beneficial design elements unavailable in today's commercial vehicle designs.

First and foremost, the design configurations of the present invention are intended to offer four (4) primary benefits over articulating trailer-tractor combinations, and non-articulating, specific three (3) axle straight trucks in common use today: 1) eliminate compression-ignition propulsion, whether from diesel fuel, gasoline, propane, biomass fuel or natural gas, and replace it with zero-emission battery-electric or hydrogen-electric propulsion; 2) create exemplary heavy truck sizes that are all engineered to be more functionally ready for integration of Level 5 Autonomous Vehicle Architecture; 3) create significant improvements to commercial transportation productivity; and 4) introduce safer trucks onto our Nation's highways.

Everyone wants cleaner trucks, safer trucks and more reliable supply chains, and the design configurations of the present invention do exactly that. The switch from diesel to electric is going slowly because the cost/benefit equation is negative, and because there are few incentives, other than tax incentives and tax credits, to encourage fleets to switch. Providing the heavy truck operator with the option of purchasing trucks that are safer and more productive will expedite this switch as the cost/benefit equation should then be positive.

It will now be understood that various benefits may flow from exemplary configurations of the present invention, as compared to both three (3) axle straight trucks and articulating combination tractor-trailer vehicles in common use today, including various combinations of some or all of the following:

1) increased cubic capacity;
2) increased payloads with more efficient axle loading;
3) lighter weight (relative to five (5) axle tractor-trailer combinations);
4) more stable with low center of gravity;
5) reduced body roll on curves
6) elimination of jackknifes;
7) elimination of all manual connections of low and high voltage electric wires and compressed air lines;
8) separate and distinct energy storage and distribution systems for: a) vehicle propulsion and b) for all vehicle non-propulsion energy requirements;
9) larger, more safe, more secure and more accessible space for the systems that produce compressed air and electric energy;

10) enabling faster adoption of Level 5 Autonomous Vehicle Architecture;
11) all wheel electric steering
12) safer tracking at low and high speeds;
13) narrower vehicle path when turning;
14) safer lane changing with faster steering response;
15) improved maneuverability, both in forward and reverse movements;
16) more efficient use of zero-emission energy with larger solar panels,
17) regenerative energy production from E-axles at all axle positions, and regenerative braking at all wheel positions;
18) larger capacity pneumatic systems for increased and more reliable compressed air energy for suspension and tire inflation systems;
19) more overall aerodynamic design, including vehicle designs illustrated herein, with modified designs that may afford additional improvements to the aerodynamic efficiency of both the 3-axle and 4-axle vehicle design, whereby removing or redesigning and recontouring the cargo refrigeration/heating system, and lengthening of the operator's compartment, may enable the entire frontal area of the vehicle to be designed with a completely reshaped and deeply sloped roof, with the side radius corners redesigned with wider and deeper angles, and with a molded front bumper cover, aerodynamically shaped and designed to absorb impact;
20) eliminates all hydraulic powered systems;
21) reduced rolling resistance;
22) fully electronic (electromechanical brake-by-wire) dual disc or electromagnetic foundation brakes with integrated and direct wired actuators and controllers for more instant and reliable wheel-specific electronic signal control for managing automatic; emergency braking, roll-stability, directional-stability, traction-control and anti-lock braking functionality, assuring better brake balance, more controlled braking and shorter stopping distances;
23) less expensive to build;
24) less expensive to maintain;
25) longer operating range with battery-electric power;
26) multiple and integrated battery charging ports;
27) safer operator entrance and exit:
28) in situations where operator and cargo safety and security are critical the hard-wired electrical connectivity for the entire length of the vehicle offers an option of adding an electronic roll-up rear door and adjacent interior camera; additionally, a direct access door from the operator's compartment to the cargo area may also provide for an additional, uncomplicated and effective method of managing cargo security; and
29) ability to add a fifth axle with either very minimal or no structural or dimensional changes to the vehicle, increasing the vehicle's gross vehicle weight rating (herein "GVWR" when referring to a single vehicle, and "GCWR" when referring to two or more connected vehicles), increasing E-axle energy generation and improving braking performance with regenerative braking.

Most of these benefits are self-evident, while some require design specifications from Tier 1 Suppliers, such as for braking, steering, energy storage and distribution systems ("ESDS"), and for the integration of Level 5 Automation. Some of the stated benefits may only be precisely quantified with the building of a prototype subjected to wind-tunnel testing, steering and braking under loaded road conditions, and the testing of automated system functionality (requiring enormous cost).

As to braking, existing heavy trucks typically use pneumatic brakes and, more specifically, drum air brakes (as opposed to disc air brakes). However, as commercial vehicle autonomous systems are being developed and deployed, it is envisioned that electromechanical dual disc foundation braking systems, with integrated electronic brake actuators and controllers, essential for electronic foundation brake signal control, assuring wheel-specific roll-stability, directional-stability, anti-lock braking functionality, traction-control and automatic emergency braking functionality, may be an essential and possibly even a mandatory component of autonomous vehicle systems and may be the foundation braking system incorporated into this vehicle design. While electromechanical foundation braking systems, including electromagnetic braking systems, as discussed later, are not yet in common use by heavy commercial vehicles, it is envisioned that electromagnetic foundation braking systems eventual use may be anticipated, as such braking systems may be a safer and more efficient alternative to foundation brakes that apply abrasive friction for braking functionality.

While different heavy truck OEM's (Original Equipment Manufacturers) have attempted to address some of these issues, they have done so generally in the context of articulating tractor-trailer combination vehicles, and have not addressed these issues using a non-articulating integrated design. Outside this context, OEMs will need to address the current weight and length restrictions which apply to current truck configurations, detailing the inherent limitations of such configurations, which is where a prototype may be important for successfully addressing such limitations.

Accordingly, there may be a need for commercial vehicle configurations with integrated, non-articulating bodies that address the limitations discussed above that are inherent in the design of specific three (3) axle straight trucks and three (3) four (4) and five (5) axle articulating tractor-trailer combination vehicle configurations, and such need may be addressed by the design characteristics of the vehicle configurations disclosed herein, providing advantages, benefits and specific solutions as disclosed herein.

SUMMARY OF THE INVENTION

The objects mentioned above, as well as other objects, are addressed with solutions offered by the present invention, which overcomes specific disadvantages of prior commercial vehicles, while providing new advantages not previously associated with earlier vehicle designs. This summary is provided to introduce a selection of concepts in a simplified form that are further described below in the Detailed Description, so that the claimed invention may be better understood. However, this summary is not intended to limit the scope of the claimed subject matter.

The present invention is primarily intended for the following heavy truck integrated, non-articulating design configurations: (1) 3-axle vehicles with a GVWR of at least 60,000 lbs.; and (2) 4-axle vehicles with a GVWR of at least 80,000 lbs., or at least 82,000 lbs. if powered by battery electric propulsion. Each different design configuration is intended as an alternative to specific 3-axle straight trucks, 3-axle tractor-trailer combinations, and 4-axle and 5-axle tractor trailer combinations.

In every case, each such alternative configuration may significantly improve safety and may greatly increase productivity. Each alternative configuration is also preferably designed to be more readily adaptable to incorporating all of the components of Level 5 Autonomous Vehicle Architecture. Additionally, by offering heavy truck users these specific advantages it may accelerate the use of commercial vehicles that exclusively use only zero emission (clean) energy for propulsion.

Preferably, the 4-axle configuration may be designed and built with five axles. This fifth axle would be a non-driven steerable E-axle (E-axle is described on the next page), and may be located behind the rear-most axle, increasing the vehicle's wheelbase, and increasing the vehicle's body length by the same distance as may be added to the wheelbase. Also, this fifth axle may be located forward of the rear-most axle, effecting no change to the vehicle's wheelbase. Additionally, whenever this fifth axle is referenced, the applicable GVWR may be greater than 82,000 lbs. and all regenerative braking and compressed air functionality applicable to the steering, braking, tire air pressure management and suspension systems of the other non-driven steerable E-axles may apply to this fifth axle, including a separate electric air compressor, a single compressed air supply tank and a single compressed air service tank, assuring the safety and autonomous functionality of the vehicle may not be affected. Additionally, as this fifth axle is steerable, the maneuverability or stability of the vehicle may not change or be adversely affected.

Even as adding the fifth axle for increased weight capacity may be important in the event federal weight limits are increased, the added energy regeneration and regenerative braking of a fifth E-axle may provide significant benefits to safety and productivity.

All axles of the present invention, whether in 3-axle, 4-axle or 5-axle configurations, are preferably steerable electronic axles (hereinafter "E-axles"), and all E-axles are controlled by the vehicle's Autonomous Operating System, which also controls all of the functions of the vehicle's Energy Storage and Distribution System ("ESDS")

Preferably, all E-axles are energy regenerative, either as driven-axles (powered) or non-driven axles (unpowered). Driven E-axles have a multiple purpose: 1) vehicle propulsion: applying electrical energy from the vehicle's ESDS, transmitted directly to the driven E-axle's motor for vehicle propulsion; 2) electrical energy production: when power to the E-axle is stopped and the vehicle begins to slow and brake, the kinetic energy from the slowing and braking of the wheels is directly absorbed by the E-axle motor, reversing the motor's polarity, and instantly reconfiguring the motor as a power generator, producing regenerated electrical power, converted and transmitted back to the vehicle's batteries; and 3) regenerative braking: during the slowing and braking of the vehicle, applying the resistance (negative axle torque) developed by the driven E-axle generator, while generating electrical power, slows and retards the momentum of the vehicle, reducing the wear-rate of the vehicle's electromechanical foundation brakes.

In contrast, non-driven E-axles have two purposes: 1) energy production: at the precise moment electricity from the vehicle's ESDS to the driven E-axle motor is stopped, as a result of the vehicle slowing and braking, the vehicle's ESDS power control and distribution function instantly transmits power to the non-driven E-axle, wherein the E-axle generator is then instantly and electronically engaged with the E-axle, absorbing and applying the kinetic energy from the wheel rotation during slowing and braking, producing regenerated electrical power, converted and transmitted back to the vehicle's batteries; and 2) regenerative braking: retarding and slowing the momentum of the vehicle through the resistance (negative axle torque) of the generator as it generates electrical power, reducing the reliance and wear-rate of the vehicle's foundation brakes. (Admittedly, as those of ordinary skill in the art will understand, all of the advantages of the present invention, as disclosed herein, may still be achieved even if not all axles (driven or non-driven) are E-axles).

Preferably, when the E-axles are driven-axles (powered), electricity from the vehicle's batteries powers an electric motor of dual rotation design that is directly attached to the E-axle. In addition to the electric motor, the following components may also be integrated into the E-axle: a power management and distribution system; inverter; single speed or multi-speed_transmission; electronic differential; and a thermal management (cooling) system.

Powered E-axles may also be designed with electric motors attached directly to each axle hub, eliminating the differentials; however, because of the size of heavy truck suspension systems motors on driven E-axles, and generators on non-driven E-axles, may most likely to be positioned at center-axle.

Preferably, the autonomous systems of the vehicle manage the power requirements of the E-axles, depending upon all of the factors that may affect the power demands of vehicle momentum, including grade, wind, weight, weather, speed and terrain. Additionally, as is referred to below, vehicles of the present invention may have two driven E-axles, enabling the vehicle's autonomous system to electronically disengage one E-axle by stopping the flow of electricity to such axle while simultaneously electronically disengaging the motor from the E-axle. This disengaged E-axle need only be re-engaged when the vehicle's autonomous systems require power to the motor to be restored for vehicle propulsion, or during safety-related emergence situations, under very specific and controlled conditions, when the operator of the vehicle overrides the vehicle's autonomous operating systems and manually restores power, or when the vehicle is slowing and braking, wherein the autonomous operating systems of the vehicle electronically and instantly re-engage and reconfigure the driven E-axle motor as a generator of electrical power, and for regenerative braking functionality.

Whenever the driven E-axle has electrical power stopped, and the motor is electrically disengaged by the slowing and braking of the vehicle, not only is electrical energy saved, but this E-axle may become regenerative, whereby the re-engaged electric motor, as a result of its dual rotational design reverses polarity and becomes a generator of electricity, using the kinetic energy from the vehicle's slowing and braking to produce electricity, while also creating resistance and negative torque to the axle while in the process of generating electricity, thereby slowing and retarding the momentum of the vehicle through regenerative braking functionality. This regenerated electrical energy may be immediately transmitted back to the vehicle's ESDS, and ultimately back to the vehicle's batteries, significantly reducing the energy use of the vehicle, and extending the life of the vehicle's foundation braking system. Once slowing and braking ceases, and power is required, the autonomous systems of the vehicle's ESDS may instantly restore power and the generator again functions as an electric motor, supplying power to the driven E-axle for vehicle propulsion.

Preferably, E-axles that are non-driven-axles may have an integrated design, with the generator either attached to the middle of the E-axle, or may have two generators integrated into the hubs of the E-axle, although, as stated earlier, heavy truck suspension systems may not allow enough axle end space for a hub-mounted system. Non-driven E-axles with mid-axle generators may incorporate into their design a single rotational generator, which may only be engaged during brake regeneration when the vehicle slows and brakes; an inverter, a power management and distribution system; an integrated single speed electronic gearbox; an integrated external or internal cooling system; and non-driven E-axles may be designed with electronic differentials.

Non-driven E-axles may produce regenerated electricity the same way the driven E-axles produce electricity: the E-axle generator captures and absorbs the kinetic energy from the slowing and braking of the vehicle, and produces electrical energy that is transmitted back to the vehicle's ESDS, and ultimately back to the vehicle's batteries, while simultaneously slowing or retarding the momentum of the vehicle. The generator creates resistance in the E-axle (negative axle torque), and may extend the life of the vehicle's foundation brakes through regenerative braking functionality.

In the future, E-axles are expected to be continuously improved, and may be developed with fully integrated continuously variable-speed electronic transmissions, electronic torque vectoring differentials, and may become lighter weight, more efficient, longer-lasting, and less expensive to build and maintain. Other advantages of future E-axles include a more simplified and lighter weight E-axle design in which the motor, power controls, gear box and inverters are compact enough to be integrated into a dual hub-mounted design integrated into the hubs of the E-axles of heavy-duty commercial vehicles with 23,000 lb. capacity axles and suspension systems; however, it may be more likely that hub-mounted E-axles may be non-driven axles.

Constant change to the design and componentry of electric power generation and electric vehicle propulsion may be anticipated; however, the functionality of E-axles in electric-powered vehicles may not change, as motive power and electric energy regeneration are the primary functions of the E-axle.

As the design improvements and componentry of E-axles evolves the non-articulating single unit design of the present invention, as compared to existing articulating heavy truck designs, it may be expected that incorporating such design improvements into the vehicle of the present invention may be more timely, more practical and more effective.

The reference to Level 5 Autonomous Vehicle Architecture describes the controls for the performance and safety functions of the vehicle using on-board systems for such control. Level 5 is the point where the vehicle systems and controls may perform all vehicle functions without the interactions or assistance of a human; however, even as everyone's goal is to get to the point where self-driving commercial vehicles are a reality; however, it may be the decision of regulators to continue to require a human operator in the vehicle when any autonomous systems are engaged.

Preferably, the vehicle of the present invention, while under autonomous operating system control, and under very specific and controlled protocols, related to the safety of the public, the safety of the operator and the safety of the vehicle, may enable such system controls to be overridden by the on-board vehicle operator, such as when receiving internal or external autonomous system alerts to a fault or failure to any of the vehicle's critical functions, such as steering, braking, acceleration, tire air pressure, axle suspension or exterior lighting; or whenever the operator may be made aware of an imminent safety-related situation before the vehicle's autonomous system identifies and reacts to such situation. In these limited circumstances, the operator may be permitted to then override the vehicle autonomous operating systems and preemptively take manual control of the vehicle's critical systems in order to timely and effectively react to these safety situations. (At this point in the development of heavy truck autonomous systems, engineers and designers may be very close to achieving autonomous system functionality of Level 5, as the operational standards and performance requirements of Level 4 functionality are being tested and have apparently been met.

With these design benefits in mind, the need for government incentives to speed the movement away from greenhouse gas emissions may also be significantly reduced, taking a significant step in the direction of improving air quality. Additionally, reducing highway injury and death may be the most significant benefit resulting from the introduction and use of the vehicles of the present invention. Secondary goals, but still important goals, may include improving supply chain performance, creating a very positive effect on the chronic truck driver shortage, and reducing the cost of commercial transportation.

Current articulating tractor-trailer configurations may fall short as a result of having a separate trailing vehicle as part of the combination, where the coupling to such trailing vehicle must be performed manually, connecting high and low voltage wires, compressed air lines, and camera, telematic and radar signal wires, and manually done every time the trailer is connected and disconnected from the tractor, subjecting all vital elements for successful Level 5 functionality to a manual operation, and making it almost impossible to consistently insure a fail-safe environment where the tractor-trailer connections mentioned above are continuously subjected to coupling failures from improper coupling procedures, damaged seals, contamination from dirt, moisture, salt, ice, and the ever-present possibility that these loose lines and hoses may get snagged or cut or disconnected as they may be dangerously exposed in the open and pivoting space between the tractor and trailer.

To underscore the design advantages of the preferred embodiment of the present invention, as compared to conventional tractor-trailer combination vehicles, the American Trucking Association (ATA) and the International Society of Automotive Engineers (SAE), at their February 2020 Annual Meeting and Transportation Technology Exhibition, addressed this specific issue within the broader context of: "The Confluence of a Number of Technical Events and Needs Assessments", and with that 'overlay' the focus of the Third Annual Truck Maintenance Council of the ATA-SAE Symposium was: "The Combination Vehicle as a Connected Whole", where the stated purpose was to discuss the inherent limitations of connectivity, communications and integrated systems in tractor-trailer combinations, and the need to overcome such limitations as the evolution of autonomous vehicle systems accelerates.

In its 4th Quarter 2022 Edition, "Calibrate", The Quarterly Magazine for Equipment and Maintenance Executives, highlighted this problem of connectivity between tractors and trailers, in an article titled: 'Down to the Wire'. Several quotes from this are as follows:

Robert Braswell, Executive Director of the American Trucking Association Technology and Maintenance Council, referring to the tractor-trailer connectivity, made these comments: 'maintaining the cables requires frequent attention; they are wearable items, not durable ones. You're going through them like crazy, if for no other reason than sometimes you forget to hook them up and they get dragged down the road, or they get improperly connected, or they are unmated in a rough way for some reason.' Braswell goes on to say: 'Somebody forgets to disconnect when they do the separation; there's all sorts of ways you can damage these things. In the same publication, same edition, Mike Grima, Vice President of Equipment Services for Yellow Freight, (a publicly-held $5 billion motor carrier) referring again to tractor-trailer connectivity, says: 'fleets are in a constant battle with corrosion-causing moisture. The problem is made worse by magnesium chloride, which is used to treat roadways for ice and snow; it draws moisture from the air; once it gets into a wiring harness it acts like a sponge and can wick upstream or downstream, causing corrosion further down the line.'

Level 5 Autonomous Vehicle Architecture installed on the three (3) and four (4) axle non-articulating configurations, and where applicable five (5) axle configurations, of the present invention becomes far more reliable as all elements of the controls are hard-wired, permanently plumbed and enclosed in protective carriers, making certain that camera and radar connectivity, signal sensors, telematics, brake and steering controller connectivity, low and high voltage electric connectivity and compressed air may all be located in a secure and accessible environment, permanently plumbed, hard wired, routed securely through the web of the vehicles 'C' channel frame and through the web of the 'I' bean cross-members that may be attached to the interior web of the 'C' channel frame, and where applicable, built into heated enclosures.

In a preferred embodiment of the invention, an integrated, non-articulating commercial vehicle is provided with a vehicle cargo body having at least four steerable axles, and a cab that does not pivot relative to the vehicle body. The vehicle has a battery-electric-powered or hydrogen-electric-powered propulsion system, and the vehicle body has a center of gravity that may be substantially lower than a center of gravity for an articulating tractor-trailer combination commercial vehicle with a comparably-sized vehicle body. When turning, the vehicle has a maximum wheel track width which may be substantially less than the maximum wheel track width of an articulating tractor-trailer combination commercial vehicle with a comparably-sized overall length and performing an identical turning maneuver.

With this embodiment, the vehicle's frame, axles, brakes, suspension, tires and wheels are rated for a GVWR of at least 80,000 pounds. The vehicle has a wheelbase of at least 51 feet, an overall body length of at least 62 feet, a cab length of at least 5 feet, a cargo body length of at least 57 feet, and an energy space of at least 74 lineal feet. Measured from the center of the vehicle, there are at least two forward steerable axles and at least two rear steerable axles, with one or more of the rear steerable axles being driven by a battery-electric or hydrogen-electric propulsion system, and when at least two of the rear steerable axles are driven, the axles may be driven independently. Additionally, either of the two driven axles may be automatically engaged or disengaged by autonomous operating systems of the vehicle. When disengaged, where such action may be based upon the demand for motive power, and such demand may be related to one or more of the following parameters: gross weight of the vehicle; wind; road surface; road grade and ambient temperature, whereby when such demand is reduced, the autonomous operating system may facilitate an extension of the vehicle's operating range by powering only a single driven axle.

Also in this embodiment, the vehicle may have electric all-wheel steering, includes wheels with single-wide-based tires at all axle positions, and may have a substantially increased cargo volumetric capacity and longer cargo floor space as compared to 53-foot-long trailers most commonly operated on public roadways using an articulating tractor-trailer combination commercial vehicle.

Further, with this embodiment, the vehicle may have a substantially increased weight-carrying capacity in relation to an articulating tractor-trailer combination commercial vehicle with a comparably-sized vehicle body and a comparably-sized battery-electric or hydrogen electric propulsion system. A top portion of the vehicle may include solar panels used to power refrigeration and heating inside the vehicle cargo body, or used for reserve power. The vehicle body may include multiple ESDS locations providing power for battery-electric or hydrogen-electric systems; the ESDS may be housed in one or more undermount spaces located near a center of the vehicle, enabling the vehicle to function with a dual axle drive system where each drive axle may be operated independently. The vehicle may also include hard-wired electric braking systems, hard-wired electric steering systems to all wheels, hard-wired electric air compressors and hard-wired electric E-axles for energy regeneration and regenerative braking from all axles and wheels.

With this embodiment, the vehicle may include electric air compressors directly supplying permanently plumbed compressed air to air tanks supplying compressed air to pneumatic load-leveling suspension systems at all axles, and for compressed air to tire air pressure management systems for all tires.

Preferably, the vehicle uses no hydraulic power and no hydraulically-functioning control systems.

Preferably, the vehicle of the present invention may have a lower, or at least similar drag coefficient to that of an articulating tractor-trailer combination commercial vehicle having a trailer with a comparably-sized overall length to that of the vehicle body of the non-articulating vehicle, including such comparative articulating combination vehicles that may be designed with the most functional and efficient aerodynamic componentry in regular use today.

Additionally, with respect to aerodynamics, and referring now to FIGS. 1-5 and 8, a preferred embodiment of the vehicle of the present invention is shown, and includes a front-mounted electric cargo refrigeration/heating system 4. This vehicle may have an overall length of at least 64 feet, with the operator's compartment 3 lengthened to seven (7) feet, and by removing the front-mounted cargo refrigeration/heating system, or by redesigning and recontouring the front-mounted cargo refrigeration/heating system to conform to the reshaped frontal area, may provide a more aerodynamically effective frontal area for maximum air-flow efficiency over the roof and over the sides of the vehicle. The operator's seat may be relocated to the center of the operator's compartment, enabling the front radius corners to be made wider, and reshaped, for maximum air-flow efficiency along the sides of the vehicle. Additionally, a molded, high-impact aerodynamically shaped front bumper cover 7 may be provided to facilitate air flow around the vehicle, rather than under the vehicle.

An electric, hard-wired, rear-mounted cargo lift, either in the design of a vertical rail-lift, or a horizontal tuck-under lift, may be employed which, during operation, regenerates electricity back to a source of energy production.

All of the axles may have compressed air suspension systems controlling axle weight equalization and frame height control, and the compressed air may originate from a permanently-plumbed pneumatic system with a redundant backup.

Preferably, the vehicle facilitates adoption of Level 5 autonomous vehicle architecture using hard-wired electrical connectivity for all autonomous system functionality, powered by high and low voltage electricity, including electric all-wheel steering, electric E-axles and electromechanical dual-disc or electromagnetic foundation braking systems at all eight wheels. The vehicle preferably may utilize permanently-plumbed pressurized pneumatic connectivity for tire inflation management systems and pneumatic suspension systems.

In one preferred embodiment, the vehicle may have a GVWR allowance of an additional 2,000 pounds to account for the extra weight of the battery-electric propulsion system.

Preferably, a vehicle with a single driven E-axle may be provided, and other than when in regenerative mode, may be constantly engaged to facilitate extending the vehicle's operating range when vehicle weight, terrain or weather may not be material adverse factors, reducing energy use, maintenance costs and weight.

In another preferred embodiment of the present invention, an integrated, non-articulating commercial vehicle with a cab and a vehicle body configuration is provided. The vehicle's frame, axles, brakes, suspension, tires and wheels are rated for a GVWR of at least 60,000 pounds, and the vehicle may have at least three steerable E-axles, all with rated capacities of at least 23,000 lbs., including a front axle, an intermediate axle, and a rear axle, a wheelbase of between 32-39 feet, a body length of between 53-60 feet, and an energy space of at least 64 lineal feet. Any one, or any two, of the three steerable axles may be driven by a battery-electric or hydrogen-electric propulsion system, and all driven axles are preferably E-axles designed to regenerate electricity when the vehicle brakes and slows. When two axles are driven, with either battery-electric or hydrogen-electric propulsion systems, the axles may be driven independently, such that either of the two driven axles may be automatically engaged or disengaged by autonomous operating systems of the vehicle, where such action may be based upon the demand for motive power, and such demand may be related to one or more of the following parameters: gross weight of the vehicle wind; road surface; road grade; and ambient temperature; or when such demand may be reduced enabling the vehicle's autonomous operating system to facilitate extending the vehicle's operating range by powering only a single driven axle. With this embodiment, the cargo body length may be between 48-55 feet, and the energy space is between 64-78 lineal feet.

In this preferred embodiment, all axles are steerable E-axles and all axles are either driven (powered) E-axles or non-driven (unpowered) E-axles.

Preferably, in this preferred embodiment, the vehicle may be powered by driven E-axles that have the same design and functionality of the powered E-axles of the preferred embodiment of the present invention.

When the vehicle is slowing and braking the power from the electric motor stops and the polarity of the motor is reversed, and the motor instantly becomes a power generator, with a dual purpose: converting the kinetic energy from the slowing and braking of the vehicle into electrical energy regeneration, and creating resistance (negative torque) within the E-axle, that retards and slows the momentum of the vehicle, which may assist the functionality of the foundation brakes, and may extend the life of foundation braking components.

Non-driven E-axles of this preferred embodiment with mid-axle located electrical components preferably incorporate a single-polarity generator which may only be engaged during regenerative braking, a power management and distribution system, an inverter, a single-speed electronic gear box, an internal or external cooling system, and may also incorporate an electronic differential, all integrated directly into the non-driven E-axle.

In a regenerative braking mode, the non-driven E-axle also preferably has the same dual role: applying the kinetic energy from the vehicle's slowing and braking into the generator's internal rotation to generate electricity, while also using the resistance in the generator to create resistance in the E-axle, effectively retarding the momentum and slowing the vehicle. During regeneration, the regenerative electric energy may be immediately converted and transmitted back to the vehicle's ESDS, and ultimately back to the vehicle's batteries. Once power is again directed to the driven E-axle(s) the regenerative braking function of the non-driven E-axle immediately ceases and the vehicle's autonomous operating system electronically disengages the non-driven E-axle generator.

Future refinements and improvements to E-axle design and functionality referenced earlier may also apply to the powered and unpowered E-axles incorporated into this preferred embodiment.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"E-axle" means a steerable electronic axle, whether driven or non-driven, where electricity from the vehicle's batteries supplies power and/or receives power from an electric motor/generator that is attached and integrated into the E-axle; and "Energy space" means the amount of open and available at or below top-of-frame linear space for all componentry responsible for the production of all energy requirements of the vehicle, consisting entirely of electric energy and compressed air energy.

"Integrated" means the cab and vehicle body are built as a single unit. "Non-articulated" means the vehicle body does not pivot relative to the cab, which is the case with articulating tractor trailer combination vehicles; and conversely, "articulating" means at least two separate vehicles coupled together at a single hinge-point.

"Aerodynamic" means the objective measure of air flow resistance and/or efficiency related to the vehicle's overall shape and the shape of the vehicle's componentry.

BRIEF DESCRIPTION OF THE DRAWINGS

The novel features which are characteristic of the invention are set forth in the appended claims. The invention itself, however, together with further objects and attendant advantages thereof, may be better understood by reference to the following description taken in connection with the accompanying drawings, in which:

FIGS. 21A-21C illustrates the maximum wheel track width for: the combination tractor-trailer shown in FIG. 16 (21A); the vehicle shown in FIG. 18 (30-feet into a 90-degree turn, 21B); and the vehicle shown in FIG. 18 (50-feet into a 90-degree turn, 21C).

Figure 1:
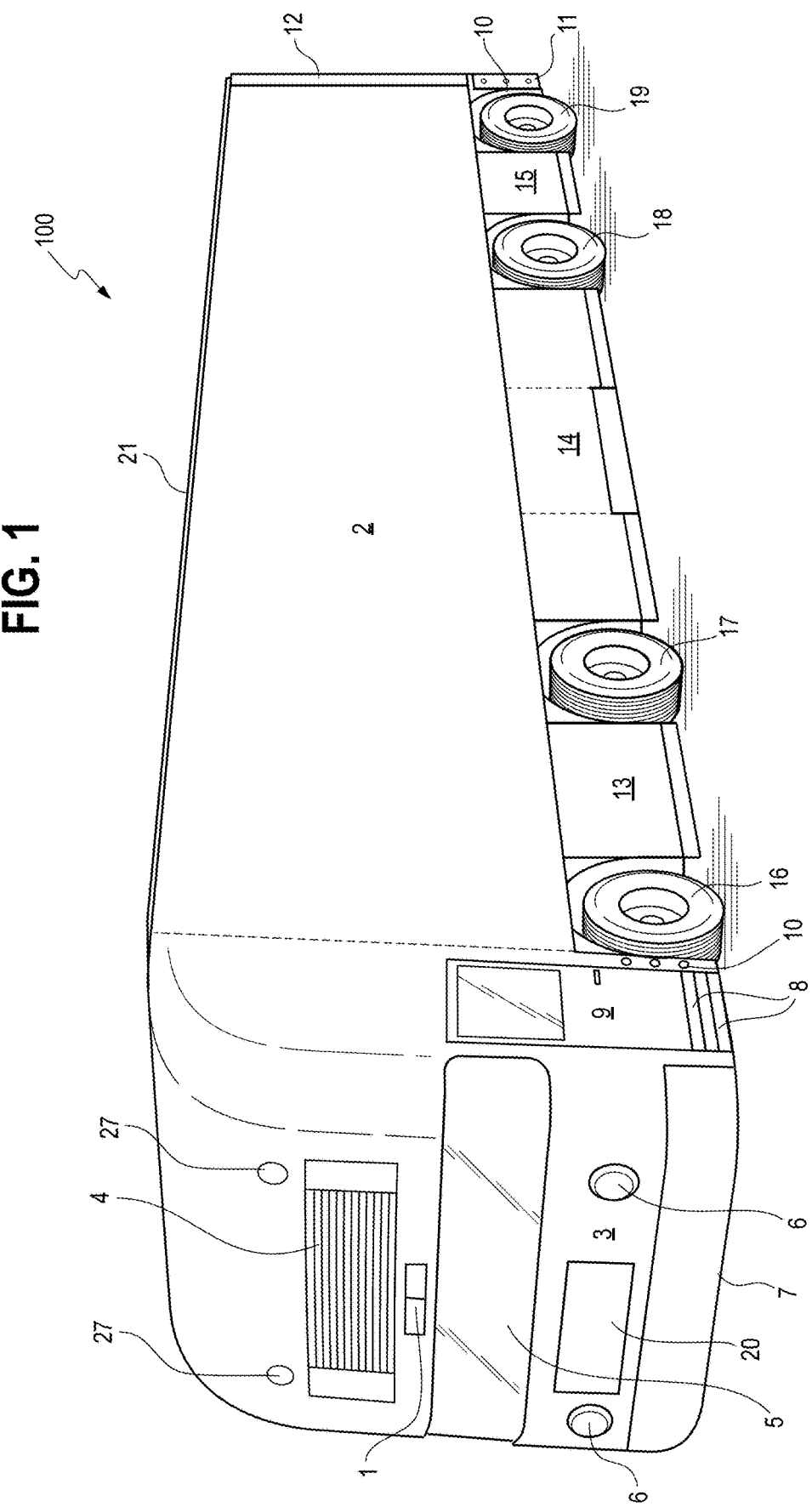
FIG. 1 is a front and left-side perspective view of a preferred example of the commercial vehicle of the present invention, with an 80,000 lb. GVWR.

The components in the drawings are not necessarily to scale (other than FIGS. 16-20, which are drawn to scale), emphasis instead being placed upon clearly illustrating the principles of the present invention. In the drawings the referenced numerals designate corresponding parts throughout the several views, and referenced letters in such drawings designate specific component dimensions of the exemplary examples of the present invention.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

The present invention specifically refers to commercial vehicles with integrated, non-articulating vehicle bodies (i.e., there is no separate cab/tractor, and the operator compartment and vehicle body are a single, integrated unit). Referring first to FIG. 1, a preferred example of the present invention is shown, which is a four-axle, 80,000 lb. GVWR vehicle that is 62 feet in overall length. In this example, motive force is supplied by battery-electric or hydrogen-electric propulsion systems to the two 23,000 lb. maximum capacity rear axles ("drive axles") identified as 18A and 19A (see FIGS. 1, 2, 5 and 7), while the front two 23,000 lb. maximum capacity axles 16A, 17A, more closely adjacent to the operator's compartment 3 (FIGS. 1 and 8), are non-driven axles. (Tires 16-19 correspond to axles 16A-19A.) Preferably, all four axles 16A-19A are fully-functional steerable E-axles.

None of the drawings in FIGS. 1-10 are drawn to scale; however, where measurements are indicated, such measurements are exact.

Referring to FIGS. 1-10, the commercial vehicle of the present invention shown in those drawings has the following reference numerals corresponding to the following components:

1: forward-looking sensors, cameras and radar;
2: cargo body;
3: operator's compartment;
4: electric cargo refrigeration/heating system;
5: windshield;
6: adaptive laser-diode headlights;
7: aerodynamic front bumper;
8: steps to operator's compartment;
9: door to operator's compartment;
10: front, rear and side-looking sensors, cameras, radar and marker lights;
11: rear crash underride protection (also the location of undermount tuck-a-way or glide-under electric cargo lifting device, if such device is specified);
12: rear door frame (also the location of rear frame mounted electric rail-lift cargo lifting device, if such device is specified);
13: forward undermount space;
14: middle, and primary undermount space for vehicle propulsion ESDS (Energy Storage and Distribution System) components for propulsion);
15: rear undermount space;
16-19: front (16-17) and rear (18-19) tires;
16A-19A: front (16A-17A) and rear (18A and 19A) axles
20: front access panel;
21: solar panels
22: primary portal for access to propulsion, non-propulsion, communication and Level 5 controls, opposite operator entrance door 9
23: rear undermount space
24: middle undermount space
25: front undermount space
27: front LED marker lights.
28: top and bottom LED rear marker lights and stop-and-turn lights;
29: manual or electric roll-up rear door (rear swing-type doors rather than roll-up doors may be used);
30: rear-looking sensors, cameras and radar.

Referring now to FIGS. 1, 4, 5 and 7, undermount spaces 14 and 24 are identical in size and house only ESDS componentry used for vehicle propulsion. Such componentry, identical to each such space, may include high voltage battery packs, TMS (thermal management systems) to manage the temperature of the batteries, high voltage power distribution controllers, inverters, high voltage charging controllers, charging ports, and junction boxes for high voltage wire distribution.

The electric drive motors that are powered by this ESDS componentry need not be located in these spaces, but are preferably directly attached to the rear driven electric E-axle.

If propulsion is provided by hydrogen-electric, the battery-electric componentry identified in the paragraphs directly above may be replaced with compression or insulated tanks for gaseous or liquid hydrogen fuel cells, and all other related componentry for such vehicle propulsion.

Undermount spaces 13 and 25 (see FIGS. 1, 4, 5 and 7) house ESDS for non-propulsion functions of the vehicle, which may also include the battery packs, TMS, inverters, AC/DC converters, power distribution controllers, charging ports, high and low voltage charging controllers, electric air compressors, and junction boxes for high and low voltage wire distribution.

The ESDS housed in undermount spaces 13 and 25 may be used to provide power for electronic braking systems and electric steering systems for the two forward axles, power for the HVAC system in the operator's compartment, power for front and side lighting, power for autonomous system controllers, power for on-board camera and radar systems, telematics, communication systems, reserve power for the cargo heating/refrigeration system, and power for all other miscellaneous items in the operator's compartment, such as wipers, windows and seating controls.

Preferably, undermount spaces 13 and 25 share two (2) electric air compressors (which may be mounted outside the vehicle's 'C' channel frame), two (2) compressed air supply tanks, and two (2) compressed air service tanks (with all four air tanks mounted inside the vehicle's 'C' channel frame), providing compressed air energy for the load-leveling and ride-height control suspension systems for the two forward axles and for the tire air pressure management systems for the four tires on the two forward axles.

To enable autonomous system controllers to manage the safety, security and effectiveness of the pneumatic suspension system and the pneumatic tire inflation system, both air compressors and all four (4) compressed air tanks may be directly and permanently plumbed sequentially. During normal operations, the autonomous systems of the vehicle may engage one (1) air compressor, one (1) supply tank and one (1) service tank as the primary components that provide all necessary compressed air system management for the two (2) front axles and four (4) front tires. The second air compressor and the second service and supply tanks may only be engaged as back-up, or reserve compressed air systems, and may become immediately functional in the event any part of the primary system indicates pressure loss or failure. The autonomous system design may control which pneumatic components may be primary, and which may be secondary, and may be designed so that all components may alternate between primary and secondary on a regular and scheduled basis to assure uninterrupted pneumatic system functionality.

Undermount spaces 15 and 23 (see FIGS. 1, 4, 5 and 7) may be exactly the same size as undermount paces 13 and 25, and may also house ESDS and related pneumatic and electric components for managing autonomous systems, rear lighting, communications, camera and radar systems, steering, suspension, braking and tire inflation for the rear two axles and the four rear tires. Two electric air compressors, mounted outside the vehicle's 'C' channel frame, and four pressurized air tanks (all mounted inside the vehicle's 'C' channel frame) may provide both the primary and back-up (reserve) compressed air suspension system and compressed air tire inflation system management as described in the preceding paragraph. Additionally, undermount spaces 15 and 23 may house ESDS components that control the electric roll-up rear door and high-capacity electric cargo rail-lift located at the rear of the cargo body.

As discussed above, current heavy vehicles in common use today may utilize pneumatic compressed air energy for foundation brake systems and parking brakes; however, the preferred vehicle of the present invention may use a dual-disc electromechanical or electromagnetic foundation braking system, with integral hard-wired electronic actuators and controllers, not only assuring effective and reliable autonomous system management of roll-stability, anti-lock braking, directional stability, automatic emergency braking and traction control, but may also assure safe and reliable parking brakes.

Preferably, all driven and non-driven axles are (electric) E-axles providing energy regeneration from slowing and braking of the vehicle. Brake systems at all wheels may be electromechanical dual-disc or electromagnetic foundation braking systems with direct wired integral electronic brake actuators and controllers. As earlier stated, fully electronic electromechanical, or electromagnetic, foundation braking systems may become a required component of Level 5 Autonomous Systems, as such braking systems may both be safer and more efficient.

Figure 2:
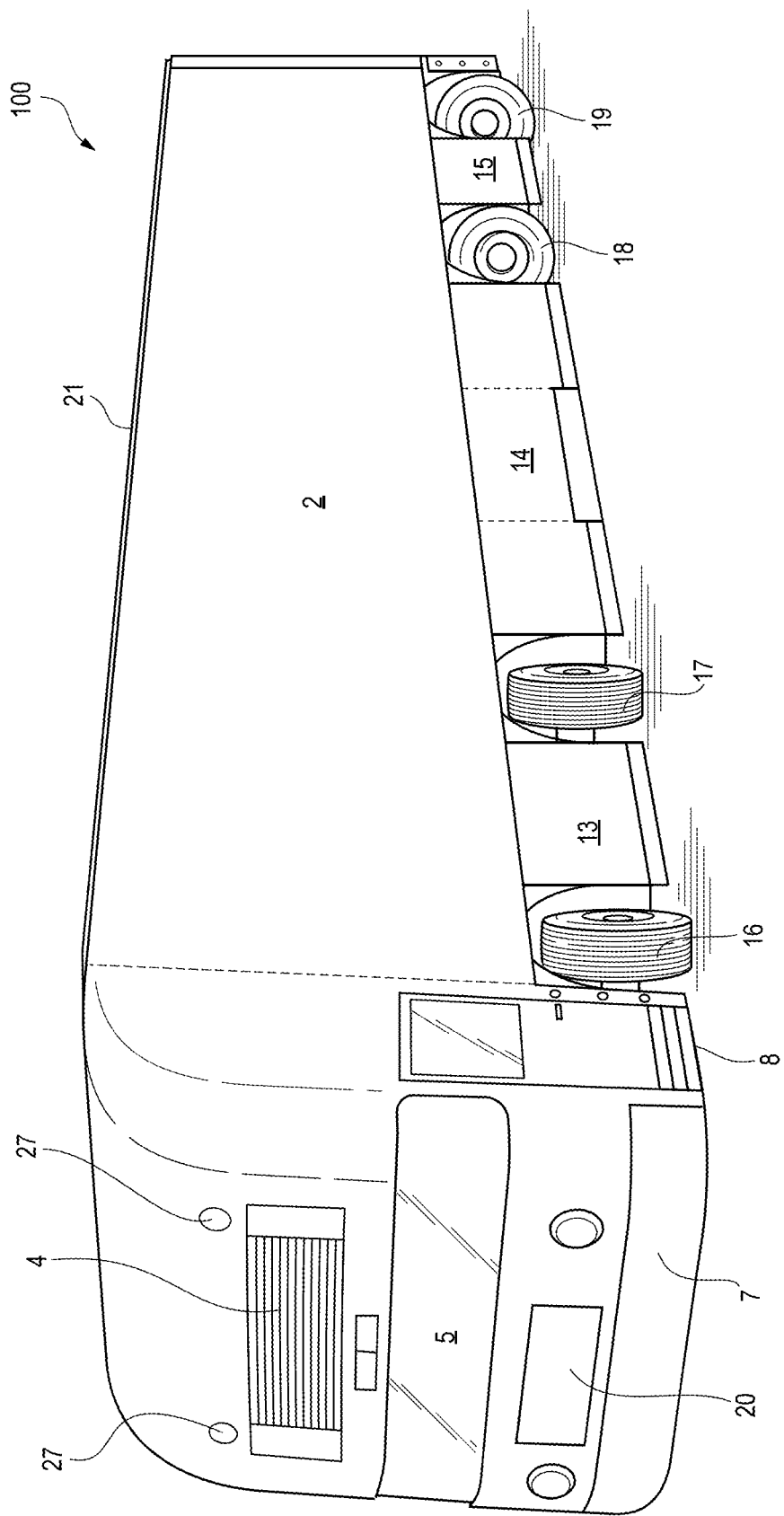
FIG. 2 is a view similar to FIG. 1 with the vehicle executing a left-hand turn.
Figure 3:
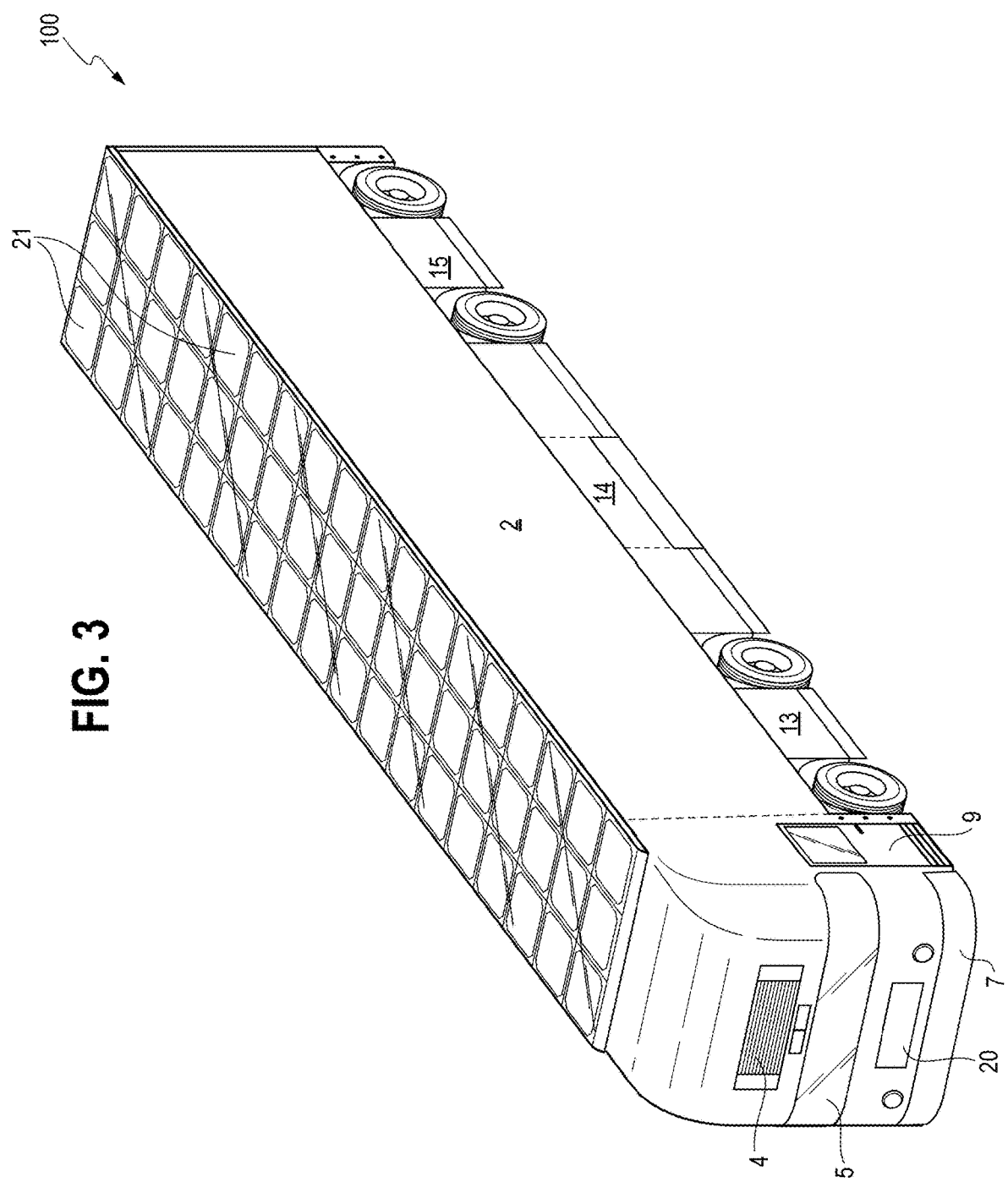
FIG. 3 is a top and left-side view of the vehicle shown in FIG. 1.

Referring to FIGS. 2 and 3, FIG. 2 illustrates the vehicle of the present invention executing a left turn with all wheels in steering mode. FIG. 3 illustrates the top of the vehicle body, including solar panels 21, designed to provide power for electronic refrigeration/heating of cargo body 2, and for reserve electric power if the vehicle is not equipped with an electronic cargo refrigeration/heating system.

Figure 4:
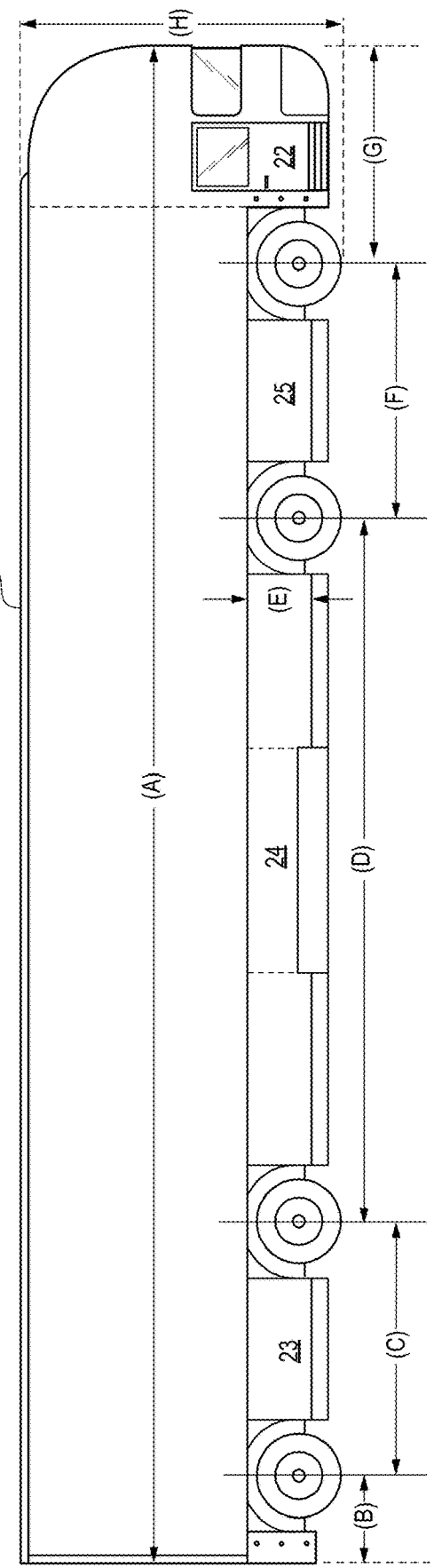
FIG. 4 is a right-side view of the vehicle shown in FIG. 1.

FIG. 4 shows the right side of the vehicle, including three undermount spaces 23, 24 and 25, which may be designed to be exactly the same size as undermount spaces 13, 14 and 15. Undermount spaces 23, 24 and 25 may contain ESDS components that perform identical functions to the functions performed with the ESDS components housed in undermount spaces 13, 14 and 15, as earlier described.

Referring now to FIG. 4, curbside access door 22 is located on the opposite side of access door 9 in the operator's compartment. With the elimination of engines, transmissions and driveshafts, and with direct access to the vehicle's 'C' channel frame, such access door is preferably designed for quick and secure access to all hard-wired and secured electrical and pneumatic system componentry for all propulsion, non-propulsion, communication, and Level 5 system controls, all hard-wired and plumbed through the vehicle's 'C' channel frame and housed or controlled from the operator's compartment. Access door 22 may also provide space for a temporary passenger seat.

Still referring to FIG. 4, exemplary exterior dimensions for the illustrated non-articulating vehicle of the present invention include: (A): 62 feet; (B): 44 inches; (C): 10 feet; (D): 31 feet; (E): 30 inches high for the middle 15 feet, and 36 inches high for each 6 foot wide section on either side of the middle 15 feet, identical as to both sections 14 and 24, and 36 inches high for sections 13, 15, 23 and 25; (F): 10 feet; (G): 7 feet 4 inches; and (H): 13 feet 6 inches.

Figure 5:
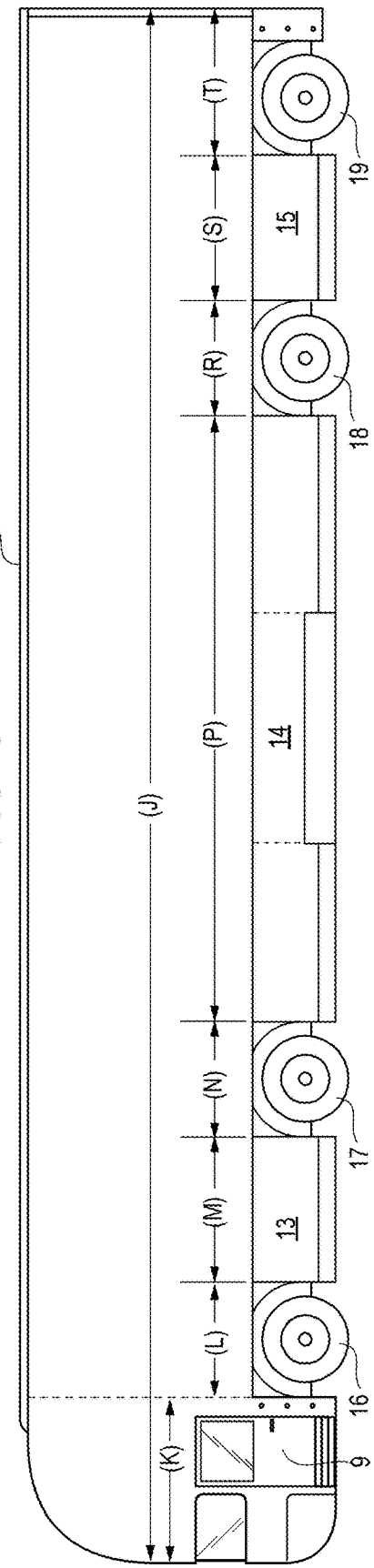
FIG. 5 is a left-side view of the vehicle shown in FIG. 1.

Referring now to FIG. 5, exemplary exterior dimensions for the non-articulating vehicle of the present invention include: (J): 62 feet; (K): 60 inches; (L): 56-inches; (M): 60 inches; (N): 56 inches; (P): 27 feet; (R): 56 inches; (S): 60 inches and (T): 72 inches.

Figure 6:
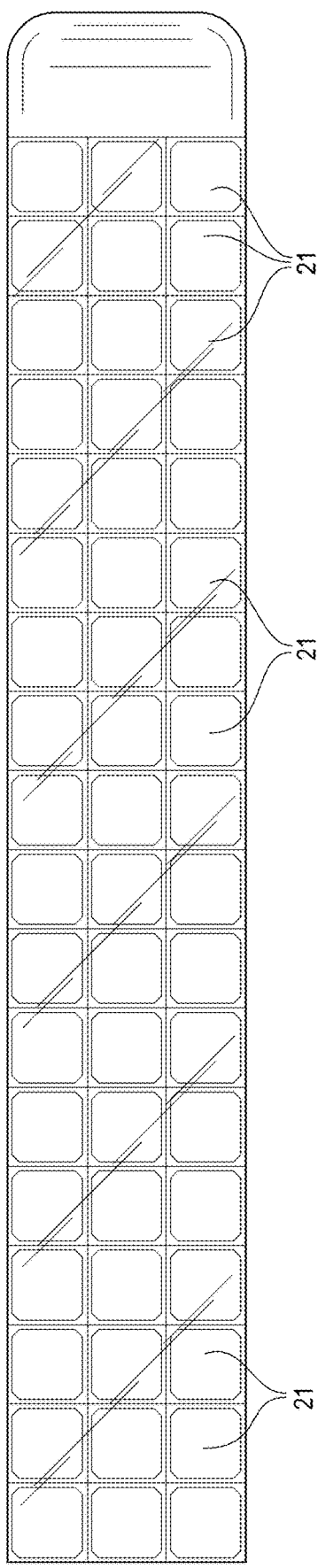
FIG. 6 is a top view of the vehicle shown in FIG. 1.

Referring to FIG. 6, solar panels 21 may be installed on the top of the entire length of the vehicle, except for three (3) feet at the front of the vehicle where the roof is contoured into an aerodynamically-shaped section. In a configuration of the vehicle where no front-mounted refrigeration/heating system 4 is in-place, and where the shape of the front of the roof may then be more aerodynamically contoured, curved solar panels 21 may be an option to cover such roof contours.

Figure 8:
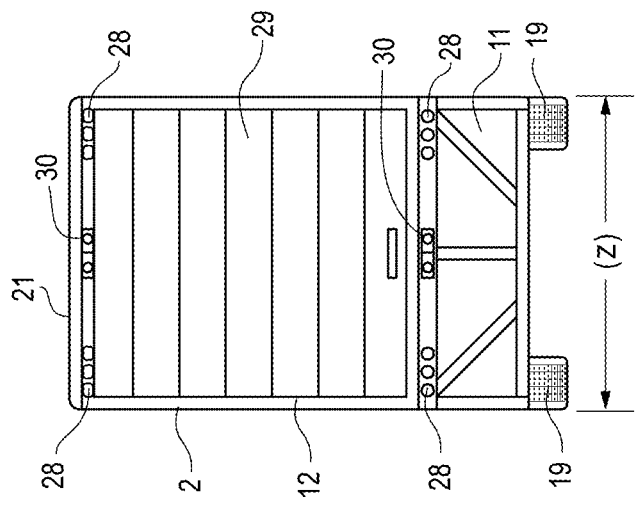
FIG. 8 is a front view of the vehicle shown in FIG. 1, and is also a front view of the vehicle shown in FIG. 10, and a front view of the vehicle shown in FIG. 11.

The solar panels may be designed to supply electrical power to the front-mounted cargo refrigeration/heating system 4 (see FIGS. 1 and 8). If the vehicle is not equipped with a cargo refrigeration/heating system, the energy supplied from the roof-mounted solar panels may provide direct and back-up power for the ESDS in undermount spaces 13 and 25.

Figure 7:
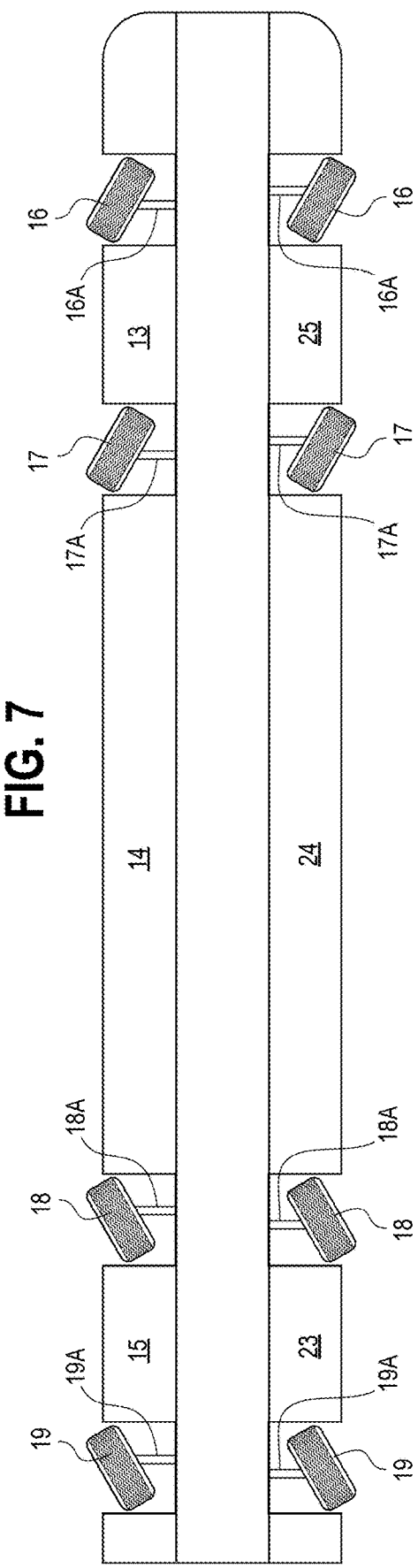
FIG. 7 is a bottom view of the vehicle shown in FIG. 1.

FIG. 7 shows the underside of the vehicle, identifying all eight tire and wheel positions, and all four axle positions (axles 16A-19A, tires 16-19), during execution of a right turn. FIG. 7 also shows the bottoms of the undermount spaces (13-15, 23-25) identified earlier (see FIGS. 1, 4 and 5).

FIG. 8 shows the front of the vehicle. FIG. 8 also illustrates the front of the three-axle configurations of the present invention. FIG. 8 also shows the exterior width at the front of the vehicles, (Y), which in the preferred example is 8 feet, 6 inches.

Figure 9:
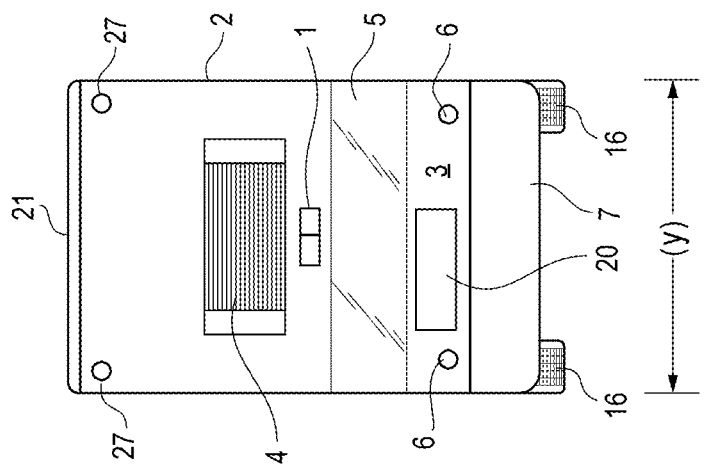
FIG. 9 is a rear view of the vehicle shown in FIG. 1, and is also a rear view of the vehicle shown in FIG. 10, and a rear view of the vehicle shown in FIG. 11.

FIG. 9 shows the rear of the vehicle. FIG. 9 also illustrates the rear of the three-axle configurations of the present invention. FIG. 9 also shows the exterior width at the rear of the vehicle, (Z), which in the preferred example is 8 feet, 6 inches.

The vertical dotted line at FIGS. 1, 2, 3, 4, 5 and 10 is the location of an interior bulkhead that separates the operator's compartment and the front-mounted cargo heating/refrigeration system from the cargo body, and also identifies where the undermount spaces 14, 24 and 32 are each modified into three separate undermount spaces to indicate where ground clearances may be increased at the middle sections of such spaces.

Figure 10:
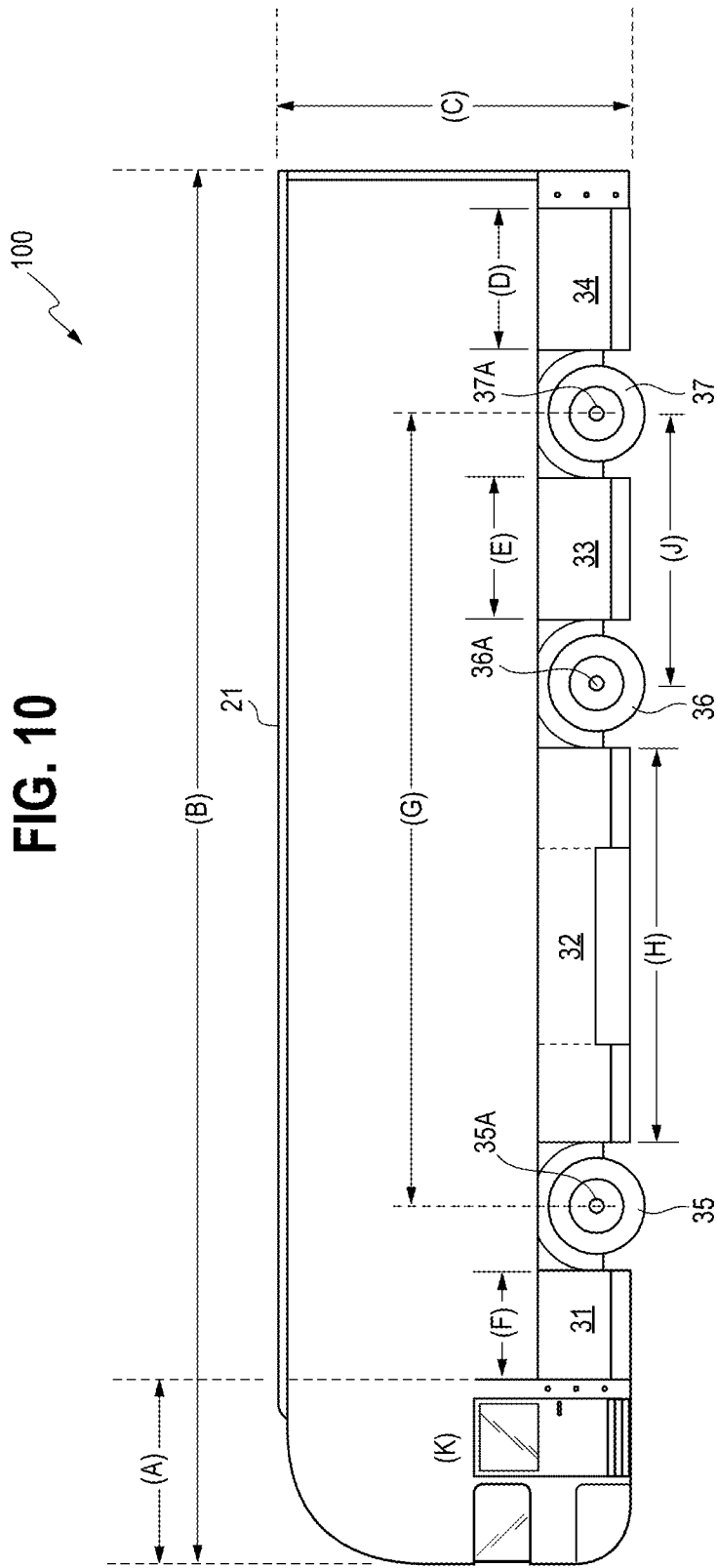
FIG. 10 is a left-side view of the first exemplary alternative example of the present invention, a commercial vehicle with a three-axle, 60,000-lb. GVWR.

FIG. 10 is an exemplary alternative example of the present invention, and illustrates a three-axle, 60,000 lb. GVWR commercial vehicle designed with a single forward non-driven steer axle, and two rear-driven steer axles, designed as an alternative to three-axle and four-axle articulating combination vehicles and 3-axle straight (non-articulating) trucks. This alternative example is described in more detail below.

Throughout this disclosure, the propulsion system specified is battery-electric based on the premise that automotive batteries may continue to become lighter, more powerful and longer-lasting, and that remote (wireless) charging technologies may be developed; however, should either such premise prove premature, persons of ordinary skill in this art will understand and appreciate that a hydrogen-electric propulsion system may be an appropriate and effective alternative used on the three-axle and four-axle configurations, as there may be more than enough space under the cargo body and between the axles for all required hydrogen-electric systems, including pressure tanks or insulated tanks for the hydrogen in gas or liquid form (liquid form to be the most likely form of hydrogen rather than gas) and hydrogen fuel cells and related componentry. The space for such tanks on both three-axle and four-axle configurations may be no less than twice the space that would be available on two-axle or three-axle tractors used in current articulating combination vehicles; additionally, for extended range, supplemental tanks for liquid hydrogen may be safely and securely mounted inside the vehicle's 'C' channel frame as there is ample space, with no restrictions other than well-spaced frame crossmembers and closely-spaced compressed air tanks fore and aft of the undermount spaces 14 and 24 in the four axle configuration, and fore and aft of undermount space 32 in the three-axle configuration.

Propulsion systems for the three-axle configuration may be either battery-electric or hydrogen electric as the longer wheelbase version of this configuration provides enough undermount space and cargo space to be adaptable to longer distance operating areas.

Preferably, the commercial vehicle of the present invention in the 4-axle 80,000 lb. GVWR configuration may have the following design features and benefits as compared to five (5) axle articulating combination vehicles:

1) a design with zero-carbon-emission propulsion, a fully-electric powertrain, fully electric steering and fully electric braking, consisting of a vehicle design that may provide an alternative to articulating-configured commercial vehicles, in a 4-axle configuration that may be built with overall lengths of 62 to 72-feet;
2) a design that may enable immediate integration into Level 5 Autonomous Vehicle Architecture with the electrical and compressed air connectivity advantages of a single non-articulating design;
3) a design that may provide increased volume capacity with (e.g.) a minimum 57-feet of cargo body space versus 53-feet in trailer cargo body space in common use today, and increased load capacity by reducing the unloaded weight through the elimination of the tractor, fifth wheel, upper (trailer) coupler, landing gear and the fifth axle;
4) a design where all four axles may function as steerable E-axles, which may enable the present invention to be more maneuverable and more stable, with a narrower turning radius with counter-phase four-axle steering, less body roll on horizontal curves, using 'in-phase' four-axle steering where at highway speeds all eight wheels steer in the same direction, to execute quicker steering response, to execute faster and safer lane changes, to maintain perfect in-line tracking and to execute turns inside a narrower wheel path;
5) a design that may be easily reconfigured into a longer configuration without changing the location of the four axles;
6) a design that may be built as a vehicle with temperature control systems for carrying perishable and/or sensitive commodities, or built as a vehicle for carrying non-perishable general commodities;
7) a design where a fifth steerable non-driven E-axle may be added to the vehicle without affecting maneuverability, stability, safety or autonomous system functionality, while increasing the GVWR of the vehicle to greater than 82,000 lbs.; additionally, the fifth axle may be located behind the rearmost axle, increasing the vehicle's wheelbase, or located ahead of the rearmost axle, affecting no change to the vehicle's wheelbase;
8) a design that may eliminate potential trailer tracking problems inherent in articulating combination vehicles by eliminating the hinge point;
9) a design that may be more stable with a lower center-of-gravity than traditional tractor-trailer combination vehicles having a propulsion system only in the tractor, thereby having little relative mass under the cargo body to offset the weight of the cargo in the trailer section, versus the present invention where the ESDS components may be located at the center of the vehicle, directly under the cargo body, whereby this lower center of gravity and absence of a pivot point insures that vehicle roll-overs are improbable and jackknifes impossible;

10) a design that may be built with an electromechanical dual-disc or electromagnetic foundation braking system, with integral hard-wired brake actuators and controllers for wheel-specific autonomous system management of roll-stability, directional-stability, traction-control, anti-lock braking and automatic emergency braking functionality, assuring almost perfect braking balance and braking control at all eight-wheel positions. Under all braking situations and conditions, shorter stopping distances, and better vehicle control may be expected, relative to comparable 80,000 lb. GCWR combination vehicles with air-brake systems in common use today, where such combination vehicles may have inherent delays in trailer brake actuation, leading to longer stopping distances, and unsafe trailer-tracking during a panic braking, with the inherent potential for jackknifes and roll-overs;

11) a design that may maximize payloads where all four (4) axles may have weight equalizing suspensions systems, with all axles placed directly under the cargo body, unlike traditional articulating vehicles where steer axle loads may have inherent limits to the amount of weight such axles may carry;

12) a design that may achieve more efficient energy use for greater operating range with: a) safer, more secure, larger and more accessible design for both compressed air energy and electrical energy production, storage and distribution components (ESDS); b) ESDS components sized for the ability to function with a dual-drive system where only one drive axle may be engaged under normal driving conditions; c) a minimum of 472 sq. ft. of solar panels on the roof of the vehicle; d) better body aerodynamics; e) no tractor-trailer gap increasing aerodynamic drag; f) and reduced rolling resistance with 8 wide-based single tires in-use, versus the 10-18 tires in-use on 80,000 lb. GCWR combination vehicles in common use today; and g) designed with steerable E-axles, preferably at all axle positions, for energy regeneration by capturing kinetic energy from the vehicle slowing and braking, preferably generated by both driven and non-driven E-axles;

13) a design that may be durable, inexpensive to build, and inexpensive to maintain, with safe and direct access to all ESDS components, with one less axle, at least two less tires and wheels, no trailer landing gear, no trailer upper-coupler, no separate cab components such as fifth wheel, trailer pick-up rails or exposed air and electrical hoses and wires, elimination and replacement of all expensive and heavy hydraulic pumps, and related cylinders, pistons, pressure tanks and high-pressure lines with low maintenance and long-lasting electrical motors for all steering, braking and cargo lift systems;

14) a design that may be readily reconfigured into the smaller size of a 3-axle vehicle with 60,000 lb. GVWR that may accommodate an overall body length from 48-60 feet, driven with either battery-electric or hydrogen-electric propulsion;

15) a design whereby the three-axle exemplary alternative examples of the preferred example of the present invention may have all the design benefits in efficiency, safety and productivity as are present in the four-axle 80,000 lb. GVWR configuration;

16) a design that may have multiple and integrated battery charging ports;

17) a design that may provide for safer operator entrance and exit;

18) a design for transportation operations where operator and cargo safety and security may be critical, where the option for an electronically-controlled rear roll-up door and adjacent interior camera, and the option for an access door from the operator's compartment directly into the cargo area, may be incorporated into the vehicle's design; and 19) a design that may enable the vehicle's all-wheel steering, load equalization, weight, reduction, increased cargo cubic capacity and floor space, electric braking, electric steering, E-axle propulsion, E-axle regenerative braking, hard-wired connectivity of all pneumatic and electrical componentry, to be readily adaptable to dry-freight transport, temperature-controlled transport, flat-bed transport and open-top transport.

The vehicle frame may be a continuous structural aluminum 'C' channel from the rear frame to the bulkhead behind the operator's compartment, with the size and thickness of the web and flange of such 'C' channel determined by the weight of the battery packs or hydrogen tanks and fuel cells. The vehicle frame width may be 30 inches for its entire length, (the frame may be 34 inches wide for its entire length depending upon tire clearances and turning angles) while the vehicle frame height may be 44½ inches for its entire length.

The vehicle may be designed and built with an electric rear under-mount cargo loading and unloading device, in which the frame of the vehicle may be modified to accommodate the installation of such device The frame overall width of most current combination vehicle tractors is 34 inches as there is a large internal combustion engine that must be safely cradled. The advantage of a narrow frame may be more undermount space to house ESDS componentry. Suspension systems may be modified to support such narrower frame as pneumatic air spring housings and pneumatic piston cylinder housings may be designed to be installed fore and aft of the axle positions.

The 'C' channel frame crossmembers may be structural aluminum 'I' beams, spaced to support the weight of the ESDS in all six undermount spaces, with end-plates welded to the web and flange of the 'I' beams; such 'I' beam end plates may then be bolted through the frame's 'C' channel web. Round openings, with synthetic rubber inserts lining such openings, may be strategically placed in the web of the I-beams and in the web of the 'C' channel frame for the protective and secure routing of compressed air lines, and low and high-voltage electric wire distribution; additionally, frame cross-members may also directly and indirectly support interior and exterior frame-mounted insulated or pressurized hydrogen tanks and interior frame-mounted compressed air tanks.

Eight Goodyear low rolling resistance wide-base tires may be used, each with a 17.5-inch width, a 39.2-inch diameter, and an 18.1-inch loaded radius, with each tire rated for 10,200 lbs. at 120 psi. Each tire may have integral air pressure sensors with a directly-plumbed, automatic air pressure management system. The horizontal tire clearance with the 30-inch frame width may be no less than 7.5 inches when measured with the tire turned at 90-degrees to the frame, and no less than 6.0 inches horizontally, when measured to the corner of the tire at a 45-degree wheel-cut.

With the acknowledged advantages of counter-phase all-wheel-steering, it may be expected that wheel cut angles at all wheel positions may be much shallower while still achieving a narrower turning radius as compared to a comparably-sized combination vehicle. As noted above, this enables the 'C' channel frame width to be 34 inches, as sufficient horizontal tire clearances may be achieved.

Wheel cut angles as low as 35 degrees at all axles may be sufficient for the vehicle to satisfactorily execute all turning maneuvers within a narrower turning radius than combination vehicles of the same overall length.

Persons of ordinary skill in the art will understand that wheel tracking at slow speeds, such as going around a corner, constitutes counter-phase steering where front wheels point in an opposite direction to that of rear wheels, while changing lanes at higher speeds constitutes in-phase steering, where all wheels point in the same direction.

Two forward steer axles, each with a 102-inch wheel track, with a deep turning radius afforded by the narrow frame and the 39.2-inch diameter tires, may be used. Additionally, two rear electric-driven and steerable axles, each with a 102-inch wheel track, and having a deep turning radius afforded by the narrow frame width and the 39.2-inch diameter tires, may also be used.

Acknowledging that tractor-trailer combinations trailer axles follow, but not directly, the vehicle of the present invention, having all-wheel steering, with the autonomous systems automatically engaging "counter-phase" steering, may function with a safer wheel path when turning at low speeds, and may function with safer tracking at highway speeds with autonomous systems automatically engaging "in-phase" steering. Such all-wheel steering features may clearly improve vehicle stability and improve highway safety, and are features and benefits that may not be possible with trailer-tractor combination vehicles.

In order to achieve an 80,000-pound GVWR, current federal bridge and length laws require there to be a minimum of 51-feet between the front and rear axle hubs, and a minimum of 10 feet between the hubs of the two front axles and 10 feet between the hubs of the two rear axles.

As further discussed below, designs of the present invention for an 80,000-pound GVWR may not be in strict compliance with current federal law, as the fifth axle may be absent. With a 10-foot spread between the hubs of the two front steer axles and the hubs of the two rear drive axles, the useable and legal-loaded axle weights for each of the four axles may be at least 20,000 pounds; however, current Federal Weight Rules would restrict the four-axle configuration of the present invention to a 76,000 lb. GVWR.

Vehicles of the present invention preferably may incorporate electromechanical dual-disc (friction components) or electromagnetic foundation braking systems (non-friction components) for all eight (8) wheel positions, with electronic controllers and actuators, enabling axle-centric management for roll-stability control, directional-stability control, traction-control, anti-lock braking and automatic emergency braking functionality.

As compared to pneumatic or hydraulic foundation braking systems fully electronic braking systems may be designed to more quickly and evenly deliver braking forces, which may improve vehicle control and stability and deliver much shorter stopping distances. As electronic signals to all brake system controllers and actuators must be failsafe, the inherent problems of manual coupling of tractors to trailers become evident (as earlier identified by the Society of Automotive Engineers and other transportation industry experts).

Additionally, the E-axles preferably incorporated into the vehicle of the present invention produce regenerative braking energy, preferably from all axles (versus just two axles on typical 5-axle tractor-trailer configuration vehicle), generated from the kinetic energy from the slowing and braking of the vehicle with the E-axle's integral generator; additionally, this electrical energy regeneration from the E-axle generator, converted and routed back to the vehicle's batteries, may reduce energy demands on the batteries, extend the vehicle's operating range, and by applying the regenerative braking functionality may have the added benefit of using the negative torque and resistance created by the generator, while producing electricity, to effectively slow the vehicle, providing longer foundation brake life, given that foundation brake application and engagement may be reduced.

Referring to left-side and right-side side views in FIGS. 4 and 5, respectively, two identical undermount spaces 14 and 24 may be provided, with each such undermount space containing the ESDS components required to power the vehicle, whether the propulsion system is battery-electric or hydrogen-electric. The exemplary outside dimensions of each undermount space 14 and 24 may be 27-feet wide, 34 inches deep with a 30-inch-wide frame, and 32 inches deep with a 34-inch-wide frame. The middle 15 feet of spaces 14 and 24 may be 30 inches high, and the 6 feet on either side of the middle 15 feet may be 36 inches high.

Four identical 5-foot wide undermount spaces 13, 15, 23 and 25 may also be provided, each 36 inches high, each 34-inches deep with a 30-inch-wide frame, and 32 inches deep with a 34-inch-wide frame.

Undermount spaces 13, 15, 23 and 25 may contain all non-propulsion ESDS for pneumatic system components and battery-electric components.

Where appropriate, all ESDS components, primarily battery packs and fuel cells, may be encased in secure and weatherproof enclosures in the undermount spaces identified. Components not encased in such spaces may preferably be securely mounted inside such spaces for safe and unrestricted access for inspection and service. All secure enclosures may be through-bolted to the web of the Vehicle's 'C' channel frame at the point where the 'I' beam crossmembers may also be bolted through the web of the vehicle's 'C' channel frame, and may be further secured and supported by a one-half inch structural aluminum plate directly attached to the "I" beam cross-members, enabling the vehicle of the present invention to operate with ESDS componentry that may be substantially larger, more effectively and efficiently designed, more readily accessible for inspection and maintenance and with more electrical and compressed air energy produced than may be available on tractors used in combination vehicles in common use today.

All undermount spaces, whether housing secure and weatherproof enclosures for ESDS components, or components not requiring any such enclosures, may have access doors fully covering the front openings of such spaces. Spaces with no inside enclosures may have enclosed bottoms and sides made of structural aluminum plates preventing moisture, dirt, salt, ice or any other foreign materials from contaminating or damaging the interiors and exteriors of all such undermount spaces.

By having the two very large undermount spaces designed specifically for vehicle propulsion, and with the four smaller undermount spaces designed specifically to supply energy for all other non-propulsion requirements of the vehicle, the clear and the very significant advantage of this non-articulating design, in all design configurations, may be larger, safer, more secure and more accessible space for battery packs and related componentry, or hydrogen-electric fuel cells, compressed or liquid hydrogen fuel tanks, and related componentry, all dedicated to the propulsion system. Further, all non-propulsion power demands may be managed by the ESDS componentry safely and securely housed in the (e.g.) four and six, equally accessible undermount spaces, enabling this vehicle, in the 60,000 lb. GVWR and 80,000 lb. GVWR configurations, to efficiently function with ESDS capacity that may be two (2) times the size of ESDS componentry designed into conventional tractor-trailer configurations with a hydrogen-electric propulsion system, and may be as much as four (4) times the size of ESDS componentry designed into conventional tractor-trailer configurations with a battery-electric propulsion system. Such undermount space design may enable this vehicle, in either the three- or four-axle configuration, to efficiently operate with a dual-drive system, adding to the functionality of this design in providing greater operating range than comparable tractor-trailer combination vehicles.

Figure 12:
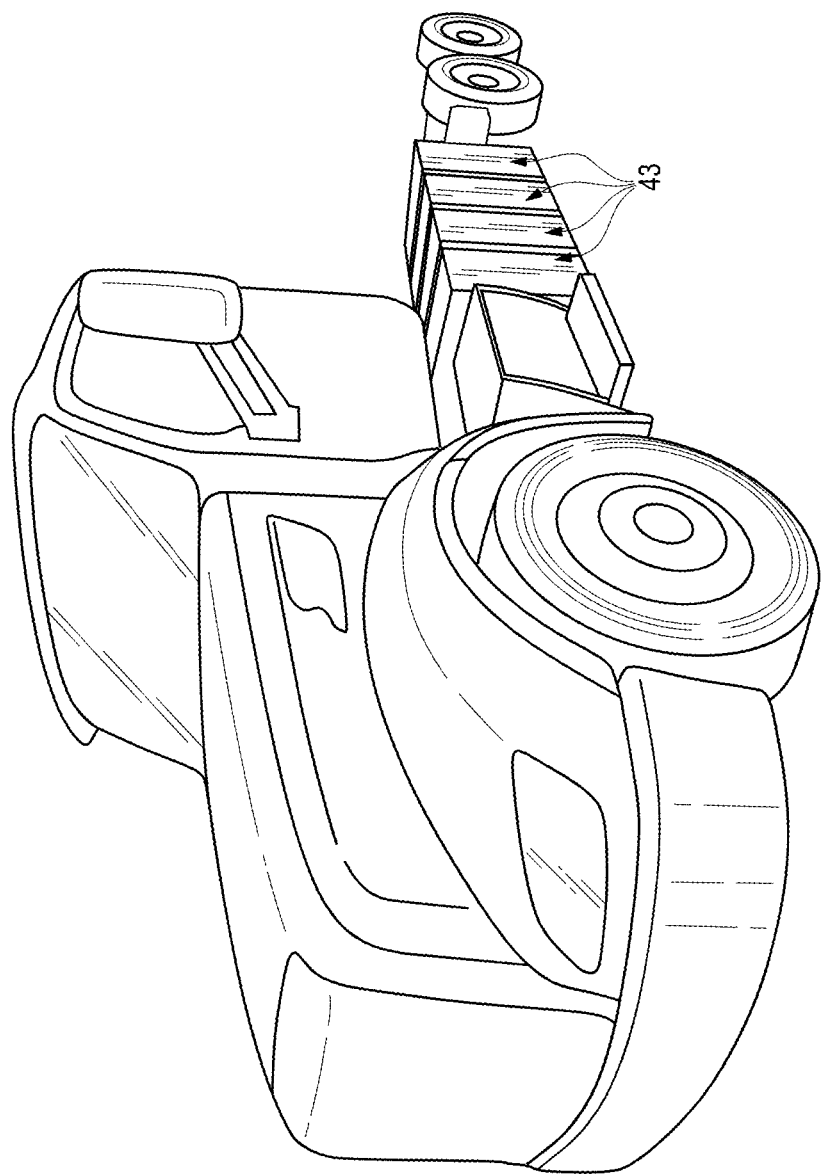
Figure 13:
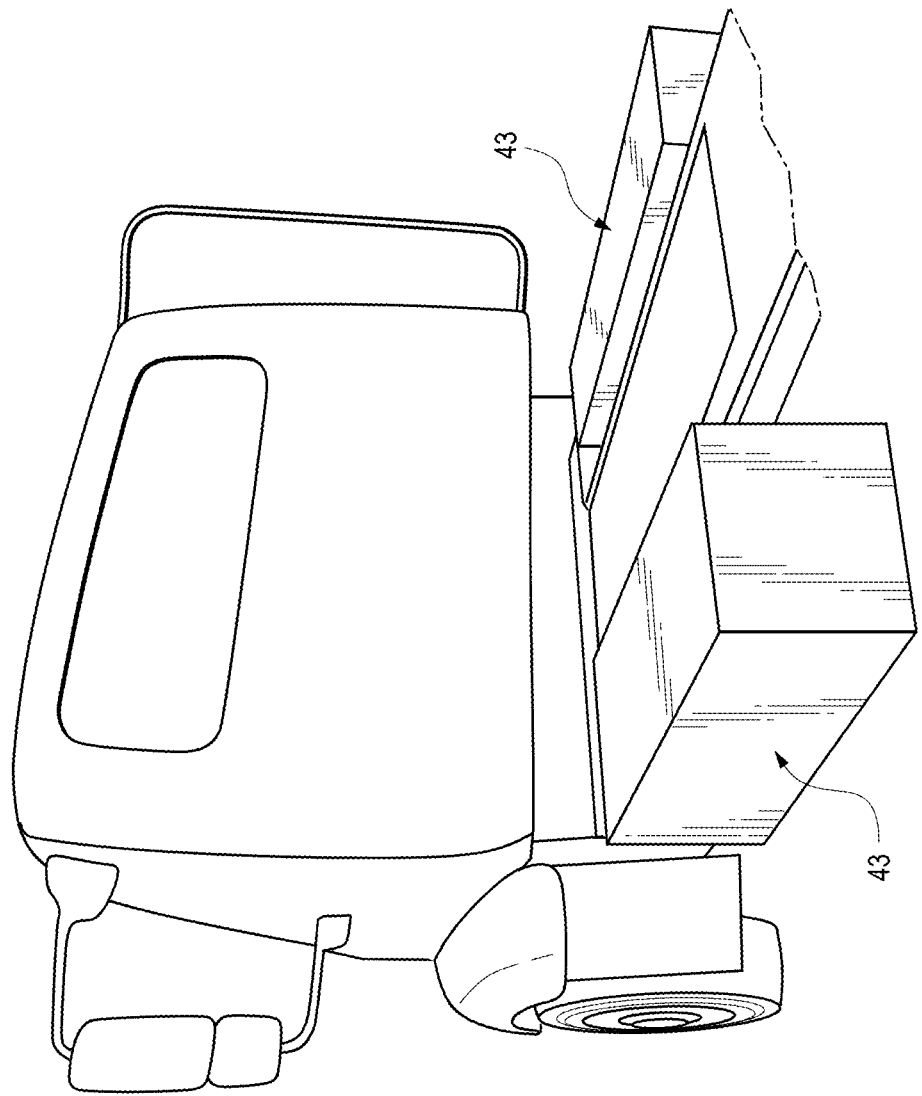

Referring to FIGS. 12 AND 13 (copied from two photographs of actual, conventional, battery-electric powered three-axle tractors), boxes 43 mounted onto the outside of the frame between the front and rear axles, clearly show the very limited space available for installation of battery packs and related ESDS componentry on a typical three-axle tractor. There may also be limited space under the cab of such tractor for any non-propulsion ESDS componentry, and such space may be difficult to access for maintenance and inspection.

If the preferred embodiment of the present invention is designed for extended range, each of the rear-driven E-axles may be independently driven by one of the ESDS components housed in undermount spaces 14 and 24.

When operating under normal conditions, the two ESDS in undermount spaces 14 and 24 may power the drive axles independently, and power may be redirected in the event one of the drive axle differentials fails; additionally, both drive axles may be designed to instantly and automatically engage as power requirements change, such as on a steep vertical grade, and may also change with sudden or unexpected impediments from weather or road conditions.

Whenever electrical power from the ESDS to a driven (powered) E-axle is stopped, the vehicle's autonomous system immediately and electronically disengages the motor from the E-axle's differential. During this disengagement, if the vehicle slows or brakes, the E-axle motor may be immediately and electronically re-engaged to the E-axle and becomes a generator of power with regenerative braking functionality.

Extending range is the 'holy-grail' of electric propulsion. In addition to larger and more functional ESDS componentry, in either battery-electric or hydrogen-electric configurations, specific design components of the present invention may contribute to extending range. The design is lightweight, all eight tires have low rolling resistance, the kinetic energy from the vehicle's slowing and braking produces regenerative electricity from the E-axle generators, transmitted back into the ESDS, and ultimately back into the vehicle's batteries, and all axles are preferably E-axles. Even with the front-mounted cargo refrigeration/heating system configuration shown in FIGS. 1, 2, 3 and 8, the body is aerodynamic, which may reduce power consumption. The (e.g.) 472 square feet of roof mounted solar panels may provide a significant energy boost, and even the electric rear cargo lift, undermount, or frame-mounted rail-lift, may add regenerative electricity back into the ESDS when the lift is lowered while under load.

In the hydrogen-electric configuration there may be at least two (2) times the space for liquid hydrogen or compressed hydrogen tanks, both inside and outside the frame rails, as compared to the typical tractor-trailer combination, substantially extending range. Even the three axle 60,000 lb. GVWR of the present invention, if powered by hydrogen-electric, may have far greater range than many tractor-trailer configurations powered by hydrogen-electric.

Additionally, as with battery-electric componentry or hydrogen-electric componentry, by reason of vehicle propulsion functionality, such components may be installed only on tractors and not on trailers, and other than the hydrogen tanks themselves, which most likely would be placed outside the tractor frame rails, and between the steer axle and drive axle(s), much of the ESDS componentry may then only be placed onto the back of the tractor cab, which creates several potential problems: 1) difficult access for maintenance and service; 2) unsafe access as the height of some components may be as high as 12 feet above ground level; 3) expensive to construct as all of these components must be secured to the back of the cab with a substantially sized and sturdily constructed frame as the cab itself may be initially built without the heavily reinforced frame which may be essential for a secure and durable installation; 4: clearly a top-heavy design which may add to overall instability of the combination vehicle; and 5) as jackknife accidents are not uncommon with articulating tractors and trailers, an event of even a minor jackknife incident may subject this hydrogen ESDS componentry to serious damage.

Figure 11:
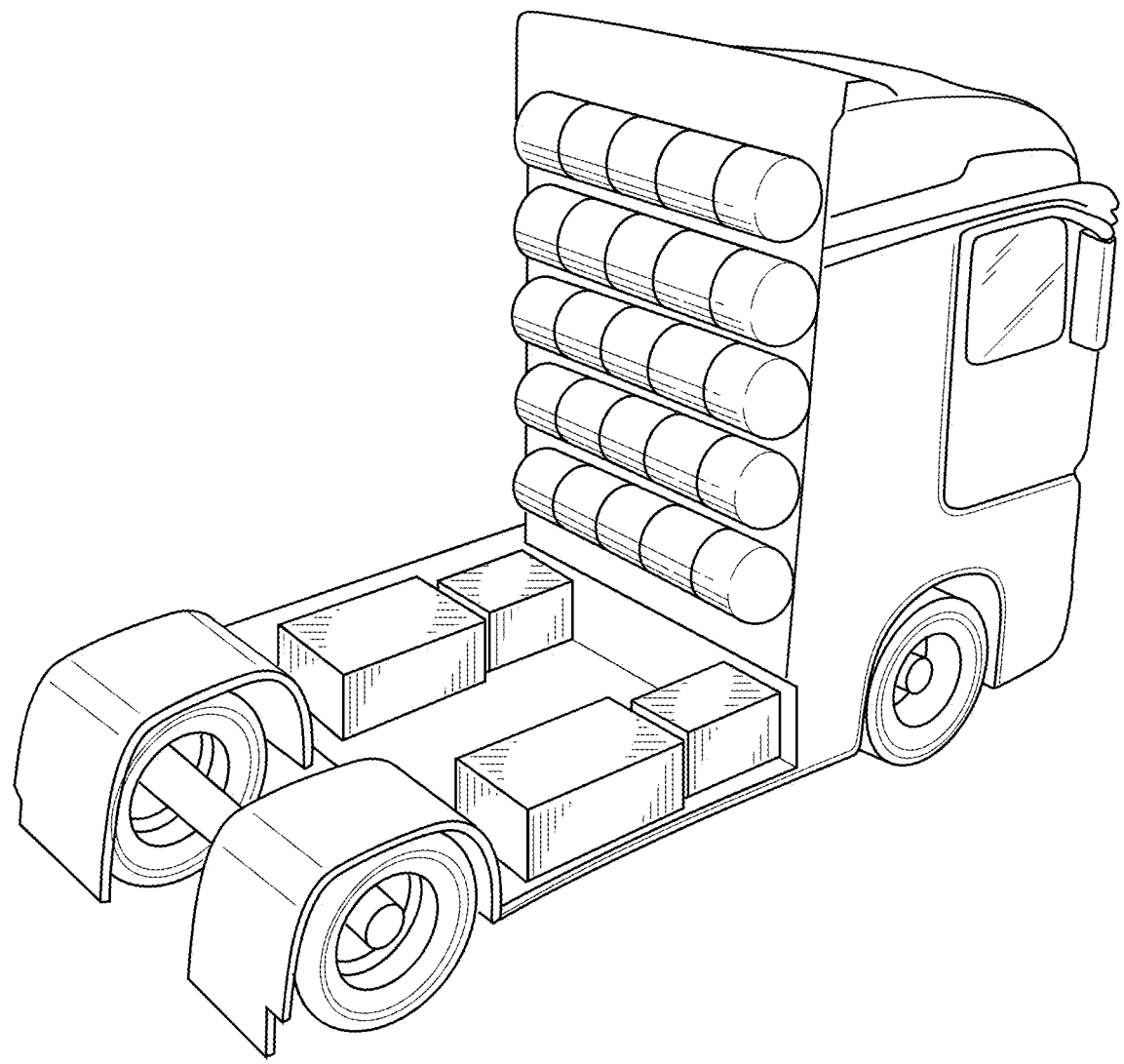
FIGS. 11-15 are front, side and rear perspective view of various prior art cabs.
Figure 14:
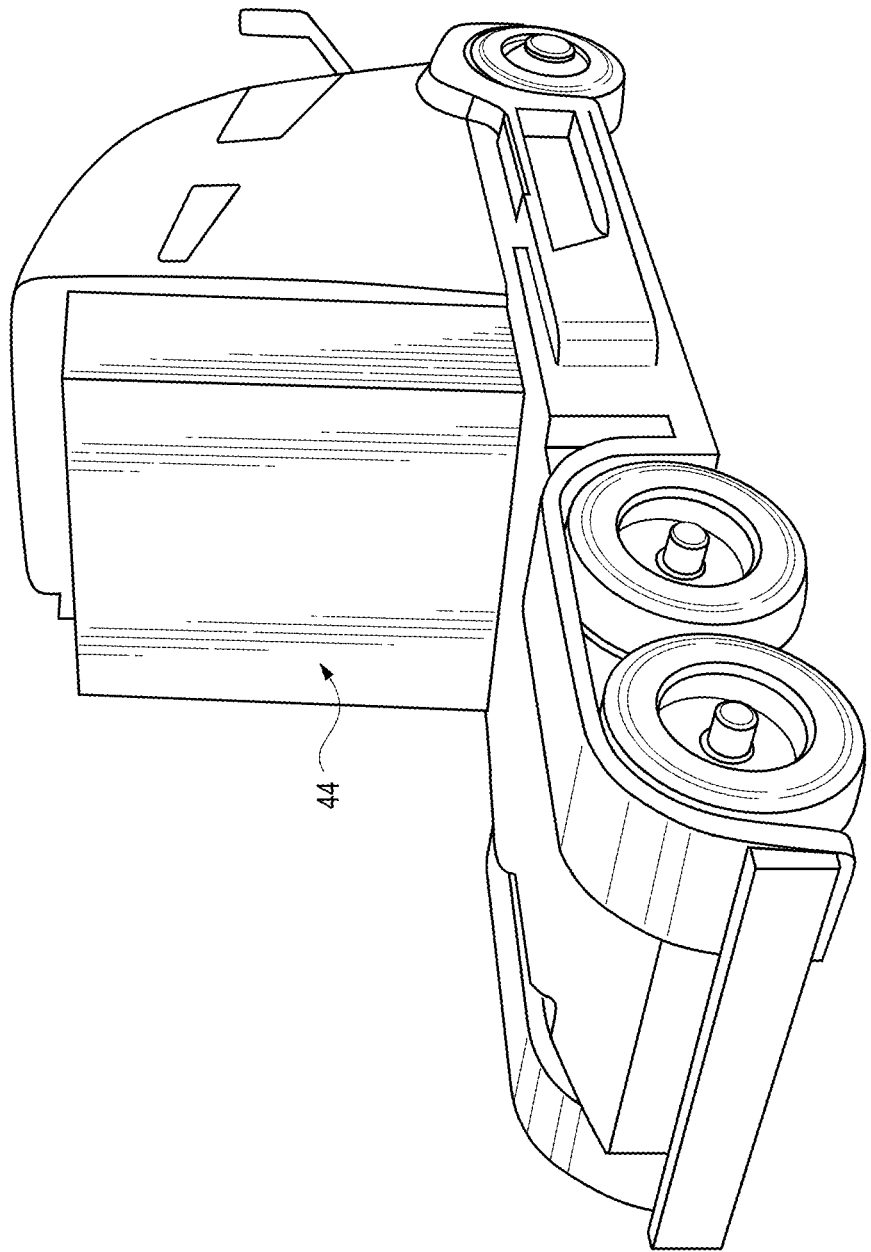
Figure 15:
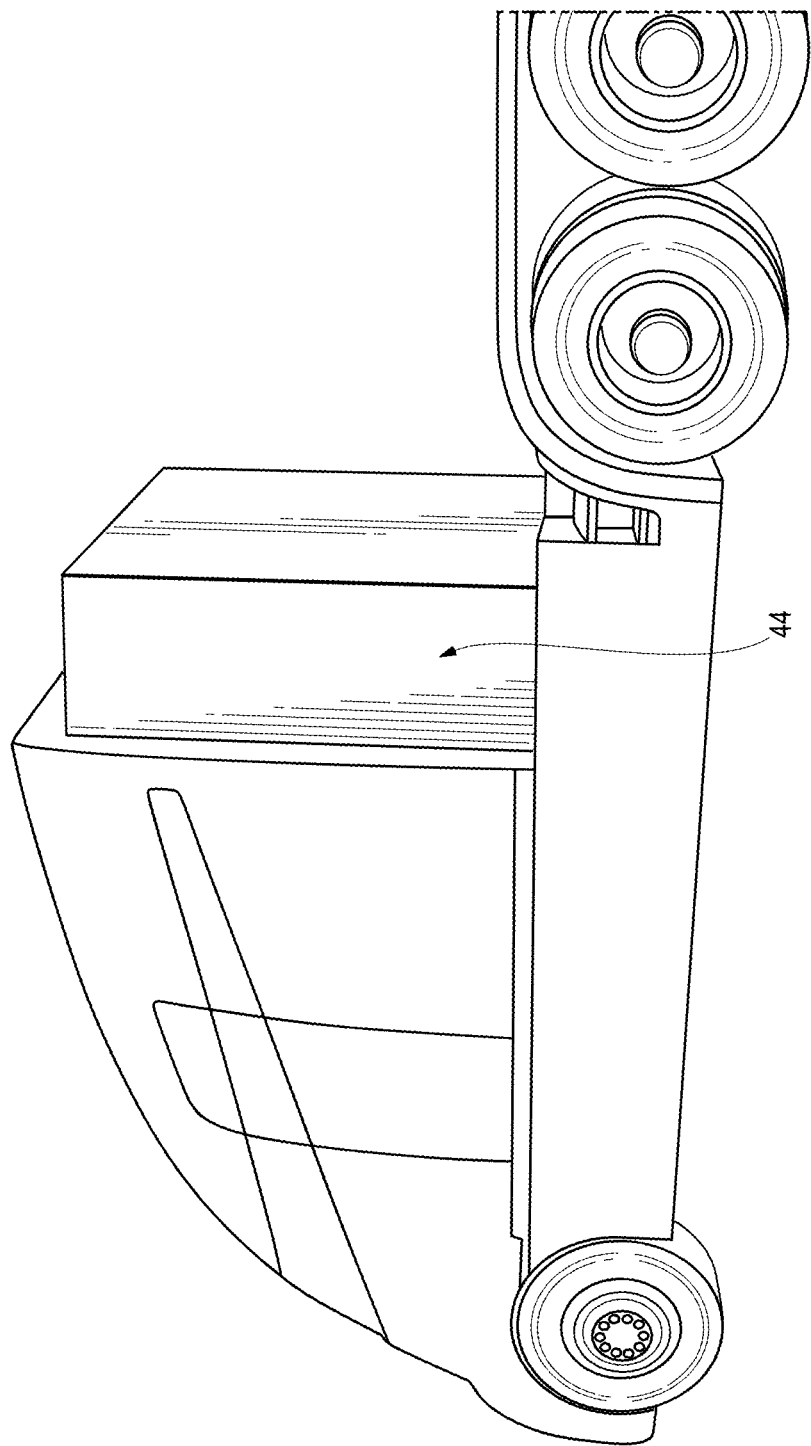

To underscore the potential (and real) problems outlined in the above paragraph, and referring now to FIG. 14, this drawing from a photograph of a conventional, hydrogen-powered Nikola-1 Tractor, illustrating how much of the ESDS componentry 44 is mounted onto the back of the cab and above the frame rails. Similarly, referring to FIG. 15, a drawing from a photograph of a U.S. Express hydrogen-electric-powered tractor, this again shows a significant amount of ESDS componentry 44 installed high on the back of the tractor and above the frame rails, completely exposed to jackknife damage that may occur when combination vehicle tractors are exposed to the many conditions under which they may operate. FIG. 11 is similar in this regard with unprotected hydrogen tanks 'stacked' on the back of the tractor and clearly exposed to damage in the event of a jackknife or roll-over. Those of ordinary skill in the art will appreciate that, with regard to the tractors shown in FIGS. 11, 14 and 15, there is extensive and complex hydrogen-electric componentry that may be contained inside the large compartments installed on the back of the tractor cabs, such as the above-referenced figures have shown, clearly revealing how dangerous it may be, not just to the public, but also to maintenance personnel, to the vehicle operator, and to the vehicle itself, when such componentry are fitted onto and into the type and size of commercial tractors in common use today.

Preferably, Tier I Suppliers may be used for such items as axles, differentials, suspension systems, cargo cooling and brakes (e.g., Hendrickson for suspension; SAF-Holland, Con-Met or Dana for E-axles; Meritor or Rockwell for steering; Bendix or Haldex for electronic braking systems; Carrier Transicold for cargo heating and refrigeration; and Aurora, Tu-Simple Systems, Waymo, ZF or Kodiak Robotics for Level 5 Automation).

Unmatched by any hydrogen-electric or battery-electric-powered commercial vehicle today, and critically important for market penetration based solely upon the operating range, are the design, size and location of all the ESDS componentry enclosures of the preferred example of the present invention. With two primary 27-foot wide undermount spaces 14 and 24 for propulsion, and with four secondary 5-foot wide undermount spaces 13, 15, 23 and 25, for all non-propulsion requirements, there is abundant structurally-sound space, readily and safely accessible, both inside and outside the frame rails, enabling the four-axle configuration of the present invention to have an operating range that may be unsurpassed by any 80,000 lb. GCWR capacity vehicle powered by either hydrogen-electric or battery-electric propulsion.

In addition to the ESDS components housed in undermount spaces 13, 15, 23 and 25, supplying power to non-propulsion componentry, these four spaces may also provide direct connectivity for Level 5 Autonomous Systems controlling steering braking, suspension, tire pressure, including high and low voltage connectivity for sensors, cameras and radar systems, telematics and communications, all sealed and hard wired through these four undermount spaces, connecting all of the vehicle's operating systems, controls and data transmission to the operator's compartment 3.

Each of the four undermount spaces, 13, 15, 23 and 25, may contain one (1) electric high volume air compressor mounted outside the frame rail, one (1) pressurized large capacity supply air tank and one (1) smaller pressurized service tank, both of which may be mounted inside the vehicle's 'C' channel frame adjacent to the electric air compressor, all designed to provide compressed air energy to the pneumatic suspension system for all four axles 16A, 17A, 18A and 19A, and for tire air pressure management systems for all eight tires 16, 17, 18, and 19.

The two air compressors mounted inside undermount spaces 13 and 25, and four (4) compressed air tanks housed inside the vehicle's 'C' channel frame, adjacent to where such air compressors are mounted, may all be directly and sequentially plumbed together to enable the autonomous vehicle systems to engage one (1) air compressor, one (1) supply and (1) service compressed air tank as the primary pneumatic system application components for the front two (2) axles 16A, 17A, and four (4) front tires 16, 17. In the event of a loss of compressed air, or the failure of any pneumatic system component supplying compressed air to the two front axles 16A, 17A, and four front tires 16, 17, the vehicle's autonomous system may immediately stop power to the failed or failing air compressor, or stop compressed air flow to the failed or failing compressed air tank, and simultaneously engage the applicable secondary pneumatic system components to maintain the functionality of the vehicle's pneumatic systems. The vehicle's autonomous systems may regularly alternate the use of each electric air compressor, as either primary or secondary, to assure continuous reliability of both the suspension system and the tire inflation system.

With respect to suspension system and tire inflation system management for the two rear axles 18A, 19A, and four rear tires 18, 19, undermount spaces 15 and 23 may house identical pneumatic system components, mounted inside and outside the vehicle's 'C' channel frame, with identical pneumatic system functionality and controls as in undermount spaces 13 and 25.

In addition to the load-leveling functions, the pneumatic suspension systems may control ride height, and once ride height is set on such suspension systems the control of such height may be automatically maintained, with no appreciable deviation from such height, whether the vehicle is empty or loaded to the maximum allowable weight.

This ride-height control function may be very important as the vertical tire clearances must be maintained for safe and unimpeded steering at all eight (8) wheel positions. In the event there is any malfunction in any of the primary compressed air systems, the autonomous system controllers for ride height and load-leveling suspension systems may immediately switch to the reserve system to maintain the correct ride height and load-leveling functions. Any failure of any reserve system to maintain ride-height or load leveling may result in the autonomous system controllers engaging the air suspension lock, as described immediately below preventing all eight wheels from executing turns other than what is required to move the vehicle from the roadway, and then to slowly and safely stop the vehicle.

The vehicles' non-articulating design may require a specialized pneumatic suspension system to increase the vertical lift of the frame for sufficient tire clearances when accessing depressed loading/unloading docks. Typical pneumatic suspension systems may utilize air springs that inflate and deflate automatically to adjust the frame height. Such systems may not have sufficient vertical lift to assure adequate tire clearances; therefore, a system incorporating electronic pneumatic pistons, or a system with multiple vertically connected air springs, replacing a single air spring, may substantially increase the vertical lift of the vehicle's frame to provide sufficient tire clearances. Such systems, including air-strut systems, may already be in-service with all-terrain type vehicles and with wheeled military vehicles, where greater tire clearances are essential.

Such specialized pneumatic suspension systems may incorporate the same ride-height features, load-leveling features and dock-lock features as are used on single air spring systems, and may have identical application of autonomous system functionality and controls in-place.

As referred to immediately above, in the event the ride-height system or load-leveling system functionality fails because of the loss of air pressure, from both primary and reserve air compression systems, (a very unlikely situation), or even if the pneumatic suspension system lost all compressed air, there may be a mechanical lock that automatically engages should the vehicle frame drop more than what is required to maintain tire clearances. This technology already exists in the form of a 'Dock Lock' on certain air ride suspension systems (first designed to keep trailers from 'dropping' at docks under the weight of loaded fork lift trucks), where a metal plate, or 'stop', is built into the suspension system that maintains the critical minimum height of the vehicle and stops the vehicle from dropping below the critical point where tire clearances may be affected. The 'Dock Lock' feature was first used to enable a vehicle operator when docking to release all compressed air from the suspension system to let the vehicle settle on the 'stops' inside the air springs or pneumatic cylinder housings for a more stable rear threshold while the vehicle is being loaded and unloaded.

The vehicle suspension systems may be monitored and controlled by the autonomous systems of the vehicle. The operator may receive continuous air pressure readings, and should there be a sudden drop in air pressure anywhere in the system, or should the ride-height of the vehicle show any unexpected change, or should the suspension height 'lock' be engaged, the operator may be immediately alerted.

These pneumatic systems of the vehicle, with autonomous system control and application, may also monitor and maintain the tire air pressure for all eight tires, maintaining all tires at the correct air pressure to assure the safe operation of the vehicle with respect to handling, braking and tracking; additionally, underinflated tires may also increase rolling resistance and as such significantly increase energy use.

The five-foot long by eight-and-one-half-foot wide operator's compartment 3 (FIG. 1, exemplary dimensions), may consist of a reinforced steel enclosure, with side, front, and top air bag systems, and may have a full-width windshield and multiple camera and radar systems to monitor the entire perimeter of the vehicle, overhead clearances, the underside of the vehicle, and the interior cargo space, and in situations where cargo and operator safety and security may be critical the operator's compartment may have a direct access door through the interior bulkhead into the cargo area of the vehicle.

Access to HVAC, camera, radar, telematics, lighting, communication and all other controls for autonomous systems may be provided at the front of the vehicle, via access panel 20 (FIGS. 1, 8) and/or access door 22 (FIG. 4).

All exposed high and low voltage electrical connections to sensors, cameras, radar, telematics, communication, lighting, steering systems, braking systems and air compressors, and all other components of the vehicle's autonomous systems, may be hard-wired and secured in sealed, and heated conduits made of flexible, strong and durable material, routed through protected and lined openings inside the vehicle's 'C' channel frame, through the web of the vehicle's 'C' channel frame, and through the 'I' beam cross-members secured to the inside of the web of the vehicle's 'C' channel frame.

High pressure air lines for pneumatic weight-leveling and ride-height suspension system components, and for automatic tire inflation systems 16, 17, 18, 19, may also be routed through and enclosed inside flexible, strong and durable material, securely routed and permanently plumbed from the (e.g.) four electric air compressors to the (e.g.) eight pressurized air tanks secured inside the vehicle's 'C' channel frame, through protected and lined openings in the 'C' channel frame's 'I' beam cross-members, and through the web of the vehicle's 'C' channel frame, routed directly to the systems' controllers for air pressure management for suspension systems and tire inflation systems.

The material described in the two paragraphs above preferably consist of material that is unaffected by temperature extremes, or by road salt and de-icing chemicals, or by any other chemical or corrosive exposure that may be expected during the life of the vehicle.

Passenger seating may be designed to be easily removeable. Referring to FIGS. 4 and 5, two access portals, doors 9 and 22 to the center console, are shown, where given the elimination of internal combustion engines, transmissions and drive shafts there may be sufficient available space inside operator's compartment 3, directly connected to the vehicle's 'C' channel frame for direct access to the control points of the hard-wired and secured electrical and pneumatic systems of all propulsion, non-propulsion, communication and autonomous system components.

Preferably, the vehicle's shape is aerodynamic, with a rounded front radius at the sides and roof, with an aerodynamic front bumper 7, with no tractor-trailer gap, with aerodynamic wheel covers on all eight wheels, and with strong, flexible and durable synthetic rubber skirting, in a shape-memory composition, turned slightly inward, and bolted to the underside of all undermount spaces, providing ground clearances of four (4) inches from the front bumper to the rear frame.

Additionally, all of the undermount spaces may be enclosed at the sides with smooth flat aluminum covers, at the front with smooth aluminum access doors, and the underside, where necessary, may be enclosed with structural aluminum plates, enabling the entire vehicle body, (other than at the wheel openings) from the front bumper to the rear of the cargo body, to have complete and effective 'skirting' for efficient air-flow and reduced aerodynamic drag.

Referring now to FIGS. 1-5 and 8, a preferred embodiment of the vehicle of the present invention is shown with front-mounted refrigeration/heating system 4, designed to heat, cool or freeze perishable or sensitive commodities carried in the vehicle. This vehicle may be designed and built to carry both perishable and non-perishable commodities. By extending the length of the operator's compartment from five to seven feet, eliminating the front-mounted cargo refrigeration/heating system 4, or by completely redesigning and recontouring the front-mounted cargo refrigeration/heating system, the vehicle may be designed and built with a completely reshaped frontal area. This redesign provides the vehicle with a significantly more aerodynamic shape to the roof section directly above the operator's compartment 3, and a significantly more aerodynamic shape to the front radius corners of the vehicle, providing a smoother and unrestricted air flow over the top of the vehicle and at the sides of the vehicle. Additionally, the operator's seat may be relocated to the center of the operator's compartment, enabling the vehicle's front radius corners to also be reshaped for maximum aerodynamic efficiency, providing a smoother and less-restricted air flow along the sides of the vehicle. Further, a front bumper 7 may be incorporated, with a molded, aerodynamically shaped cover, designed to absorb impact.

Reshaping the frontal area of the roof of the vehicle may reduce the number of solar panels 21 used; however, solar panels may be made with built-in curvatures to match the redesigned contours of the frontal area of the roof. By installing curved solar panels, there may be no reduction in the total number of solar panels used.

If the vehicle's primary operating range is local and regional (e.g., return to home domicile every night), the use of expensive aerodynamic add-on devices, such as "trailer-tails," may not be practical.

Sensors, cameras, radar, and telematics components 1, 10 and 30 (see FIGS. 1, 8 and 9), all used for autonomous operations, may be mounted at the front of the operator's compartment, and on the front, and rear of each side of the vehicle, and in the rear frame and header. All such components may be enclosed in heated, sealed, reinforced and protected spaces, and all may be hard-wired.

Sixteen inches of depth (e.g.) may be available at the rear of the vehicle for strong underride protection 11, affording a better design than what may be typical on most combination vehicle trailers. Additionally, if the vehicle's 'C' channel frame is extended to the rear of the body, the strength of such underride protection may assure that no automobile could breach such a barrier. Except for the deep underride protection, and protective and heated compartments for sensors cameras, telematics and radar systems 28, 30 the rear of the vehicle may be identical to existing combination vehicle trailers, refrigerated or dry, and the rear frame depth for swing-type doors or manually-operated roll-up doors 29 may be identical to existing combination vehicle trailer dimensions.

By eliminating the monocoque design of the traditional combination vehicle trailer the cargo body 2 of the vehicle of the present invention may be frame-supported. The cargo body floor, made from hardwood, steel or aluminum, may be 48-inches high, from the bulkhead to the rear door threshold. If hardwood, the floor may be 1.5-inches thick for the full length of the cargo body, screwed directly into the under-body crossmembers, and such hardwood floor, as an option, may be modified to a shallower thickness of 1.25-inches, either at the full width, or at the middle 4 feet, and such modified sections of floor may be covered with one-quarter (0.25) inch diamond plate aluminum sheets when interior traction is important, or when weight is not critical, or when additional floor support is required.

For the first (e.g.) 24-inches of the floor of cargo body 2, if such floor material is hardwood, a ¼ (0.25) inch full-width threshold plate may be used, made of diamond plated steel, level with the top of the hardwood, which may be secured to the hardwood floor and under-body cross-members, to prevent damage to the floor from dock-leveling plates used at many distribution centers.

The sides of the cargo body may have LED marker lights 10, reflective tape, and at the front and rear sides of the cargo body, and at the upper corners of the rear door frame, there may be LED turn indicators 28.

The cargo body floor may be supported by 6-inch-wide and 2-inch-deep structural aluminum 'hat-section' cross-members mounted on 15-inch centers, with welded end plates that bolt or rivet to a 10-inch extruded aluminum lower rail which may have a ½ (0.5) inch lower flange that turns into the underside of the 'hat-section' cross-members.

As with typical highway trailer construction, the lower rail may be riveted or bolted through the end plates of the floor cross-members, and riveted to the side posts of the trailer body. Additionally, if the cargo body side panels are composite plates, the stiffeners used for such side posts may be riveted to the lower rail also, and the lower rail may be increased in thickness to add sidewall strength at the base, and increased in height to between 20-26 inches above the floor height, and may be integrated into the interior cargo body scuff-liner, where exposure to impact damage may be most likely.

Preferably, all design configurations of the vehicle of the present invention have all-wheel steering but have no wheel wells to house steer wheels. To insure acceptable vertical tire clearances, the 'hat-section' cross-member designed to be directly above every tire may be removed, for the full width of the vehicle's body, and the two adjacent 'hat section' crossmembers may be modified and reduced in height to 1½ inches, with an identical 6-inch width, and installed for the full width of the vehicle's body. Placed upon the top and through-bolted to the two modified 'hat-section' crossmembers may be a ½-inch thick structural aluminum plate, running the full width of the vehicle's body, 36-inches from front to back, and centered over every tire, enabling no less than 6.8-inches of vertical tire clearance at all eight tires, using an adjusted tire diameter of 38.7 inches (39.2 inches minus 0.5 inches for the deflection of the bottom tire radius from the empty weight of the vehicle).

Additionally, at every tire location where the single 'hat-section' crossmember is removed, and where the two adjacent 'hat-section crossmembers are modified, the lower rail may have a cut-out approximately 22-inches long and 2-inches high, bordered at the bottom by the one-half (½)-inch flange at the base of the lower rail. The tire clearance of 6.8 inches includes clearances for the one-half (½) inch lower rail flange.

Four (4) 6×2 inch 'hat section' cross-members may be installed under the rear threshold plate, all spaced more closely at 7½ inches, measured center to center, to prevent floor deflection during cargo loading and unloading.

The cargo body 2 of the present invention, in all design configurations, may have comparable specifications to conventional trailers of articulating combination vehicles. Cargo body side posts or sidewall stiffeners may be riveted to the lower rail. Cargo body sidewall panels may be made of aluminum sheet, aluminum plate (highly specialized operations) or composite materials. As earlier described, if the cargo body sidewalls are made of composite material, an aluminum high-impact scuff-liner may be integrated into the bottom of the interior sidewalls. Other components typical on trailers, such as cargo tie-down bull-rings in floors, slotted side posts for cargo securement, shallow aluminum roof bows, interior LED dome lights, sidewall skylights, high-impact scuff-liners at the bottom 12-24 inches of the sidewalls, double decking systems and reinforced bulkheads may all be easily incorporated into the cargo body design.

The vehicle cargo body may be equipped with a direct-wired electric rear-frame mounted cargo rail-lift, and where operator and cargo security are critical a direct-wired electric roll-up door 29, supported by the ESDS componentry in undermount spaces 15 and 23 (see FIG. 7), may be effectively and inexpensively designed and built into the rear frame.

The electric cargo rail-lift may have the capacity of lifting 5,000 lbs., and may be designed to supply regenerative electrical power back to the ESDS in undermount spaces 15 and 23, while being lowered while loaded. In a heavy-duty cycle, with cargo moving from vehicle floor to the ground, the electric rail-lift's motor reverses polarity and becomes a generator supplying electric power through the inverter back to the vehicle's batteries.

In the 4-axle configuration, with an overall body length of 67 feet, where an additional five feet of undermount space may be added behind rear axle 19A, as an alternative to the rear frame mounted rail-lift, an undermount tuck-under or tuck-a-way electric cargo lifting device may be installed in such additional undermount space, and may have the same energy regeneration as the rear frame-mounted cargo rail-lift identified in the immediately preceding paragraph.

With the frame-mounted cargo body design side-doors of any size may be easily and inexpensively added without the need for extensive and costly door frame reinforcement, as is the case with monocoque-constructed combination vehicle trailers. The cargo body may also be easily configured as an open-top trailer, for overhead loading, or as a flat-bed for side loading, as the vehicle's frame-mounted cargo body structure may be comparable to the design of flatbed and open-top frame-mounted body structures.

If commodities carried are perishable, the cargo body may be designed with identical specifications as a refrigerated combination vehicle trailer with respect to insulation, floor material, sidewall material, and with moveable insulated bulkheads required for dual-temperature management.

If commodities carried are side-loaded, the cargo body, designed as a flat-bed or open-top, may have in-floor and frame-connected cargo tie down hardware, full-length structural extruded aluminum side rails for cargo securement, aluminum floors, hardwood floors, or combination hardwood and aluminum floors, and reinforced bulkheads.

With a 30-inch frame width, Goodyear wide-based tires, with a 17.5-inch width and a static radius of 19.6-inches, a loaded radius of 18.1-inches, on a 102-inch wheel track, steering geometry of the present invention may compare favorably to Class 8 tractors with a 34-inch frame (necessarily wider because such frames must support a separate cab, fifth wheel, diesel engine and transmission), 10.8-inch wide 11x22.5 tires, with 41-inch diameters, and a static radius of 20.5 inches, a loaded radius of 18.7-inches, and with 96-inch wheel tracking.

Preferably, all four steer axles utilize individual electronic wheel controllers and actuators using steer-by-wire technology. Steering technology systems, such as Enhanced GPS Navigation Systems, Critical Path Control Algorithms, Active Kinematics Controls and Geometry-Based Path Tracking Algorithms, may be the technologies used in the development of Level 5 autonomous systems and preferably incorporated into the design of both configurations.

All-wheel steering may have already been developed by several OEM's and Tier 1 Suppliers. Managing the all-wheel steering functionality for all eight wheels, using the technologies such as those referenced above, may require the sensors, cameras and radar systems developed for autonomous systems of this vehicle to be integrated with the controllers and actuators at all eight (8) wheel positions.

With 4-axle and 8-wheel steering, as compared to articulating vehicles, the operating performance of this vehicle may improve highway safety with better maneuverability, safer (controlled) tracking, better stability (both in low speed "counter-phase" steering, and during "in-phase" higher speed turning) and more control while executing turns.

All wheel steering may also improve productivity and increase energy efficiency. Even in reverse mode the vehicle may be safer and more efficient. Additionally, when turning with eight-wheel steering, with the rear wheels going in opposite directions, tire life may be substantially improved as tire-tread scuffing during turning may be largely eliminated.

The earlier reference to effective weight distribution may be an important element for determining whether the vehicle of the present invention has productivity and safety advantages as compared to combination vehicles. The location of all four axles, relative to primary undermount spaces 14 and 24 (FIGS. 4 and 5), the load capacity of such axles, the location of undermount spaces 13 and 25 (FIGS. 4 and 5), offsetting drive axle and differential weight, and the ride-height control and weight sensing and equalization of the pneumatic suspension system, indicates the vehicle may have well-balanced loaded axle weights.

Compared to five-axle combination vehicles, the four-axle configuration of the present invention may contribute to a significant improvement in efficiency by more closely equalizing axle loads to their maximum allowable weights. Weight equalizing suspension systems may be used on five (5) axle combination vehicles; however, such systems may never be able to balance loads efficiently because the location of all of the axles on such combination vehicles may never be directly under the trailer cargo body.

One concern some may have with the 80,000 lb. GVWR configuration example of the present invention may be with one fewer axle, there may be less foundation braking power; however, braking performance is measured in stopping distances; therefore, with electromechanical dual disc braking systems, or with electromagnetic braking systems, each such foundation braking system may have the advantage of being hard-wired end-to-end, enabling these brake systems to have secure and instantaneous signal functionality, and not just for stopping, but also for roll-stability, directional-stability, anti-lock braking functionality, traction-control and automatic emergency braking functionality. The design, the autonomous system controls and the integration of electronic braking system components may make signal failures extremely unlikely. Also, by using correctly inflated and evenly-loaded wide base tires, more positive braking effectiveness may be expected.

Additionally, absolute brake balance may be almost impossible to achieve with an articulated vehicle because of the pivot point, making perfect straight-line braking a rarity, with the combination vehicle trailer potentially moving laterally, or even slightly off-line, in a hard-braking situation, and especially when the hard-braking situation occurs when the articulating vehicle is executing a turn, even a turn just involving a single lane change.

Also, never to be ignored, and always taken seriously, may be the ever-present risk of the loss of low voltage and high voltage connectivity between the tractor and trailer's manual connections. The adverse effect to braking performance with lost or interrupted connectivity may always be present in articulating combination vehicles.

Almost everyone has experienced driving behind a tractor-trailer and noticing the trailer tail-lights 'flickering,' which is a very common occurrence; even when equipped with electronic brake actuators, that specific tractor-trailer combination may be unable to safely stop in an emergency braking situation as the brake application would then be controlled only by pneumatic pressure, which may have a significant brake application delay, as compared to the fully electronic braking system of the present invention, whereby an instantaneous electronic signal, hard-wired to the electronic brake actuators and controllers, may assure instant and consistent braking application.

One added point about braking, as long experience in the trucking industry has made clear: most trailers and many tractors, with four-axle and five-axle combination configurations, may use dual tires at all axle positions other than the steer axle. Dual tires are well matched in width, circumference and radius (loaded and static) when new; however, one of the two matched tires may have a pressure loss and exhibit abnormal wear, one of the two may go flat and have to be replaced, and one of the two may hit an object in a loading dock or truck stop and have a sidewall cut, and have to be replaced, and in every one of these three situations the matched pair may be separated and the replacement tire's circumference and loaded radius may never be a good match. Even when technicians replace both tires (unless both are new), an attempt to get a match may be almost impossible. With all of these all-too-common conditions, the expected result may be tire-imbalance, which may lead to increased rolling resistance or single tire overloading, which may lead to less efficient braking and longer stopping distances.

The problems of mating and matching dual tires do not exist with the use of the single wide-based tires used on all axle positions, as is preferred for all design configurations of the present invention.

Another advantage of either of the non-articulating configurations, 60,000 lb., or 80,000 lb. GVWR vehicles, may be the location of charging ports. Unlike tractor-trailer combination vehicles, where charging ports must be located on the tractor, charging ports on these vehicles may be located at the front, middle or rear of the vehicle. In fact, the logical location for charging systems may be at loading docks, with or without wireless charging systems, indicating the ideal location for charging ports may be at the rear frame of the vehicle.

The design simplicity of the vehicle of the present invention may make possible its adaptation to different length and weight requirements, and all design configurations may use either battery-electric or hydrogen-electric propulsion systems and may achieve greater range than comparably-sized vehicles in common use today using either hydrogen-electric or battery electric propulsion.

Economic case analyses (costs given as of 2019) are now provided to further illustrate various advantages which may be realized by the use of the present invention.

The inventor provided transportation services to a national retail grocer with approximately 4% market share, and as a result of a thorough analysis of the cost of transportation, using the four-axle, 62-foot configuration of the present invention, which may be slightly shorter than the five-axle combination vehicles used by such grocer, the savings may have been greater than $25 million annually with diesel fuel at $3.00 per gallon. At $5.00 per gallon, the savings in direct transportation costs may have been as high as $30 million.

The savings are derived from the 62-foot configuration having a 57-foot cargo body, as compared to the 53-foot trailer in common use by such grocer. The addition of four feet enables the vehicle to carry two (or four, if stacked) additional pallets on every outbound and inbound movement, which is a 7½ percent productivity improvement.

Finally, with respect to the economics of operating the commercial vehicle of the present invention, and the other benefits cited above, and given its simplicity of design, this vehicle may be far less costly to build, and may be far less costly to maintain. Accordingly, it may be expected that most or all private and for-hire carriers, where cube and weight capacities are important, may want to secure a demonstration of this vehicle design for their businesses, making a functional prototype important for the eventual success of this design.

The research and development of this transportation technology, and bringing it to market, may increase the efficiency and safety of transportation systems, may improve air quality by reducing the use of fossil fuels, and may promote the use of alternative energy sources for the purpose of increasing energy efficiency. Use of the commercial vehicle of the present invention, in addition to what has already been stated, may also provide the following advantages:

1) more efficient, more flexible, more economical and more reliable supply chains may more quickly emerge as transportation is the 'beating heart' of all supply chains;
2) reductions of accidents, where heavy trucks moving at high speeds may impact stopped vehicles, and where heavy trucks may be responsible for lane change accidents;
3) increased driver productivity by easing the stress of driving heavy trucks with the adoption and application of autonomous steering, acceleration and braking systems;
4) reduced injuries from slips and falls with the lower height of the entrance and exit steps at the operator's compartment, and reduced arm and shoulder injuries from manually operated roll-up rear cargo doors with the addition of an electronically operated roll-up rear door;
5) faster movement away from greenhouse gas emissions with the introduction of a heavy truck design that may offer a more efficient use of electric energy than the designs currently being developed by North American OEMs; and
6) an open and unobstructed pathway that may more quickly introduce Level 5 Autonomous Systems into the commercial transportation market.

The design of on-board ESDS on a traditional two-axle or three-axle tractor chassis may be a challenge, in terms of providing sufficient space for the ESDS between the front axle and the rear drive axle(s) (see prior art FIGS. 11-15). A three-axle non-sleeper conventional tractor in common use today may have no more than eight feet of space between the front and rear wheels to house ESDS components, and extending the wheel base to make more space for these ESDS components may only add unnecessary weight and may impede loading the steering axle, which may be one of the major problems with articulating vehicle efficiency.

Such complications and restrictions may be avoided with the commercial vehicle of the present invention, as the amount of unrestricted undermount space for all ESDS components of compressed air energy and electric energy, is (e.g.) 37-feet, on each side of the vehicle; additionally, one problem with conventional truck cabs may be the steps required to enter such cabs, and if a design replaced safely-designed steps with steps attached to battery pack covers or hydrogen tank covers, the impact on driver safety in terms of entering and exiting the operator compartment may be adverse.

All ESDS components used for the commercial vehicle of the present invention may be specially engineered to securely fit inside the six undermount spaces 13, 14, 15, 23, 24 and 25 (FIGS. 4-5). The bottom of the cargo-area floor may be 44½ inches above grade, and may have a one-half (½) inch structural aluminum plate attached to the floor cross members where the six undermount spaces are secured, which may leave exactly 44 inches above grade for the enclosures built into these undermount spaces.

Undermount spaces 13, 15, 23 and 25 may be 60 inches wide and may be 36 inches high, for a ground clearance of 8 inches above grade, and these four spaces may be 34 inches deep, with a 30-inch frame width, and 32 inches deep with a 34-inch frame width.

Undermount spaces 14 and 24 may be 27 feet wide; the middle 15 feet of this space may be 30 inches high, for a ground clearance of 14 inches. The 6 feet of undermount space on either side of the middle 15-foot section may be built at a height of 36 inches, for a ground clearance of 8 inches. The depth of all six (6) sections of undermount spaces 14 and 24 may be either 32 or 34 inches, depending upon frame width.

The increased ground clearances at the middle sections of undermount spaces 14 and 24 may be necessary for the vehicle to have no restrictions or obstructions when accessing depressed loading/unloading docks.

The addition of strong, flexible and durable synthetic rubber skirting, designed with a single-shape dimensional memory, slightly turned-in at its base, bolted through a one-inch flange recessed one inch under all undermount spaces, may significantly direct air-flow around the vehicle rather than under the vehicle. This side skirting may have a height of ten (10) inches for the middle 15-foot sections of undermount spaces 14 and 24, may have a height of four (4) inches for undermount spaces 13, 15, 23 and 25, and may have a height of four (4) inches for the two 6-foot-wide end-sections of undermount spaces 14 and 24. This side skirting may effectively reduce ground clearances, and may substantially improve the overall aerodynamics of the vehicle of the present invention, as almost the entire length of the sides of the vehicle, other than the wheel openings, may be fully enclosed and skirted, affording ground clearances of four (4) inches from the front bumper to the rear frame.

The dimensions of all undermount spaces and enclosures, and ground clearance calculations, may be subject to modifications as a result of the performance of a prototype under actual operating conditions; specifically, while accessing depressed loading/unloading docks, including the performance of the specialized pneumatic suspension system designed to raise the rear frame of the vehicle to maintain adequate tire and body clearances while operating under such conditions; however, it may be expected that such modifications to ground clearances would be straight-forward, with only slight dimensional changes to the height of undermount spaces, and with no adverse effects to the performance of the vehicle. Modifications to suspension system functionality may also be uncomplicated, and applicable solutions may already exist and be fully functional.

Operation of a prototype may also determine that the wheel openings of 54 inches may be modified and made either wider, to address the suspension space requirements, or less wide, depending upon the design of the suspension system.

Specific sizes, structural supports, ground clearances and connectivity for all ESDS componentry may be specially designed by electrical and structural engineers, as will be understood by those of ordinary skill in the art. Three-axle and four-axle configurations of the present invention may have ample space available to address these ESDS design questions, and safe and effective solutions may be quickly developed.

With respect to improved productivity and efficiency, as compared to three-axle, four-axle and five-axle articulating vehicles (whether internal combustion, battery electric or hydrogen electric), preferred attributes of the commercial vehicle of the present invention may include: 1) faster access to docks and quicker operator access and exit; 2) improved yard and highway maneuverability; 3) quicker acceleration; 4) enhanced axle weight distribution for more efficient and faster cargo loading; 5) faster turning and backing with (e.g.) four steer axles; 6) additional length of floor space (e.g., no less than four feet); and 7) less downtime and equipment failures, as hydraulic powered steering, braking and cargo lifting devices may be replaced with all-electric systems and components, reducing cost to build, coat to maintain, and reducing vehicle weight.

Additionally, as noted above, all energy is produced only by battery-electric, hydrogen-electric or compressed air systems, while the connectivity of such systems may be hard-wired and permanently connected. This is in contrast to hydraulic systems, preferably not used on any of the alternative examples of the present invention, but often used with articulating combination vehicles for cargo lift systems, and for steering and braking; additionally, such hydraulic systems may have more and heavier parts, including high pressure hoses and connections, compressors, pistons and pumps, all of which may be subject to higher incidence of leakage and failure, and may be more expensive to maintain than electric-powered components.

As range is primarily a function of the amount of electrical energy produced, with up to (e.g.) 74 feet of undermount space for all ESDS components, vehicles of the present invention may have a range unequaled as compared to battery-electric or hydrogen-electric powered combination vehicles.

The benefits of adopting of Autonomous Vehicle Systems cannot be overstated. Highway Safety Advocates predict that fully developed, tested and certified autonomous systems in highway vehicles may save thousands of lives. As a zero-emission non-articulating vehicle, with (e.g.) four steer axles and large capacity ESDS, the commercial truck of the present invention may quickly adopt Level 5 Autonomous System Design.

As detailed here, this non-articulating design facilitates "hard-wired", "fail-safe", and permanently-connected electrical and pneumatic connectivity for braking, steering, lighting, sensors, cameras, radar, telematics, tire air pressure, communications, autonomous system sensors, actuators and controllers, electric cargo lifts, cargo cooling and heating and propulsion control, thereby providing a significant step forward to adopting fully autonomous system functionality into the preferred invention.

An important safety-oriented element of the present invention that cannot be overstated in the quest for successful autonomous vehicle design may be the permanent connectivity that virtually eliminates all manual connect/disconnect functions (which must occur every time a trailer is coupled and decoupled from a tractor) which, as earlier stated, may eliminate the ever-present threat of exposing air lines and electrical wires to becoming snagged, torn or disconnected in the dangerous, open and pivoting space between the tractor and trailer, which may result in seal failures from moisture, dirt, ice or salt contamination, or failure from having made incomplete or partial connections.

By addressing these serious flaws in articulating vehicle design, the vehicles of the present invention may introduce a solution in a commercial truck design that makes electrical signal failures and air pressure losses virtually impossible, and may speed the adoption of autonomous system designs, and as such may be leading the way forward to much safer commercial transportation.

Addressing the methodology for a reduction in the number of trailers from transportation operations requires some discussion. Within many distribution centers, where the selection of products, palletizing such products and staging of such palletized products, may be performed at or near the truck loading areas, and where such pallets may then be quickly and efficiently loaded onto trailers, may suggest that in many situations a transition to replacing trailers with the vehicle of the present invention may be uncomplicated. Accordingly, eliminating a large percentage of trailers becomes an additional direct and sizable benefit to companies that can effectively plan and schedule cargo staging, palletizing, loading and unloading.

The cost of a refrigerated trailer in 2022 may be at least $70,000, and the cost of a non-refrigerated trailer may be at least $22,000. Eliminating these costs is a worthwhile and beneficial undertaking, made more realistic with advancing transportation technologies.

Within new distribution center design, both physical and digital, it is reasonable to assume with new data analytics, including 5G networks and block-chain technologies, load planning algorithms, and more precise visibility of transportation capacity and demand, more efficient use of transportation assets and resources may become a reality; additionally, the future of supply chain management applying artificial intelligence may almost certainly optimize the use of transportation resources, also suggesting that a long-term transition away from a significant number of combination vehicles to a vehicle of the present invention may be expected, especially where the application of effective transportation resource management technology is applied.

With expected new technologies applied to managing transportation resources, the efficiencies developed may enable private fleets, dedicated fleets, specialized fleet operations, and large LTL (Less-Than-Truckload) fleets with significant terminal-to-terminal movements, may enable such fleets to substantially reduce transportation costs by reducing the size of their trailer fleets by applying the utility of the vehicle of the present invention into their transportation operations.

The utility of the vehicle of the present invention may be specifically applicable to private fleets and dedicated carriers operating as de-facto private fleets, and certainly true of some well-run for-hire carriers, where such fleets and carriers may have effective controls of all transportation scheduling and complete end-to-end visibility of fleet movements, enabling them to more quickly reduce trailer fleet sizes.

Commercial application of the present invention, especially in the four-axle configuration, may be easily and quickly integrated into much of the open-top and flatbed trailer transportation services as the top and side loading of such trailers may be done while such trailers are coupled to tractors, and even after deliveries are made such trailers may remain coupled to tractors unless decoupled for both scheduled and corrective maintenance services.

Many other industries may readily adopt the utility of the present invention, and it is to be expected that many may find such adoption to be more efficient overall, especially where pallet-loading may be used. Even in industries where there may be limited space, and where products may need to be preloaded, or hand-loaded, there may still be elements of their operations where the utility of present invention may be beneficial for many of the reasons stated.

As noted above, the economic benefits using the vehicle design of the present invention in the retail grocery industry may be significant, and there may be many other industries where savings from additional pallet positions and overall cargo capacity, both weight and cube, may be realized, such as beverage, building materials, corrugated and box manufacturers, food manufacturers, consumer goods manufacturers, and manufacturers of light and bulky commodities. Even common and contract motor carriers may benefit from the use of the present invention, such as dedicated contract services, terminal-to-terminal movements, and specialized transportation services.

Given how many LTL and full-truckload for-hire carriers operate, it may be expected that many such carriers operating 80,000 lb. GCWR combination vehicles, including 28-foot twin-trailers, may find it advantageous to have a mixed fleet of traditional combination vehicles with the vehicle of the present invention, in the 4-axle, 82,000 lb. GVWR, and 70 foot length configuration, especially as the risks of connectivity failures may increase in twin-trailer operations, where four (4) individually air-braked vehicles, consisting of one tractor, one converter dolly and two trailers, may all require manual connectivity of compressed air and high and low voltage electricity.

With the advancing technologies of heavy truck powertrains becoming battery-electric or hydrogen-electric, and with the arrival of Level 5 Autonomous Systems for heavy truck design, especially as Level 4 may have already been achieved, the time may be fast approaching for the unique non-articulating design vehicle configurations of the present invention to be developed as prototypes, thoroughly designed, fully tested, and strategically placed into specific service environments where the advantages discussed here may be observed and experienced under actual operating conditions.

Replacing traditional three-axle, four-axle and five-axle tractor-trailer configurations, and certain two and three-axle straight truck configurations, in urban and regional applications, where the introduction and use of the present invention may yield improvements in safety, air quality and productivity, are all worthy solutions from any perspective. Making accurate predictions about market penetration with the design configurations of the present invention may be difficult; however, with the inventor's experience in commercial transportation, it may be envisioned that of the total market share of 80,000 lb. GCWR five-axle articulating combination commercial vehicles, the present invention, in its four-axle configuration, may initially displace as much as 10% of such market, and over time may displace more than 10%. With respect to the urban and regional-oriented three (3) axle straight truck market and three (3) axle combination vehicle markets, it is expected the market penetration for these types and sizes of commercial vehicles may be significantly higher with the 60,000 lb. GVWR configuration of the present invention.

It can be expected that within a relatively short period, battery technology advancements, including solid-state battery designs, and remote (wireless) automotive battery charging, may be a commercial reality. When this occurs the above prediction for the combination vehicle 5-axle 80,000 lb. GCWR market displacement by the present invention may rise even more significantly, and may secure an even more significant portion of the 3-axle straight truck and the 3-axle combination vehicle markets, in both urban and regional operating areas.

With respect to solid-state batteries and more efficient charging of such batteries, the 'Wall Street Journal', Sep. 29, 2021, in an article titled: "Volkswagen, Ford, Other Big Auto Makers Push to Make Solid-State Batteries the Next Big-Thing for EV's", is certainly suggesting large scale momentum in the development of new technologies for battery-electric vehicle propulsion. And in a Sep. 30, 2021 article in 'Heavy Duty Trucking' it was reported that the USDOE has a project underway to develop Class 8 (Commercial Truck) wireless charging systems; and another article in 'Heavy Duty Trucking' disclosed a new technology by a company called WiTricity that may make wireless charging possible for all types of electric vehicles. This all suggests that EV technologies in batteries and charging systems may continue getting so much more efficient that the movement from internal combustion propulsion to battery-electric propulsion may overtime be irresistible and irreversible.

In 2024, numerous companies (Toyota, BYD, Honda, Mercedes Benz, Samsung, Quantum Scape and BMW/Solid Power) have designed and built functionally successful solid-state batteries. As compared to existing lithium-ion batteries in common use today, these solid-state batteries may be lighter, charge_more quickly, hold the charge longer, may have longer life expectancy, and may have more energy-density. All of the companies mentioned above, and many others, may be very close to design solutions enabling successful commercial production and distribution of solid-state batteries.

In the future, near or far, when fast-charging, lightweight, solid-state batteries, or even more advanced battery designs, and remote (wireless) charging technologies may be perfected, and in-service at most truck stops, the operating range of commercial trucks of the present invention may be comparable to traditional five-axle combination vehicles, whether internal combustion, battery-electric or hydrogen-electric, and may be efficiently used in longer interstate movements that may include operator layovers; however, such comparison may then take into account the design flexibility of the present invention regarding length and enhanced aerodynamics in addition to the operating range, as the features and benefits of the three- and four-axle configurations of the present invention may offer significant productivity, efficiency and safety advantages over five-axle combination vehicles when operating on longer interstate movements.

Projecting a comparison of 5-axle 80,000 lb. GCWR combination vehicles, with 70-feet of overall length and an overall design in common use today, to the present invention with the same overall length, both with 48-inch sleeper berths, may describe how the present invention may have an extraordinary productivity benefit for transportation of lightweight and bulky commodities, and commodities where floor-space is critical.

For example, the shortest sleeper tractor in common use today may have a cab length of 13 feet, including a 48-inch sleeper berth. The total length of this combination vehicle may be 70 feet: 13 feet for the cab, 4 feet between the cab and trailer, and 53 feet for the trailer. The 4-axle, 80,000 lb. GVWR design of the present invention may be designed and built to this same 70-foot overall length, and may have no change to the axle configuration, and may have no significant increase in empty weight.

The four-axle 80,000 lb. GVWR configuration of the present invention, described in the paragraph above, may have a cargo body length of 61 feet, (70 feet minus 5 feet for the operator's compartment and 4 feet for the sleeper berth) which may be a 15.1% cubic capacity increase over the standard 53-foot trailer. Without a sleeper berth, the 65-foot cargo body may represent a 22.6% increase in cubic capacity and floor space.

In addition to such substantial benefits already stated, there may be other clear and realizable benefits from commercial vehicles of the present invention operating in longer distance interstate transportation, including:
A) At the longer body length referred to above having a 70-foot roof length, such configuration may have an even larger energy source available for normal operations, or for emergencies, from no less than 536 square feet of solar panels;
B) With its low center of gravity vehicles of the present invention may be less likely to experience instability in high winds or on severe or compound curves, elements which may be generally expected and encountered in long distance interstate transportation.
C) With its non-articulated and integrated cargo body design, the vehicle operator, while in-transit, especially over long distances, may have on-board controls in-place to continuously monitor the cargo body interior for temperature, humidity, and the stability of the cargo.
D) The 53-foot trailers, the most common sized trailer in use today in interstate movements, may track, or trail, unsafely when operating on horizontal curves if the axles on such trailers are inadvertently slid too far to the rear. Almost all states have rules where the axles on 53-foot (or longer) trailers must be positioned to prevent trailer-tracking outside of the lane of travel, referred to as KPA (king-pin-to-axle) measurements, expressed in feet. For example, in California the KPA distance is 40 feet, in West Virginia it is 37 feet (mountainous terrain, shorter KPA for horizontal curves), and in Indiana it is 43 feet (flatter terrain, longer KPA for horizontal curves). The trailing danger with long combination vehicles is two-fold. First, inadvertent sliding of trailer axles too far to the rear may occur, creating unsafe trailing, especially on two lane roads. Second, there is a risk of a combination vehicle travelling from an Indiana point of origin, with its trailer axle KPA correctly set at 43 feet, and travelling through West Virginia, where a 37-foot KPA is mandated, without correcting the trailer axle KPA to 37 feet, potentially exposing oncoming traffic on two-lane West Virginia roads to unsafe conditions. With its non-articulating design and all-wheel "in-phase" steering, vehicles of the present invention may solve the trailing problem inherent to combination vehicles, and with radar and camera systems integrated into the autonomous systems this design may be inherently safer with near perfect tracking characteristics.
E) In addition to housing ESDS componentry, under-mount spaces 13, 14, 15, 23, 24 and 25 (FIGS. 4-5) may be fully enclosed and may be built with a smooth frontal surface for the full length of these compartments, going wheel-to-wheel with a very effective aerodynamic design, and as such may have the same function as the side-skirting used on many long-distance combination vehicle tractors and trailers; however, in the configuration of the present invention the aerodynamics may be more efficient as the side skirting would cover more than what may be covered in combination vehicles in common use today. and side-body ground clearances may be as low as 4 inches using flexible and durable rubber skirting for the full length of the vehicle, and there may be no tractor-trailer gap, which creates a 'drag' from unstable air forming a vortex between the tractor and trailer, and there may be no landing gear and no open space under the cargo body, both of which may create turbulence and 'drag' and may not be completely eliminated or effectively enclosed. Additionally, the rear of the body of the present invention may have aerodynamically designed 'wings' to improve air flow over the vehicle and reduce the rear vortex-effect that creates drag on the vehicle, (such 'wings' may also be effectively used on combination vehicle trailers) and eight (8) aerodynamically designed wheel covers may be installed over all eight (8) wheels.

With this level of increased cubic capacity afforded by the present invention at 70 feet of overall length, there may likely be further and faster penetration into the heavy truck market. Such added penetration may yield the benefits already projected, including increased energy efficiency, less heavy truck greenhouse gas emissions, fewer heavy trucks on the road, positive effects to the chronic truck driver shortage, improved supply chain performance, safer interstate highway system, increasing transportation productivity, and faster adoption of Level 5 Autonomous Systems.

As described below, the vehicle of the present invention may be effectively reconfigured for long distance interstate transportation operations, as described below:
1) built with the overall length increased to 72 feet;
2) built with the operator's compartment lengthened to 7 feet;
3) built with the related aerodynamic improvements from the longer operator's compartment as earlier described;
4) built with no cargo refrigeration/heating system, or a redesigned cargo refrigeration/heating system, that conforms to the more aerodynamic and recontoured space at the front of the vehicle;
5) built with propulsion from the expected battery technology improvements as earlier described;
6) built to initially achieve a 600-700-mile operating range, and eventually a substantially longer operating range, with continuous advancements in battery technology;
7) built with multiple battery charging functions, performed where battery charging may be performed at layovers or destination points, where heavy truck charging stations may be readily accessible; and 8) built with no sleeper berth for unattended layovers, affording a 22% productivity benefit, or built with a sleeper berth for attended layovers, for a 15% productivity benefit.

The vehicle of the present invention, as described directly above, may provide future commercial vehicle long-distance interstate transportation options not earlier described or detailed in this patent application, such as an extended operating range, longer overall length, options for sleeper berths and enhanced aerodynamics. Together with all the other safety, operational and productivity benefits already described, such reconfigured vehicle may be positioned for much wider penetration into commercial transportation, and become a viable replacement for many articulating combination commercial vehicles transporting perishable or nonperishable commodities in long-distance interstate transportation, whether powered by internal combustion, hydrogen-electric or battery-electric.

As earlier stated, the present invention also addresses the critical issue of the commercial driver shortage. If commercial vehicles of the present invention went into service in 10% of the 80,000 lb. GCWR combination vehicle market, with a minimum of a seven percent (7%) increase in productivity, the effect on the driver shortage may not be immediately noticeable; however, a more substantial impact may be realized in the three-axle markets. Additionally, if vehicles of this design evolve to the 70-foot length described above, or the 72 foot length described above, with ESDS using solid state batteries, remote charging, and with Level 5 Autonomous Systems in place, the market penetration of this present invention may be more significant and may have a more noticeable effect on the commercial driver shortage by attracting more younger people to the industry, and by keeping those currently driving from leaving the industry.

A four-axle, 80,000 lb. GVWR commercial highway vehicle may be quite rare, if one exists at all. Compliance with the current federal 80,000 lb. Bridge Law Gross Weight Limits applied to commercial highway vehicles may require that vehicles of the present invention have a length restriction and/or have a fifth axle, or be restricted to a GVWR of 76,000 lbs., none of which is acceptable.

With vehicles of the present invention, the fifth axle may not be relevant, as the 80,000 lb. capacity vehicle of the present invention is designed with the required outer axle spread of 51 feet, which may be the same as the five-axle combination vehicles, and may displace 80,000 lbs. over four axles, with spreads of 10 feet for each axle set, which is in compliance with the specific Bridge Formula that is used for 10-foot spread axle weight compliance. In fact, the 80,000 lb. weight distribution over the 51-feet wheelbase of the vehicle of the present invention may be far more balanced than the weight distribution over a 51-foot wheelbase of five axle 80,000 lb. GCWR tractor-trailer combination vehicles.

Bridge laws are essentially "weight-to-length" laws, and if such laws allow a single axle to carry 20,000 lbs. the requirement for the fifth axle may be relevant only for combination vehicles where the steer axle, as the fifth axle, may be needed to achieve an 80,000 lb. GCWR. Given this, the basis for a fifth axle exemption for vehicles of the present invention may be reasonable and defensible. Further, nothing in the axle configuration of vehicles of the present invention may, by nature of its design, create an overload risk on any public road or bridge; instead, given their weight distribution as compared to combination vehicles in common use today, just the opposite may be expected.

Acknowledging the above, and acknowledging that federal bridge laws in the past may have been modified for 80,000-pound GCWR tractor-trailer combination vehicle axle and length configurations, and acknowledging that the present invention may be a logical replacement of many 80,000-pound GCWR tractor-trailer combination vehicles with a non-articulating 80,000-pound GVWR configuration that exhibits a long list of stated benefits, it may not be too far-fetched to predict that the projected and potential benefits of vehicle designs of the present invention may be reason enough for applicable federal (USDOE and USDOT) vehicle size and weight laws to be revised to secure a fifth axle exemption and may also result in a revision of the commercial vehicle length laws.

Referring now to FIG. 10, the first alternative exemplary example of the present invention to FIG. 1 is shown. The FIG. 10 vehicle design is shown in the configuration of a three-axle vehicle with a 60,000-pound GVWR. Exemplary dimensions are as follows:

1) operator compartment length of 60-inches (A), providing space for the front mounted cargo refrigeration/heating system above the operator compartment;
2) overall length (B) of 53-feet;
3) overall height (C) of 13 feet, 6 inches;
4) width of rear undermount space 34 of (D) 60-inches;
5) width of middle (secondary) undermount space 33 of (E) 60-inches;
6) width of forward undermount space 31 of (F) 60-inches;
7) wheelbase (G) of 32-feet, required for GVWR of at least 60,000 lbs.;
8) width of middle (primary) undermount space (H) of 17 feet, 8 inches;
9) wheelbase between two rear driven axles (J) of 10-feet, the minimum distance for each axle to lawfully carry 20,000 lbs.;
10) front steerable E-axle 35A rated at 23,000 lb. maximum capacity;
11) two rear-driven E-axles 36A and 37A, both steer axles, each rated at 23,000 lb. maximum capacity, and both powered by the ESDS of undermount space 32, with such power supplied to each axle alternately, or simultaneously, as may be required by operating conditions;
12) This configuration may be designed with only one of the two rear E-axles being a steerable driven E-axle, and the remaining two E-axles being non-driven steerable E-axles; and
13) This vehicle may be designed and built with a seven (7) foot long operator's compartment, and may be designed and built without a front mounted cargo heating and cooling system, and may be designed and built with a redesigned and recontoured front-mounted cargo heating and cooling system that may conform to the redesign and recontouring of the vehicle's frontal area as a result of the extended length of the operator's compartment, which together may provide a more aerodynamic frontal design than what is shown in FIG. 10.

In addition to the width of undermount spaces 31, 33 and 34, the height of each such undermount space may be (e.g.) 36 inches, for a ground clearance of 8 inches. The middle 8 feet of undermount space 32 may be built with a height of 30 inches, for a ground clearance of 14 inches. The 4 feet 10 inches of space fore and aft of the middle of undermount space 32 may each be built with a height of 36 inches, for ground clearances of 8 inches. The depth of all undermount spaces is (e.g.) 34-inches with a 30-inch-wide frame, and 32 inches with a 34-inch-wide frame. The dimensions as to each of the four undermount spaces may be identical on each side of this vehicle.

The height difference between the middle eight (8) feet of undermount space 32 and all other undermount spaces may be to assure sufficient clearances when accessing depressed loading/unloading docks.

The aerodynamic configuration of the first exemplary example of the vehicle of the present invention, in its three (3) axle configuration, may have the same overall dimensional characteristics as the (4) axle design of the present invention, including aerodynamically-contoured front radius corners, aerodynamically-shaped front bumper, wheel covers on all 6 tires, and the vehicle may include strong and flexible synthetic rubber skirting, designed with a single-shape dimensional memory, slightly turned in at the bottom, and bolted onto the underside of all undermount spaces. The skirting may be ten (10) inches high at the middle eight (8) feet of undermount space 32, and the skirting may be four (4) inches high under all other undermount spaces. Such skirting may provide for side-body ground clearances of 4 inches from the front bumper to the rear frame of the vehicle, excluding sections where wheels are located.

The alternative exemplary example of the present invention, as illustrated in FIG. 10, may be built with a front-mounted refrigeration system identical to such system used in the 4-axle configuration of the present invention designed to heat, cool or freeze perishable or sensitive commodities carried in the cargo body of the vehicle. This vehicular example may be designed and built to carry commodities not requiring heating, cooling or freezing, and by eliminating the front-mounted cargo refrigeration/heating system, or completely redesigning and recontouring the front-mounted cargo refrigeration/heating system, the vehicle may be designed and built with a completely reshaped frontal area, with a seven (7) foot long operator's compartment, rather than five (5) feet, creating a frontal design with a significantly improved aerodynamic shape to the roof section directly above the operator's compartment, affecting a much smoother and less restrictive air flow over the top of the vehicle. Additionally, by moving the operator seating to the middle of the seven (7) foot long operator's compartment the front radius corners may also be reshaped for maximum air flow efficiency, affecting a much smoother and less restrictive air flow along the sides of the vehicle; additionally, the vehicle may have a molded and aerodynamically-shaped front bumper cover, designed to absorb impact, with the same side contours as may be used with the reshaped front radius corners.

The dimensions of all undermount spaces and enclosures, including the width of wheel opening, and ground clearance calculations, may be subject to modification as the result of the performance of a prototype under actual operating conditions, specifically, while accessing depressed loading/unloading docks, including the performance of the specialized pneumatic suspension system designed to raise the rear of the vehicle to maintain adequate tire and body clearances while operating under such conditions; however, it may be expected that such modifications to ground clearances may be straight-forward with only slight dimensional changes to undermount spaces, and may have no adverse effects to the performance of the vehicle, and modifications to pneumatic suspension system functionality may also be uncomplicated, as applicable solutions may already exist.

This three-axle configuration with the 32-foot wheelbase may be built with an overall body length of between 48-53 feet. The 53-foot dimension referred to above may include undermount space 34 at 5-feet wide. Removing undermount space 34 from the vehicle would reduce the overall length to 48-feet.

It will be understood that the differences between the above body length dimensions may be dependent upon whether undermount space 34 was not needed and deleted, or if an electric cargo lifting device was specified that may be 'tuck-a-way' or 'glide-under,' and if such lifting device was required the body length may be 53 feet, in which case undermount space 34 may house the lifting device.

A rear-frame mounted electric cargo rail-lift device may be attached directly to the rear frame, and such frame-mounted cargo lifting device may be directly hard-wired from undermount space 34, and if the vehicle's body length was shortened to 48 feet, and undermount space 34 was eliminated, the electricity for such rail-lift may be supplied from undermount space 33.

If undermount space 34 remained in place, at 5-feet of width, and the electric cargo rail-lift was mounted onto the rear frame as specified in the above paragraph, undermount space 34 may be used to both power the rear-frame mounted cargo lift device and provide power for an optional electric roll-up rear door, and undermount space 34 may also provide back-up or emergency power generation to support all other non-propulsion electrical power requirements of the vehicle.

Fifty (50) feet of roof-mounted solar panels 21 may be provided to supply auxiliary ESDS or power for the front-mounted cargo refrigeration and heating system.

Still referring to FIG. 10, the undermount space 31 (applicable to both sides) may perform the same functions as the undermount spaces 13, 25 of the 4-axle-configuration, while the undermount space 33 (applicable to both sides) may perform the same functions as undermount spaces 15 and 23 of the 4-axle configuration, all shown on FIGS. 1, 4, 5 and 7.

The primary undermount spaces for vehicle propulsion 32, identical on both sides, may both perform identical functions as spaces 14 and 24 of the 4-axle configuration in FIGS. 1, 4, 5 and 7.

While the example in FIG. 10 is 53-feet in overall length, with a 32-foot wheelbase, this configuration may alternatively be built, for example, with a 39-foot wheelbase, providing an overall length of between 55-60 feet. This design may maintain its 60,000 lb. GVWR for cargo body lengths from 50-55 feet. The functionality of the components may be the same as the component functionality of the 32-foot wheelbase vehicle, with the additional width for the primary undermount space 32 increasing from (e.g.) 17 feet, 8 inches to 24 feet, 8 inches.

With such alternative design the primary undermount space 32 would be 24 feet, 8 inches in width, and may be separated into three (3) distinct undermount spaces to effect adequate ground clearances when accessing depressed loading/unloading docks. The middle section of undermount space 32 may be built with a width of 12 feet, and the two undermount spaces on either side of the middle section of undermount space 32 may each be built with a width of 6 feet 4 inches. The dimensions and ground clearances of undermount spaces 31, 33 and 34 may remain the same With space 32 at 24 feet 8 inches, and divided into three sections, the middle section of such space may require the middle of undermount space 32, at 12 feet in width, be reduced in height to 30 inches, and the two 6-foot 4-inch sections of undermount space 32, located on either side of the such middle undermount space, may be built with a height of 36 inches.

The aerodynamic configuration of the three axle vehicle, with the different heights of the undermount spaces, necessitated as a result of ground clearances on recessed approaches to depressed loading/unloading docks, may not be adversely affected, as the flexible rubber skirting attached to the bottom of the undermount spaces would be ten (10) inches for the middle section of undermount space 32, and four (4) inches for undermount spaces 31, 33 and 33, and four (4) inches for the two outer sections of undermount space 32, each designed to be six feet 4 inches wide, and with the exception of the wheel openings, may afford full length ground clearances of approximately four (4) inches from the front bumper to the rear frame of the vehicle.

It should be noted that the most common trailer lengths currently operated today may be 53-feet, with shorter versions at 42-feet and 45-feet in overall length, and all such trailers may have rear door frames and front bulkheads which decrease the usable interior space. The design configurations disclosed here may all preferably have the same reductions in usable cargo space from door frames and bulkheads.

With the exception of access to the operator compartment, the left and right sides of the vehicle in FIG. 10 may be identical. Components shown in FIG. 10 that are not identified or detailed may be identical to the components of the preferred example of the present invention FIGS. 1-9. For example, the FIG. 10 example, with respect to operating efficiency, energy efficiency, aerodynamics, operating range, productivity, safety, cost to build and maintain, maneuverability, sustainability, autonomous system functionality and adaptability, cargo security, design flexibility vis-a-vis battery-electric propulsion or hydrogen-electric propulsion, and energy boost from full-length solar panels, may replicate all of the functionality of the preferred embodiment of the present invention as shown in FIGS. 1-9.

The pneumatic system of the vehicle in FIG. 10 supplies compressed air for the vehicle's suspension system, and supplies compressed air for the vehicle's tire inflation system, all controlled by the vehicle's autonomous operating systems. Undermount spaces 31, 33 and 34 each contain one (1) electric air compressor, one (1) compressed air supply tank, and one (1) compressed air service tank.

Pneumatic system components located in and near undermount space 31 may be directly plumbed to the front axle 35A suspension system and to the front axle tires 35; such components located in and near undermount space 33 may be directly plumbed to the mid axle 36A suspension system and to the mid axle tires 36; and such components located in and near undermount space 34 may support the rear axle 37A suspension system, and the rear axle tires 37.

The autonomous systems of the vehicle directly control the functions and applications of the pneumatic systems of the vehicle. To assure absolute reliability and functionality of the pneumatic systems of the vehicle all three electric air compressors and all six (6) compressed air tanks may be directly, sequentially and permanently plumbed together, for a design whereby each compressor may become a back-up, or reserve compressor for the other two compressors, assuring that in the event of a failure of any one or any two of such compressors the vehicle's autonomous system may instantly redirect compressed air from the functioning compressor(s) to the compressed air tanks initially supplied by the failed compressor; additionally, in the event of a leak or failure of one or more compressed air tanks the vehicle's autonomous system may instantly redirect compressed air to the suspension system or tires affected by such leak or failure, or to the compressed air tank directly connected to the leaking or failed compressed air tank, thereby maintaining safe and reliable pneumatic system functionality.

If a configuration of the vehicle in FIG. 10 was built with a 48-foot long body eliminating undermount space 34, or was built with a glide-under electric cargo lifting device housed in undermount space 34, the pneumatic system components designed to be located in undermount space 34 may then be relocated to undermount space 33, with no change to the functionality of such components as there may be sufficient space for such component relocation.

While the vehicle in FIG. 10 may be a design more oriented to regional transportation, this vehicle may have the same attributes and advantages as the preferred example in FIG. 1, and the vehicle in FIG. 10 may also operate as efficiently and safely in more long-distance types of transportation as it may have comparable capacity and range as the most efficient combination vehicles in use today that are powered by internal combustion, battery-electric or hydrogen-electric energy.

The 3-axle configuration of the present invention may have an overall length with the 32-foot wheelbase of between 48-53 feet, and the overall length of this configuration with the 39-foot wheelbase may be between 55-60 feet. However, this configuration may be built with any wheelbase between 32-39 feet, with appropriate changes made to the dimensions and functionality of the undermount spaces, including lengthening the operator's compartment to 7 feet.

Referring now to FIGS. 16-21, a comparative turning radius analysis is now described to further explain the advantages of the present invention. The relative turning characteristics of Vehicle "A," a 5-axle articulating tractor-trailer combination vehicle with a 51-foot wheelbase, is compared to the turning characteristics of Vehicle "B," a four-axle non-articulating vehicle of the present invention, having an identical 51-foot wheelbase.

Figure 16:
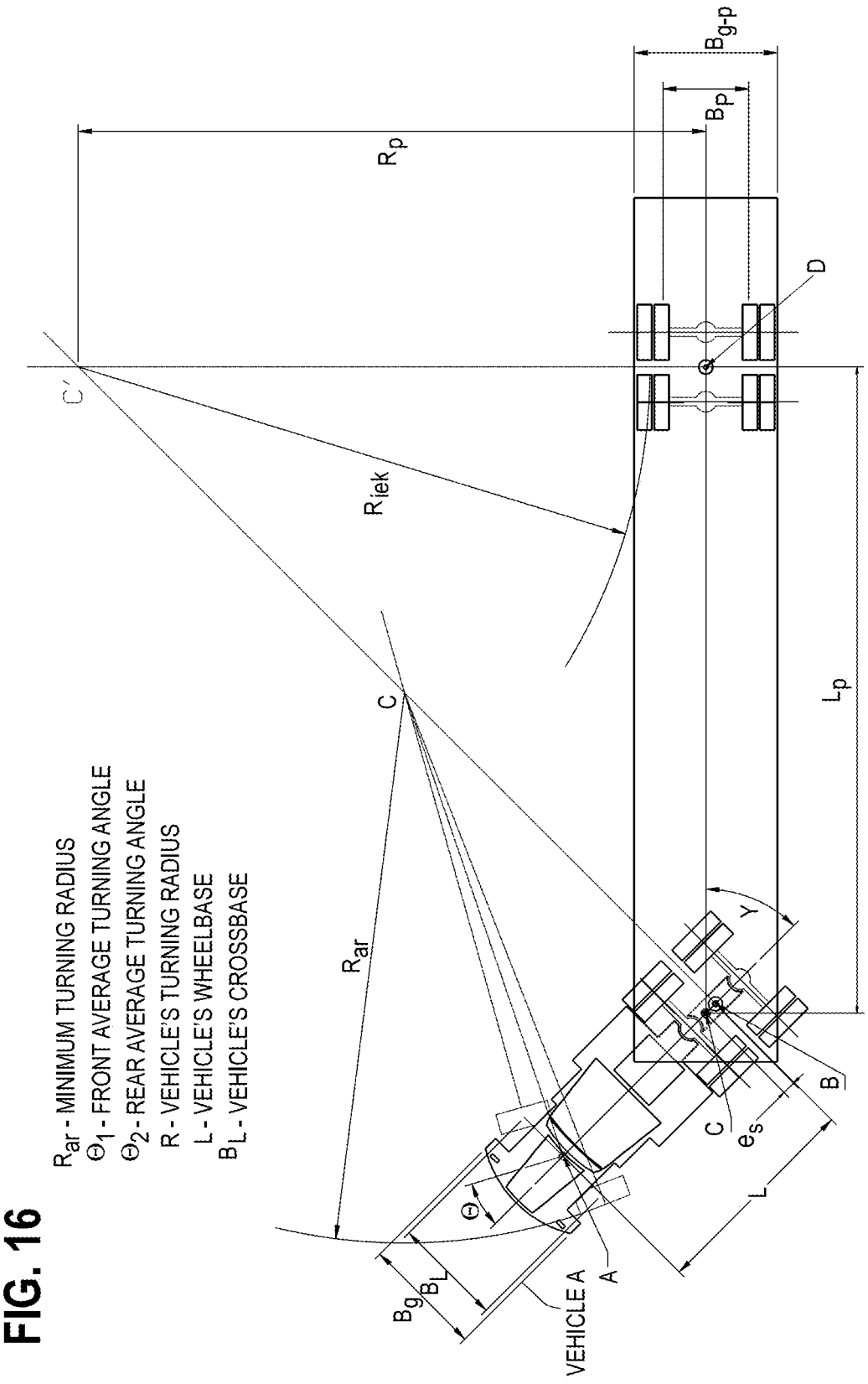
FIG. 16 is a schematic diagram of a conventional trailer-tractor truck combination executing a turning maneuver at 45 degrees, and showing the turning formula variables applied to such maneuver.

Referring first to FIG. 16, Vehicle "A" is a 5-axle articulating tractor-trailer combination vehicle with a three-axle tractor having: a 150-inch wheelbase, measured from the center point of the steer axle hub to the center point of the rear tandem axles; an overall wheelbase of 51-feet, measured from the center point of the steer axle hub to the center point of the rearmost trailer axle hub; a 96-inch wide steer axle track; a 96-inch wide tandem drive axle track; a 102-inch wide trailer tandem axle track; a trailer king pin (pivot point) set at 10-inches ahead of the center point of the rear tandem axles; a trailer king pin-to-tandem trailer axle center line of 40-feet (KPA); the tractor tandem axles are set at a 52-inch hub-to-hub distance; the tires are 10.8-inches in width and have a 41-inch diameter with a 19.6-inch loaded radius, and an overall width of the dual tires on both tractor and trailer of 24-inches, with a 2-inch space between the tires; and a 40-degree front axle wheel cut. Vehicle "A" is one of the most common configurations of an at-least-80,000 lb. capacity five-axle combination vehicle operated in regional transportation.

Still referring to FIG. 16, the following formula was used:

$$\underline{Rar} = \sqrt{(R+BL/2)^2 + L^2} = \sqrt{(L \cdot \cot(\text{average turning angle}) + BL/2)^2 + L^2}$$

With FIG. 16: "A" is the center point of the front axis; "B" is the center point of the rear tandem of the tractor; "C" is the pivot point for the articulated joint between the tractor and the trailer; and "D" is the center point of the rear tandem of the trailer.

Figure 17:
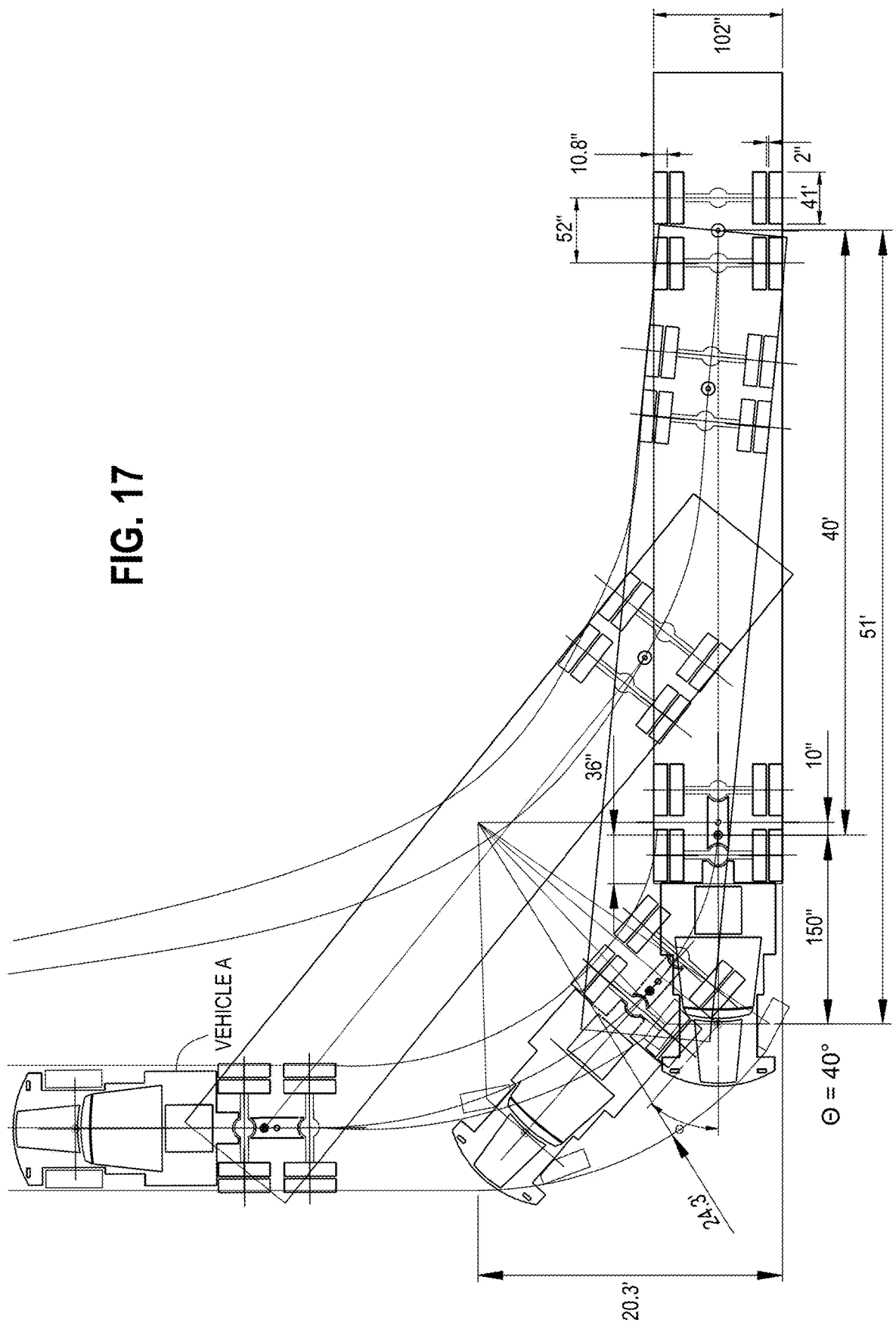
FIG. 17 is a schematic diagram similar to FIG. 16, with the turning maneuver progressing to 90 degrees.

Referring to FIG. 17, Vehicle A is shown executing a 90-degree turn with a 40-degree front axle wheel cut.

Figure 18:
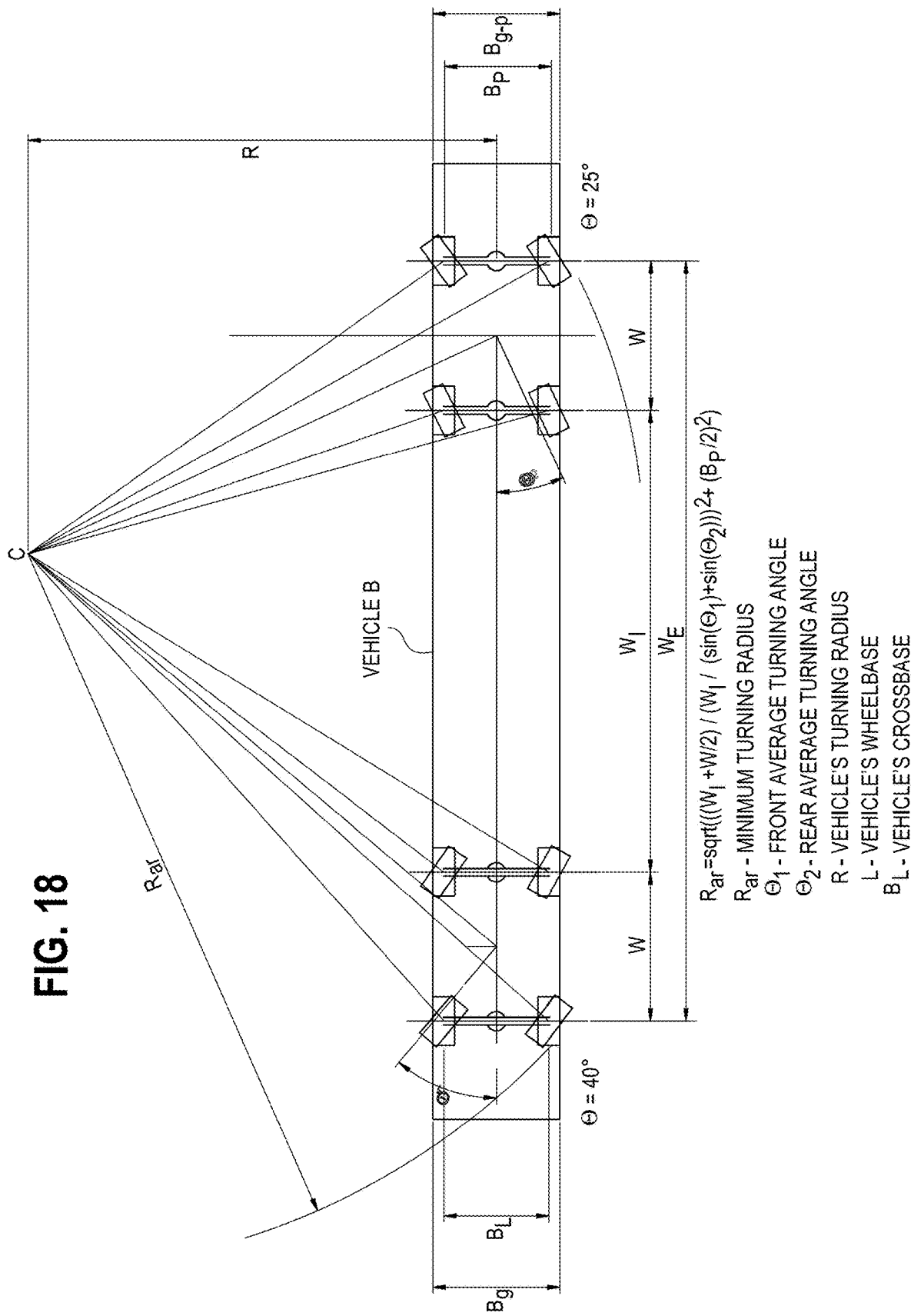
FIG. 18 is a schematic diagram illustrating various turning formula variables with the four (4) axle non-articulating vehicle of the present invention.

Referring to FIG. 18, Vehicle "B" is the preferred example of the present invention, a four-axle non-articulating vehicle with: a 51-foot wheelbase, measured from the center point of the forward-most axle hub to the center point of the rear-most axle hub; 31-feet between the center point of the two intermediate axle hubs; 10-feet between the center point of each of the front two axles hubs and 10-feet between the center point of each of the rear two axle hubs; a 102-inch wide wheel track for all eight wheels; eight tires each 17.5 inches wide and 39.2-inches in diameter; all-wheel steering; and a 40-degree wheel cut on the front four wheels of the two forward axles, and a 25-degree wheel cut on the four wheels of the two rear axles. The formula shown at FIG. 18 can be used to derive the minimum turning radius $R_{ar}$.

Figure 19:
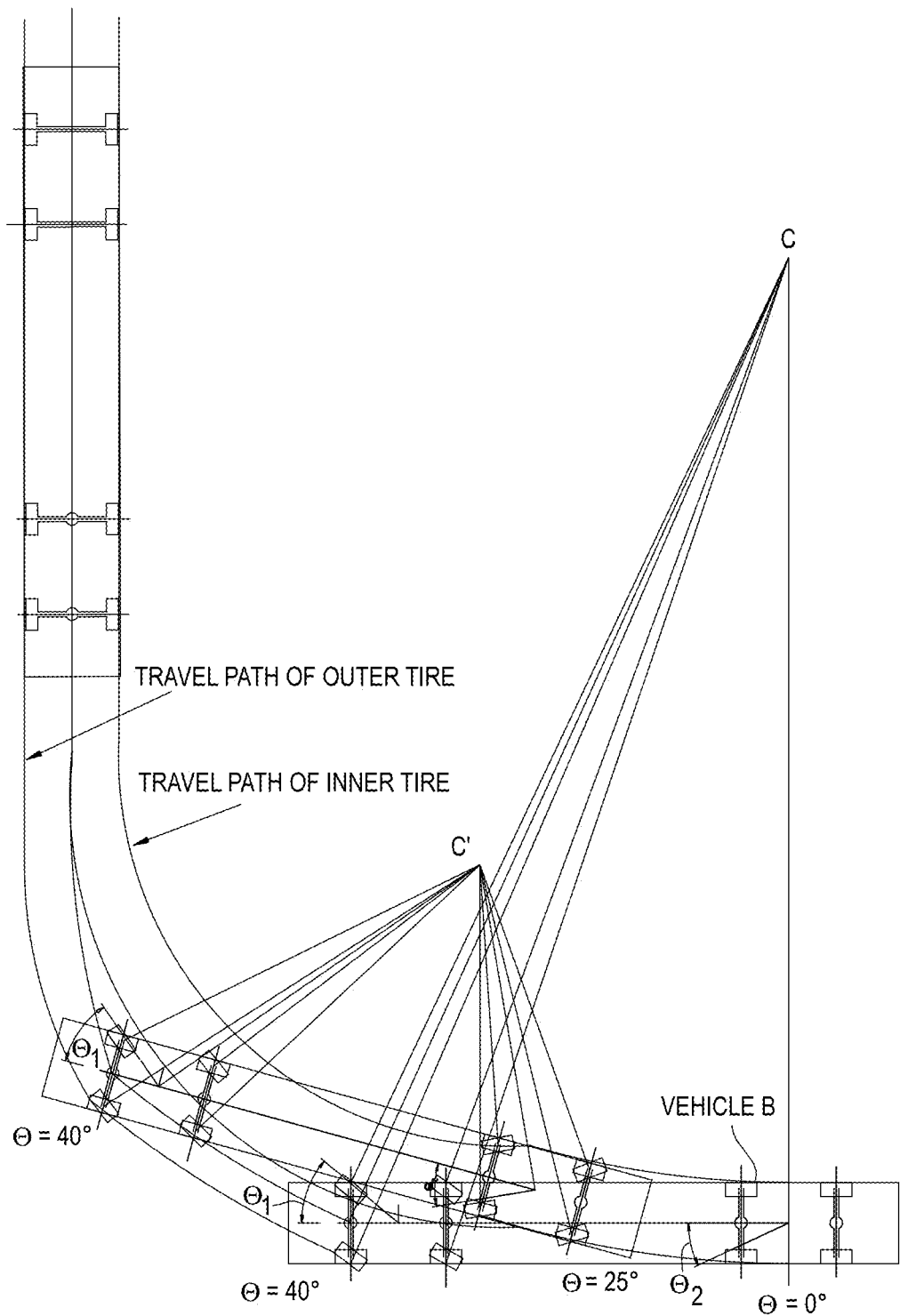
FIG. 19 is a schematic diagram illustrating the vehicle of FIG. 18 executing a 90-degree turn with an immediate wheel cut of 40 degrees for the four (4) wheels of both front axles, and a 'delayed' wheel cut of 25 degrees for the four (4) wheels of both rear axles, executed at 30 feet into such turn.

FIG. 19 shows Vehicle B executing a 90-degree turn with an immediate wheel cut of 40-degrees for the four wheels of both front axles, and a 'delayed' wheel cut of 25-degrees for the four wheels of both rear axles, executed at 30-feet into such turn.

Figure 20:
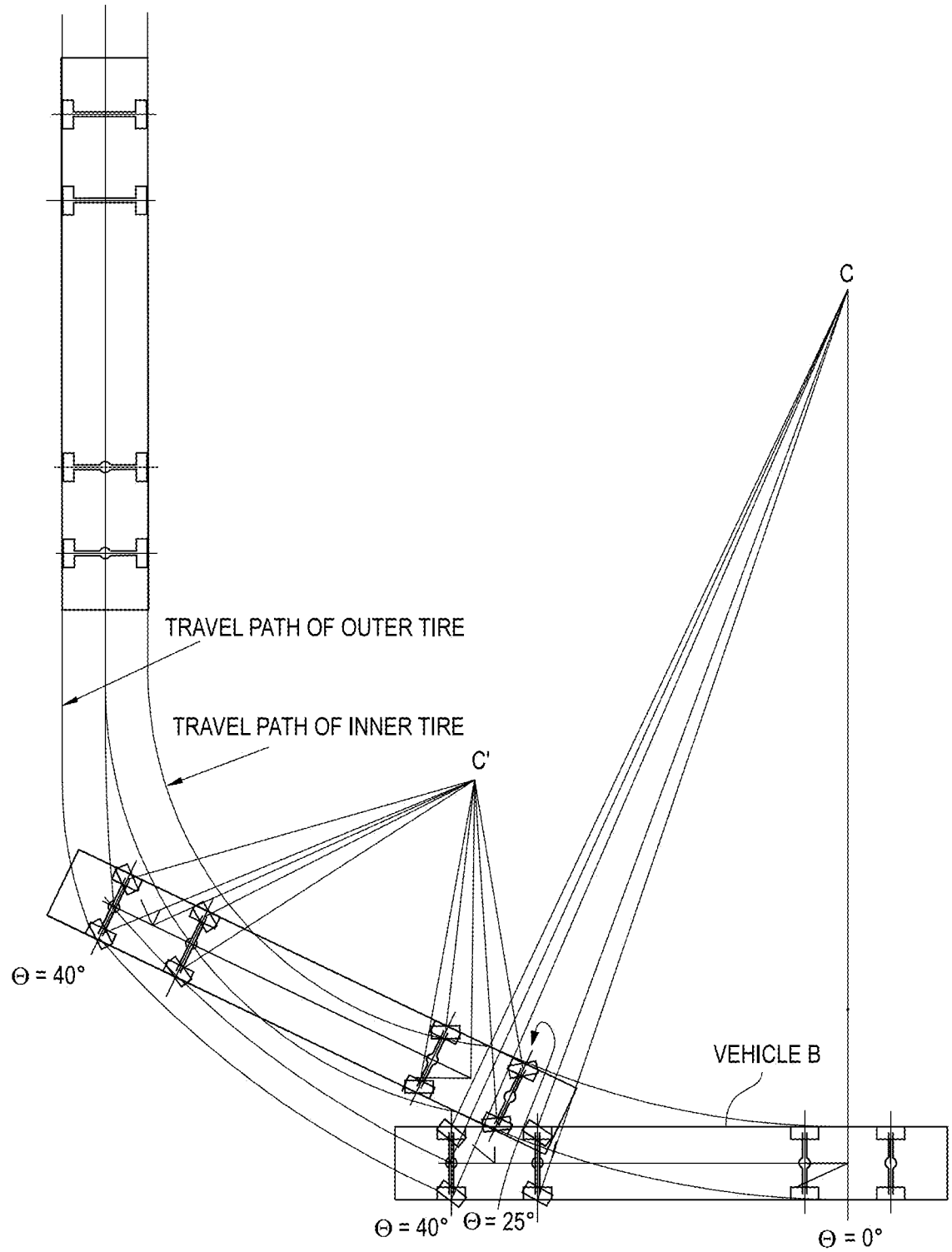
FIG. 20 is a schematic diagram illustrating the vehicle of FIG. 18 executing the 90-degree turn with an immediate wheel cut of 40 degrees for the four (4) wheels of both front axles, and a 'delayed' wheel cut of 25 degrees for the four (4) wheels of both rear wheels, executed at 50 feet into such turn.

FIG. 20 shows Vehicle B executing the 90-degree turn with an immediate wheel cut of 40 degrees for the four wheels of both front axles, and a 'delayed' wheel cut of 25-degrees for the four wheels of both rear wheels, executed at 50-feet into such turn.

The analysis at FIGS. 16-21 shows the maximum overall width of the wheel track of Vehicle A, executing a common right angle turn using Ackermann Turning Geometry, and shows the maximum overall width of such wheel track of Vehicle B, executing two common right angle turns, with the rear wheels engaged at different points while executing such turn, again using Ackermann Turning Geometry.

Finally, referring to FIG. 21, Vehicle A, the combination tractor trailer, has a maximum wheel track width "R" of 26 feet, 9 inches while making the 90-degree turn with the front wheel cut at 40 degrees. FIG. 21C illustrates that Vehicle B, the preferred example of the present invention, when executing the 90-degree turn with the two forward wheel cuts of 40-degrees, and the two rear wheel cuts at 25-degrees, while executing the turn at 50-feet into such 90-degree turn, has a maximum width "T" of the wheel track at 17 feet, 3 inches. Similarly, FIG. 21B illustrates that for Vehicle B executing this same 90-degree turn, with the rear wheels executing the turn at 30 feet into such 90-degree turn, the wheel track "S" is reduced to 14 feet, 4 inches, representing a 46.4% narrower wheel track than Vehicle A.

This comparison highlights the versatility and flexibility of all wheel steering with autonomous systems engaged, enabling continuous adjustment to instantly react to road conditions, obstacles or restrictions, may enable the vehicle of the present invention to execute all wheel steering, or just four-wheel steering, applying the appropriate turn angle with the appropriate axles, at the most appropriate and safest point, during the execution of the turn. In any turning maneuver, Level 5 Autonomous Systems may be important for controlling the movement of both the front and rear of the vehicle. Any obstruction in the path of the front, sides or rear of the vehicle while turning may be identified and the autonomous systems may make an immediate adjustment, and if such obstruction cannot be avoided the vehicle may be stopped.

The physical advantages of each of the design configurations of the present invention, coupled with the Critical Path Control and Geometry-Based Path Tracking, both algorithms that may be used in Level 5 Autonomous Vehicle Architecture, may enable each design configuration of the present invention to perform steering functions safely, efficiently and productively.

Often observed at intersections are tractor-trailer configurations attempting to execute a 90-degree turn, and before such turn can be completed successfully the driver must either wait for oncoming cars in the roadway being entered to move from the lanes, or clear the lanes, or even stop, and if such turn is being attempted when there may be no option for oncoming cars to move from, or clear, such lanes, the combination vehicle driver may have no option but to execute the turn with the trailer wheels rolling off the roadway and rolling over the outside curb.

The steering geometry of all eight wheels of the present invention, in any of the design configurations disclosed herein, may enable wheel cut angles no greater than 40-degrees, and theoretically such wheel cut at all 8-wheel positions may not need to be much greater than 35-degrees, as the advantages of all-wheel steering become evident; however, any determination of how all such angles of wheel cuts affect turning geometry may again underscores the importance of building a prototype.

To determine axle weight balance with a "water-level" load, the analysis is straight-forward as there are a number of problematic variables that may not be present with the four-axle vehicle of the present invention that may be present with the five-axle articulating combination vehicles; such as: 1) tractor wheelbases, 2) fifth wheel locations, 3) setting of trailer axles that conform to the state in which such vehicle operates, and 4) with combination vehicles that are not internal combustion, but battery-electric or hydrogen-electric, the location of the ESDS components may only be carried between the tractor front axle and rear tandem axles, or partially behind the cab, above the frame if the ESDS is hydrogen-electric (as illustrated in prior art FIGS. 11-15), and may never be carried under the trailer cargo body, which may create an unsolvable empty weight imbalance.

The comparison would be with a three-axle 150-inch wheelbase tractor, a 53-foot tandem trailer, a wheelbase front axle to middle of trailer tandems at 51-feet, exactly the same overall wheelbase of the four-axle non-articulating vehicle shown in FIGS. 4 and 5, and an overall length of 66-feet, and the 62-foot long four-axle configuration of the preferred example of the present invention.

FIGS. 4 and 5 detail the axle layout of a 62-foot long, 4-axle vehicle of the present invention. The axle weight variability in this vehicle may be very low as the undermount spaces housing the ESDS and related steering, braking and suspension componentry may be equally spread throughout the length of the vehicle. The added weight of the two rear driven E-axles, which may be substantially heavier than the forward-located non-driven E-axles, may be offset by the weight of the steel cab and in-cab components. The components in the undermount spaces may be identical on both sides of the vehicle, adding to overall weight balance. If a rear cargo lift was specified there may be a weight balance with the front-mounted electric cargo refrigeration and heating system located directly above the operator compartment, and if there was one and not the other there may be ample room in both the primary undermount spaces 14 and 24 to fully compensate for this imbalance by adjusting the location of the battery packs or fuel cells and hydrogen fuel tanks.

The empty weight of each of the four (4) axles of the four-axle configuration of the preferred example of the present invention may be very close; however, without a prototype it is difficult to be precise. One estimate may be that with "water-level" loading, there may be no more than a 1,000 lbs. 'total' differential among all four axles from exhibiting near identical weights on all of the four axles of the preferred example of the present invention.

With the four axles directly under the cargo body, with the empty axle weights being very close, and with the load balancing air suspension system making load-leveling adjustments, in a "water-level" axle loading analysis, the loaded axle weights of each axle may be very close to 20,000 lbs., and in my experience in the trucking industry it may be almost impossible to achieve the same result in a "water-level" load analysis with the dimensional and axle location variability of the five-axle 80,000 lb. GCWR tractor-trailer combination vehicle.

A center-of-mass or gravity analysis, also may not be made with precision without a prototype being built; however, the preferred example of the present invention shown on FIGS. 4-5 may have all the ESDS hardware, all the steering, suspension and brake components and both electric motors 'below' the top of the frame. The comparison to the five-axle 80,000 lb. GCWR combination vehicle, which may have much of its diesel engine above the frame, a tractor cab above the frame, a fifth wheel and upper trailer coupler (weighing 1,500 lbs.) above the frame, and if the ESDS is hydrogen-electric, such combination vehicle may also have significant ESDS components mounted behind the cab and above the frame, indicating a much higher center-of-gravity (compare FIGS. 11, 14 and 15).

With no speculation necessary, the center-of-gravity of the 4-axle preferred example of the present invention may be significantly lower than the five-axle combination vehicle's center-of-gravity. The safety implications may be significant. With 40,000 lbs. of cargo weight in the 53-foot trailer, with no offsetting weight below such cargo weight, the comparative stability of the four-axle configuration of the preferred example of the vehicle of the present invention, as compared to the five-axle combination vehicle in common use today, may be substantial.

Often observed on the Weather and News Channels are tractor-trailer combination vehicles being 'blown-over' from strong winds. Such an event may be unlikely with any of the design configurations of the present invention, as a direct result of the very low center of gravity designed into each such design configuration.

Persons of ordinary skill in the art will now recognize that the non-articulating commercial vehicle of the present invention may provide substantial advantages in safety, energy conservation and management, productivity and autonomous systems integration, as compared to articulating combination vehicle tractors and trailers. Preferred vehicle configurations for the non-articulating commercial vehicle of the present invention are as follows:

| GVWR | at least 80,000 | at least 60,000 |
|---|---|---|
| No. of Axles | 4 | 3 |
| Steer Axles | 4 | 3 |
| Drive Axles | 2 | 1 or 2 |
| Wheelbase | 51 feet | 32 to 39 ft. |
| Body Length | 62 to 72 ft. | 53 to 60 ft. |
| Cargo Body | 57 to 67 ft. | 48 to 55 ft. |
| Energy Space | 74 ft. to 84 ft. | 64 ft to 78 ft. |

These preferred design configurations, and others apparent to those of ordinary skill upon reading the foregoing disclosure, may provide a number of advantages over traditional articulating tractors and trailers, and 3-axle straight trucks, including:

1) Only two (2) sources of power: electric and pneumatic, no hydraulic systems used for brakes, steering, or lift brakes as hydraulics are expensive, heavy and high-maintenance.
2) For battery-electric propulsion, no less than four (4) times the space typically available for power generation components, and for hydrogen-electric propulsion, no less than two (2) times the space typically available for power generation components; assuring increased operating range. With hydrogen-electric propulsion the power generating components may be carried on tractors between the steer axle and the forward drive axle, and may be carried on the back of the tractor cab, as carrying primary battery-electric or hydrogen-electric system components anywhere on a trailer may neither be practical nor possible.
3) All electric energy is preferably only produced by battery-electric or hydrogen electric systems housed in undermount spaces located near the center of the vehicle, at or below the frame, enabling enhanced axle weight balance and vehicle stability.
4) The design of all undermount spaces may provide for secure and protected space for all ESDS componentry; additionally, all undermount spaces may also be designed for safe and efficient access to all such components for inspection and maintenance.
5) In the four (4) axle configuration all compressed air energy may be produced by pneumatic systems with (e.g.) 4 high output electric air compressors, 4 pressurized supply air tanks and 4 pressurized service air tanks, affording exceptional security and safety for pneumatic components of the vehicles; The three (3) axle configuration may have one (1) less electric air compressor, and one (1) less pressurized supply tank and one (1) less pressurized service tank.
6) Longer relative cargo bodies than articulating vehicles with comparable wheelbases.
7) The vehicles' body shape and design illustrated in FIGS. 1, 2, 3, 4, 5, 8 and 10, may be aerodynamic. With four (4) inches of ground clearance for almost the full length of the vehicle, the vehicle's body is preferably fully and effectively skirted. With an aerodynamic front bumper, front sides and roof shaped for reduced drag and reduced wind resistance, with wheel covers on all eight (8) wheels, and with the tractor-trailer gap eliminated, the resulting aerodynamics may compare very positively to even the most aerodynamically-designed tractor-trailer combination vehicles being currently introduced.
8) FIGS. 1, 2, 3 and 8 referred to in paragraph (7), immediately above, show the vehicle of the present invention incorporating a front-mounted electric cargo refrigeration/heating system and a five (5) foot long operator's compartment. Both configurations of the vehicle of the present invention may have the operator's compartment designed and built to a length of seven feet, adding two feet to the vehicle's overall body length, and may be built to place the operator's seating and control position at the center of the operator's compartment. With these dimensional changes to the vehicle's operator's compartment the vehicle's frontal area may be significantly reshaped with a lower and more aerodynamic front roof line, a more pointed and aerodynamic frontal area, a deeper and more aerodynamically-shaped radius at the front corners, and a molded front bumper cover, aerodynamically-shaped and designed to absorb impact. Additionally, the vehicle may be designed and built with a reconfigured and recontoured front-mounted cargo refrigerating/ heating system to conform to the vehicle's reshaped frontal area. The design's dimensional changes described here, added to the vehicle's aerodynamic configuration described in paragraph 7), above, provide a vehicle configuration with an air-flow drag coefficient that may be as low, and may likely be lower, than the most aerodynamically designed, built, and currently operating combination vehicles.

9) The vehicle may be designed and built for transporting perishable commodities with a front-mounted electronic cargo refrigeration/heating system. Alternatively, the vehicle may be designed and built for transporting general commodities, with no refrigeration/heating system. In either configuration the vehicle may be designed with a more contoured frontal area than what is shown in FIG. 10, wherein the operator's compartment is lengthened to 7 feet and may include the related aerodynamic improvements earlier described. Additionally, the vehicle may be designed and built as an open top vehicle, where overhead loading/unloading apparatus may be used, or may be designed and built as a flat-bed vehicle, where side loading/unloading apparatus may be used.

10) A total of eight (8) low-profile wide-base tires may be used, proving low rolling resistance, and supported by an automatic tire air pressure and tire inflation management system, controlled by the vehicle's autonomous operating system.

11) Electromechanical dual-disc, or electromagnetic, foundation braking systems on all eight (8) wheel positions for improved brake balance, more reliable and more immediate roll-stability control, directional-stability control, traction-control, anti-lock braking control and automatic emergency braking functionality, assuring safer and more controlled stopping, and shorter stopping distances.

12) E-axle energy regeneration, preferably from both driven and non-driven E-axles, reducing energy use, extending operating range, improving overall braking functionality from the negative axle torque from the E-axle generator during regenerative braking. The foundation brakes may be electromechanical dual-disc, whereas the E-axle regenerative braking functionality may reduce the wear-out of abrasive friction components, may extend the operational life of such foundation brakes, and may improve the vehicle's braking performance.

13) Load-leveling and ride-height control pneumatic suspension may be provided an all four (4) axles, using either air spring systems or electronic pneumatic piston systems, or a combination of both. The vehicle may also be designed with a primary pneumatic system and a reserve pneumatic system, assuring safe, reliable and consistent suspension system functionality.

14) Solar panels to power electric cargo refrigeration/ heating and for reserve power for operator compartment components, with such panels preferably being 36 inches shorter than the overall length of the vehicle body, or solar panels may be designed as curved solar panels that may perfectly conform to the curvature of the roof at the front of the vehicle.

15) No pivot-point in non-articulating body, and with low center of gravity with all power generation components, both propulsion and non-propulsion, housed in spaces located at or below the top of the frame, the incidence of roll-overs may likely decrease, and jack-knives would be impossible.

16) Weight reduction with elimination of separate tractor cab, tractor frame, fifth wheel, trailer upper coupler, fifth axle and related tires and wheels, and trailer landing gear.

17) More balanced axle loading with all axles located directly under the cargo body.

18) With the elimination of manual and external connections of low and high voltage electrical wires and pressurized air lines, there is immediate adaptability to fully-functional Level 5 autonomous systems for steering, braking, acceleration, balanced axle loading, suspension ride-height controls, cargo temperature management, and telematics, with all such connectivity preferably hard-wired, directly and permanently connected, safely and securely routed and enclosed in protected spaces, and located in heated spaces where necessary.

19) Electronic all-wheel steering systems, with algorithms designed for the application of such steering systems affecting the width of the wheel path when turning, reducing body roll, controlling lane change timing and execution, and for controlling both in-phase and counter-counter-phase vehicle turning and tracking during low-speed and high-speed turning.

20) Driven axles may be powered independently, and may be powered simultaneously, based upon energy demands from the variability of the operating conditions, and for vehicle control on horizontal and vertical curves.

21) Two (2) low steps for safer entrance and exit from the operator's compartment. 22) Charging ports for batteries may be located at front, middle and rear of vehicle.

23) With sealed and hard-wired electrification throughout the entire length and width of the vehicle, and where operator and cargo security may be vital, the addition of an electronic roll-up rear door may prevent cargo theft and may also prevent shoulder, arm and back injuries, common with trailers equipped with manual roll-up rear doors in common use.

24) The non-articulating and simplified design characteristics of the four (4)-axle configuration makes the addition of a fifth axle, which is preferably a steerable, non-driven E-axle, uncomplicated, substantially increasing the GVWR of the vehicle. A fifth axle may be incorporated into the vehicle design with identical electronic, pneumatic and autonomous connectivity as is designed into the existing steerable non-driven E-axles. Such fifth axle may have one electronic air compressor, one pressurized supply air tank and one pressurized service air tank dedicated specifically for the suspension system and the tire air pressure management system for such fifth axle. Available space for ESDS may not be reduced as the fifth axle may be located behind the rear most axle, increasing the vehicle's overall wheelbase, and increasing the vehicle's corresponding body length by the location of such fifth axle; conversely, depending upon the extent of the increase in the vehicle's GVWR, such fifth axle may be spaced forward of the rear-most axle, maintaining the overall wheelbase of the vehicle.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. An integrated, non-articulating commercial vehicle comprising a vehicle cargo body with at least three steerable axles, and a cab that does not pivot relative to the vehicle body, wherein the vehicle has a battery-electric-powered or hydrogen-electric-powered propulsion system, and wherein the vehicle body has a center of gravity that is substantially lower than a center of gravity for an articulating tractor-trailer combination commercial vehicle with a comparably-sized vehicle body, and wherein when turning the vehicle has a maximum wheel track width which is substantially less than the maximum wheel track width of an articulating tractor-trailer combination commercial vehicle with a comparably-sized overall length.

2. An integrated, non-articulating commercial vehicle with a cab and a vehicle body configuration, wherein the vehicle's frame, axles, brakes, suspension, tires and wheels are rated for a GVWR of at least 60,000 pounds, and wherein the vehicle has at least three steerable axles, either driven or non-driven or both, each capable of regenerative braking, including a front axle, an intermediate axle, and a rear axle, a wheelbase of between 32-39 feet, a body length of between 53-60 feet, and an energy space of at least 64 lineal feet;
wherein the brakes comprise electronic brakes including dual disc brakes,
providing friction braking, or electromagnetic brakes, providing non-friction magnetic braking;
wherein any one, or any two, of the three steerable axles is driven by a battery-electric or hydrogen-electric propulsion system, and all non-driven and driven axles are E-axles designed to generate electricity during slowing and braking, and to retard movement of the vehicle during regenerative braking; and
wherein when two axles are driven, with either battery-electric or hydrogen electric propulsion systems, the two driven axles are driven independently, whereby either of the two driven axles may be automatically engaged or disengaged by autonomous operating systems of the vehicle, or may be manually engaged or disengaged.

3. The integrated, non-articulating commercial vehicle of claim 2, wherein the cargo body length is between 48-55 feet, and wherein the energy space is between 64-78 lineal feet.

4. The integrated, non-articulating commercial vehicle of claim 1, wherein:
the vehicle's frame, axles, brakes, suspension, tires and wheels are rated for a GVWR of at least 80,000 pounds;
the vehicle has a wheelbase of at least 51 feet, an overall body length of at least 62 feet, a cab length of at least 5 feet, a cargo body length of at least 57 feet, an energy space of at least 74 lineal feet;
measured from the center of the vehicle there are at least two forward steerable E-axles and at least two rear steerable E-axles, with one or more of the rear steerable E-axles being driven by a battery-electric or hydrogen-electric propulsion system, and when at least two of the rear steerable E-axles are driven, both such axles may be driven independently;
wherein the one or more driven E-axles may be automatically engaged or disengaged by autonomous operating systems of the vehicle, or manually engaged or disengaged.

5. The integrated, non-articulating commercial vehicle of claim 1, wherein the vehicle:
has all-wheel steering;
includes wheels with single-wide-based tires at all axle positions;
has a substantially increased cargo volumetric capacity and longer cargo floor space as compared to 53-foot-long trailers most commonly operated on public roadways using an articulating tractor-trailer combination commercial vehicle; and
has a substantially increased weight-carrying capacity in relation to an articulating tractor-trailer combination commercial vehicle with a comparably-sized vehicle body and a comparably-sized battery-electric or hydrogen electric propulsion system.

6. The integrated, non-articulating commercial vehicle of claim 1, wherein a top portion of the vehicle includes solar panels used to power refrigeration and heating inside the vehicle cargo body, and for reserve power.

7. The integrated, non-articulating commercial vehicle of claim 1, wherein the vehicle body includes ESDS, providing power for battery-electric or hydrogen-electric systems, and the ESDS is housed in an undermount space located near a center of the vehicle, enabling the vehicle to function with a dual axle drive system wherein each drive axle can be operated independently.

8. The integrated, non-articulating commercial vehicle of claim 1, wherein the vehicle includes hard-wired electronic foundation braking systems and hard-wired electric steering systems to all wheels, hard-wired electric air compressors, and E-axles hard-wired to the vehicle's ESDS.

9. The integrated non-articulating commercial vehicle of claim 1, wherein the vehicle includes electric air compressors supplying permanently and directly plumbed compressed air to air tanks supplying compressed air to pneumatic load-leveling suspension systems at all axles, and for compressed air to tire air pressure management systems for all tires, wherein no hydraulic power or hydraulic-functioning control systems are used, and further comprising an electric, hard-wired, rear-mounted cargo lift which, during operation, regenerates electricity back to an ESDS.

10. The integrated, non-articulating commercial vehicle of claim 1, wherein the vehicle comprises a single unit, with no tractor-trailer gap and no exposed frame, and wherein the vehicle has an aerodynamic front bumper, substantially full height and full-length side-skirting from the front bumper to a rear of the body, aerodynamic substantially radiused front corners and top, and wherein the vehicle, as compared to articulating tractor-trailer combination vehicles with comparably-sized trailers, is more aerodynamic and has a lower or substantially similar drag coefficient.

11. The integrated, non-articulating commercial vehicle of claim 1, wherein all of the axles have compressed air suspension systems controlling axle weight equalization and frame height control, and wherein compressed air originates from a permanently-plumbed pneumatic system with a redundant backup.

12. The integrated, non-articulating commercial vehicle of claim 1, wherein the vehicle facilitates adoption of Level 5 autonomous vehicle architecture using hard-wired electrical connectivity for all autonomous operating system functionality powered by high and low voltage electricity, including electric all-wheel steering systems, fully electronic or electromechanical foundation brake systems, and at least one or more E-axles, and wherein the vehicle utilizes permanently-plumbed pneumatic connectivity for tire inflation management systems and pneumatic suspension systems, and further comprising a single drive axle that is constantly engaged, thereby extending the vehicle's operating range during vehicle transportation periods when vehicle weight, terrain or weather are not material factors.

13. The integrated, non-articulating vehicle of claim 1, further comprising four steerable axles, and optionally a fifth axle, with at least one driven E-axle, facilitating an increase of the GVWR of the vehicle, while augmenting benefits of regenerative braking for the vehicle.

14. The integrated, non-articulating commercial vehicle of claim 1, wherein all axles are steerable, driven or non-driven E-axles, and wherein motors of the driven E-axles power the vehicle, generators of the E-axles regenerate electricity through slowing and braking, and through regenerative braking, slow momentum of the vehicle, thereby reducing foundation brake wear, and wherein when the vehicle slows and brakes, power to the one or more driven E-axle motors is immediately stopped by autonomous operating systems of the vehicle, and electricity generated by the slowing and braking of the vehicle and functionality of the E-axles and related components is converted and transmitted to batteries located within an ESDS of the vehicle.

15. The integrated, non-articulating commercial vehicle of claim 2, wherein:
   any driven E-axles are powered by a dual rotation electric motor;
   any non-driven E-axles are connected to a single rotation electric generator;
   during propulsion of the vehicle, any driven E-axle's motor is electronically engaged with the corresponding E-axle, and generators associated with non-driven E-axles are electronically and instantly disengaged from the corresponding non-driven E-axles; and
   at any time during propulsion of the vehicle, when more than one driven E-axle is engaged in propulsion, and a demand for motive power is reduced, an autonomous operating system of the vehicle may electronically disengage a motor of one driven E-axle so that this driven E-axle then functions as a non-driven E-axle, and reengagement of this E-axle is performed by the autonomous operating systems of vehicle when the demand for propulsion is satisfied by reengagement of this E-axle.

16. The integrated, non-articulating commercial vehicle of claim 1, wherein the vehicle body includes ESDS housing batteries, and one or more E-axles with associated generators are hard-wired to the ESDS.

* * * * *